(12) United States Patent
Windmiller

(10) Patent No.: US 8,827,106 B2
(45) Date of Patent: Sep. 9, 2014

(54) BOTTOM FILLABLE BOTTLES AND SYSTEMS FOR CHARGING THE SAME

(76) Inventor: David Mitchell Windmiller, Melville, NY (US)

( * ) Notice: Subject to any disclaimer, the term of this patent is extended or adjusted under 35 U.S.C. 154(b) by 307 days.

(21) Appl. No.: 13/349,160

(22) Filed: Jan. 12, 2012

(65) Prior Publication Data

US 2012/0211461 A1    Aug. 23, 2012

Related U.S. Application Data

(63) Continuation of application No. 12/732,500, filed on Mar. 26, 2010, now Pat. No. 8,215,344, which is a continuation of application No. 12/137,240, filed on Jun. 11, 2008, now Pat. No. 7,708,035, which is a continuation-in-part of application No. 11/791,247, filed as application No. PCT/US2005/042043 on Nov. 21, 2005, now Pat. No. 7,766,057, and a continuation of application No. 11/791,238, filed as application No. PCT/US2005/042041 on Nov. 21, 2005, now Pat. No. 8,113,247, said application No. 11/791,247 is a continuation of application No. 11/791,244, filed as application No. PCT/US2005/042042 on Nov. 21, 2005, now Pat. No. 8,082,956, said application No. 11/791,247 is a continuation of application No. 11/791,237, filed as application No. PCT/US2005/042051 on Nov. 21, 2005, now Pat. No. 7,824,545.

(60) Provisional application No. 60/934,229, filed on Jun. 12, 2007.

(51) Int. Cl.
    *A47G 19/22*    (2006.01)

(52) U.S. Cl.
    CPC .................................. *A47G 19/2266* (2013.01)
    USPC ........... 220/709; 222/532; 222/536; 220/708; 220/715; 215/229; 215/387; 215/388; 215/389

(58) Field of Classification Search
    CPC ........ B65D 47/00; B65D 47/04; B65D 47/06; B65D 47/061; B65D 47/065; B65D 47/066; B65D 47/14; B65D 47/142; B65D 47/20; B65D 47/305; B65D 77/22; B65D 77/24; B65D 77/28; B65D 77/283
    USPC ............... 222/506, 508, 532, 536; 220/254.7, 220/708, 709, 715; 215/229, 387–389
    See application file for complete search history.

(56) References Cited

U.S. PATENT DOCUMENTS 2,064,584 A    12/1936    Aronson
2,937,795 A    5/1960    Ciliberti (Continued)

FOREIGN PATENT DOCUMENTS

DE    3814937 C1    6/1989
GB    2137181 A    10/1984
WO    2005/058745 A2    6/2005

OTHER PUBLICATIONS

International Search Report for application No. PCT/US05/42043, dated Mar. 14, 2006.

(Continued)

*Primary Examiner* — Timothy L Maust
(74) *Attorney, Agent, or Firm* — Carter, DeLuca, Farrell & Schmidt, LLP

(57) ABSTRACT

A bottle assembly is provided having a body portion defining a cavity therein, a top lid assembly connectable to the body portion, which includes a selectively deployable and retractable spout, a spout bottom lid; and a resilient tube having a lumen therethrough, wherein the lumen is occluded when the spout is retracted and the resilient tube is kinked, and wherein the lumen is opened when the spout is deployed and the resilient tube is not kinked; a trigger assembly for selectively moving the spout between a deployed and a retracted condition; and a bottom lid assembly selectively connectable to a bottom end of the body portion, the bottom lid assembly including a valve assembly to open and close a fluid path into the cavity of the body portion.

16 Claims, 52 Drawing Sheets

(56) References Cited

U.S. PATENT DOCUMENTS

| | | | |
|---|---|---|---|
| 3,325,031 | A | 6/1967 | Singier |
| D214,147 | S | 5/1969 | Ritsi |
| 3,482,731 | A | 12/1969 | Douty |
| D216,541 | S | 2/1970 | Koenigsberg et al. |
| 3,654,743 | A | 4/1972 | McGeary |
| 3,718,165 | A | 2/1973 | Grothoff |
| 3,904,079 | A | 9/1975 | Kross |
| 3,930,598 | A | 1/1976 | Slagle |
| 3,940,019 | A | 2/1976 | Kross et al. |
| 3,993,218 | A | 11/1976 | Reichenberger |
| 4,133,457 | A | 1/1979 | Klassen |
| 4,142,651 | A | 3/1979 | Leopoldi et al. |
| 4,162,028 | A | 7/1979 | Reichenberger |
| 4,197,884 | A | 4/1980 | Maran |
| 4,473,097 | A | 9/1984 | Knickerbocker et al. |
| 4,481,986 | A | 11/1984 | Meyers |
| RE32,142 | E | 5/1986 | Meyers |
| 4,685,598 | A | 8/1987 | Nezworski |
| 4,709,734 | A | 12/1987 | Rudick et al. |
| 4,728,006 | A | 3/1988 | Drobish et al. |
| 4,729,495 | A | 3/1988 | Aschberger et al. |
| 4,877,065 | A | 10/1989 | Lamboy et al. |
| 4,938,387 | A | 7/1990 | Kervefors et al. |
| 4,966,300 | A | 10/1990 | Coonradt |
| 5,115,950 | A | 5/1992 | Rohr |
| 5,150,815 | A | 9/1992 | Saklad |
| 5,167,819 | A | 12/1992 | Iana et al. |
| 5,203,468 | A * | 4/1993 | Hsu .................... 220/254.3 |
| 5,213,236 | A | 5/1993 | Brown et al. |
| 5,265,757 | A | 11/1993 | Wu |
| 5,282,541 | A | 2/1994 | Chen |
| 5,312,019 | A | 5/1994 | Tsao |
| 5,337,918 | A | 8/1994 | Wang |
| 5,339,982 | A | 8/1994 | Tardie |
| 5,339,995 | A | 8/1994 | Brown et al. |
| 5,343,904 | A | 9/1994 | Kaeser |
| 5,346,081 | A | 9/1994 | Lin |
| 5,361,934 | A | 11/1994 | Spence, Jr. |
| 5,377,877 | A | 1/1995 | Brown et al. |
| 5,388,620 | A | 2/1995 | Lasserre et al. |
| 5,409,144 | A | 4/1995 | Brown |
| 5,411,183 | A | 5/1995 | Hildebrandt |
| 5,431,290 | A | 7/1995 | Vinciguerra |
| 5,439,143 | A | 8/1995 | Brown et al. |
| 5,484,080 | A * | 1/1996 | Blasnik et al. ................ 220/708 |
| 5,518,142 | A | 5/1996 | Lin |
| 5,524,680 | A | 6/1996 | DeLaforcade |
| 5,535,791 | A | 7/1996 | Lisec |
| 5,545,315 | A | 8/1996 | Lonneman |
| D376,430 | S | 12/1996 | Humphrey et al. |
| 5,579,948 | A | 12/1996 | Lin |
| 5,582,320 | A | 12/1996 | Lin |
| 5,609,759 | A | 3/1997 | Nohren, Jr. et al. |
| 5,623,974 | A | 4/1997 | Losenno et al. |
| 5,632,892 | A | 5/1997 | Klein |
| 5,743,443 | A | 4/1998 | Hins |
| 5,817,231 | A | 10/1998 | Souza |
| 5,839,614 | A | 11/1998 | Brown |
| 5,884,793 | A * | 3/1999 | Wang ........................... 215/389 |
| 5,919,365 | A | 7/1999 | Conette |
| 5,927,566 | A | 7/1999 | Mueller |
| D413,067 | S | 8/1999 | Haley |
| 5,971,225 | A | 10/1999 | Kapsa |
| 6,004,460 | A | 12/1999 | Palmer et al. |
| 6,050,433 | A | 4/2000 | Russell et al. |
| 6,089,411 | A | 7/2000 | Baudin et al. |
| 6,089,418 | A | 7/2000 | Gaiser et al. |
| 6,095,381 | A | 8/2000 | Schwanenberg |
| 6,117,319 | A | 9/2000 | Cranshaw |
| 6,120,682 | A | 9/2000 | Cook |
| D433,337 | S | 11/2000 | Cautereels |
| 6,153,096 | A | 11/2000 | Nohren, Jr. |
| 6,165,362 | A | 12/2000 | Nohren, Jr. et al. |
| 6,206,058 | B1 | 3/2001 | Nagel et al. |
| 6,230,940 | B1 | 5/2001 | Manning et al. |
| 6,293,437 | B1 | 9/2001 | Socier et al. |
| 6,344,146 | B1 | 2/2002 | Moorehead et al. |
| 6,367,668 | B1 | 4/2002 | Schwanenberg |
| 6,371,329 | B1 | 4/2002 | Wild |
| 6,390,341 | B1 * | 5/2002 | Ohmi et al. .................... 222/536 |
| 6,405,901 | B1 | 6/2002 | Schantz et al. |
| 6,427,730 | B2 | 8/2002 | Nagel et al. |
| 6,427,874 | B2 | 8/2002 | Brown et al. |
| 6,468,435 | B1 | 10/2002 | Hughes et al. |
| 6,491,069 | B2 | 12/2002 | Nagel et al. |
| 6,494,346 | B2 | 12/2002 | Gross et al. |
| 6,523,711 | B1 | 2/2003 | Hughes et al. |
| 6,530,504 | B2 | 3/2003 | Socier |
| 6,569,329 | B1 | 5/2003 | Nohren, Jr. |
| 6,607,012 | B2 | 8/2003 | Yquel |
| 6,607,013 | B1 | 8/2003 | Leoni |
| D481,951 | S | 11/2003 | Scott, III |
| D486,739 | S | 2/2004 | Taylor et al. |
| 6,684,915 | B1 | 2/2004 | Ver Hage |
| 6,729,362 | B2 | 5/2004 | Scheindel |
| 6,779,435 | B1 | 8/2004 | Iacobucci |
| 6,919,025 | B2 | 7/2005 | Cluff et al. |
| D511,836 | S | 11/2005 | Morano et al. |
| 7,093,735 | B2 | 8/2006 | Stephens |
| 7,124,907 | B2 | 10/2006 | Conaway |
| 7,255,241 | B2 * | 8/2007 | Yoneoka et al. ........... 220/254.3 |
| 7,377,296 | B2 | 5/2008 | Gueret |
| D588,856 | S | 3/2009 | Toth et al. |
| D591,160 | S | 4/2009 | Windmiller |
| 7,516,862 | B2 * | 4/2009 | McDonough ................. 215/229 |
| 7,708,035 | B2 | 5/2010 | Windmiller |
| 7,766,057 | B2 * | 8/2010 | Windmiller ................... 141/113 |
| 8,550,269 | B2 * | 10/2013 | Lane ............................. 215/229 |
| 8,602,238 | B2 * | 12/2013 | El-Saden et al. ............. 215/389 |
| 2002/0134801 | A1 | 9/2002 | Stewart |
| 2002/0170874 | A1 | 11/2002 | Hou |
| 2003/0085232 | A1 | 5/2003 | Leinenweber |
| 2005/0029271 | A1 | 2/2005 | McDonough |
| 2005/0092760 | A1 | 5/2005 | Westerhold |
| 2008/0277020 | A1 | 11/2008 | Windmiller |
| 2009/0145839 | A1 | 6/2009 | Miga, Jr. |
| 2011/0049169 | A1 | 3/2011 | Rosnak et al. |
| 2011/0062170 | A1 | 3/2011 | Kemper et al. |

OTHER PUBLICATIONS

International Search Report for application No. PCT/US05/42041, dated Mar. 9, 2006.

International Search Report for application No. PCT/US05/42042, dated Mar. 8, 2006.

International Search Report for application No. PCT/US05/42051, dated Mar. 22, 2006.

* cited by examiner

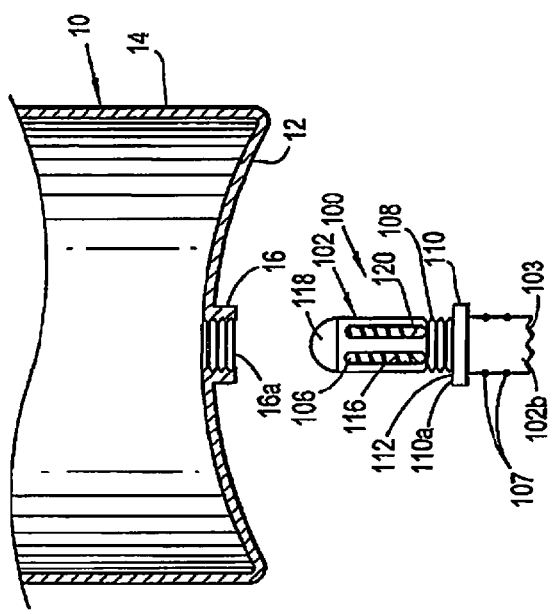
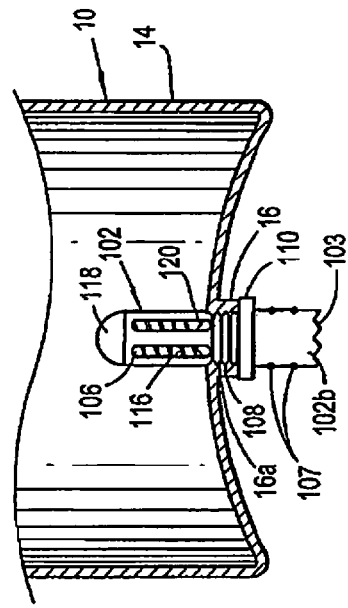
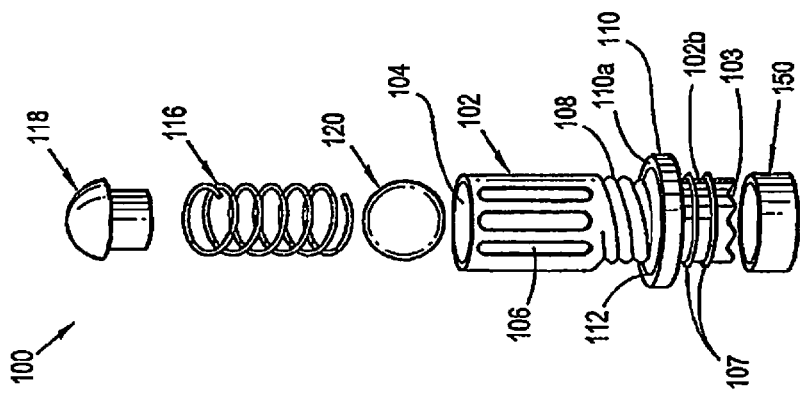

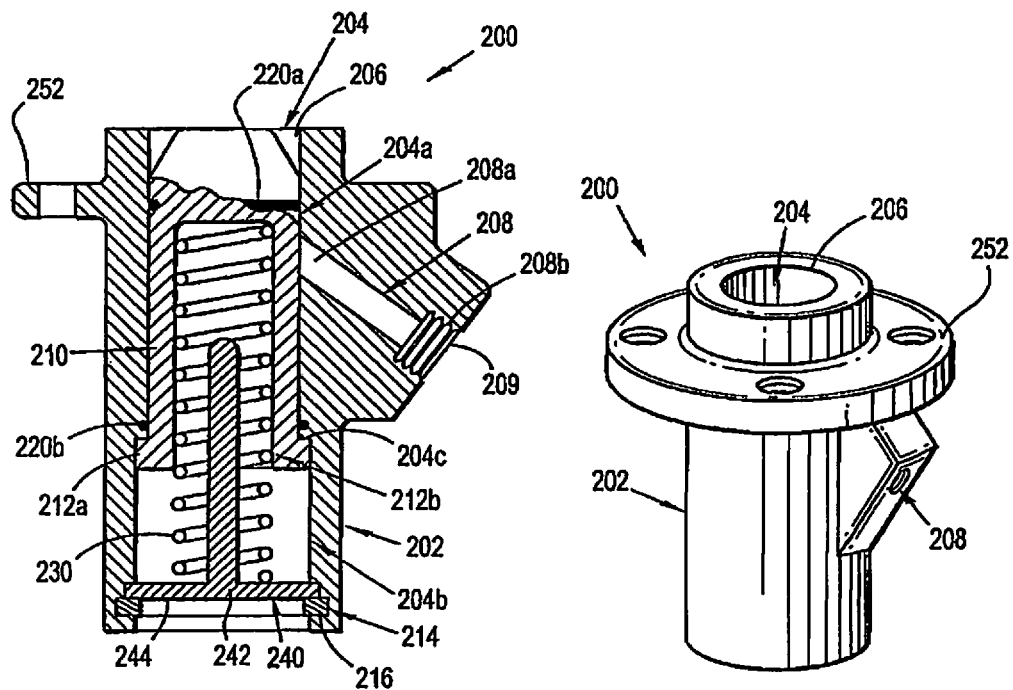
FIG. 4
FIG. 6
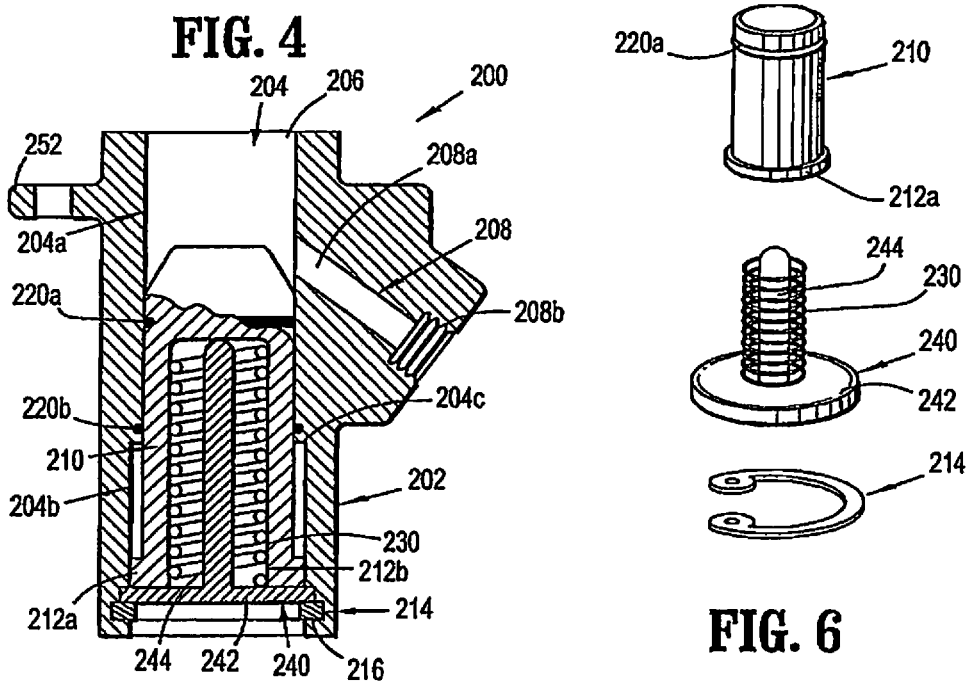
FIG. 5

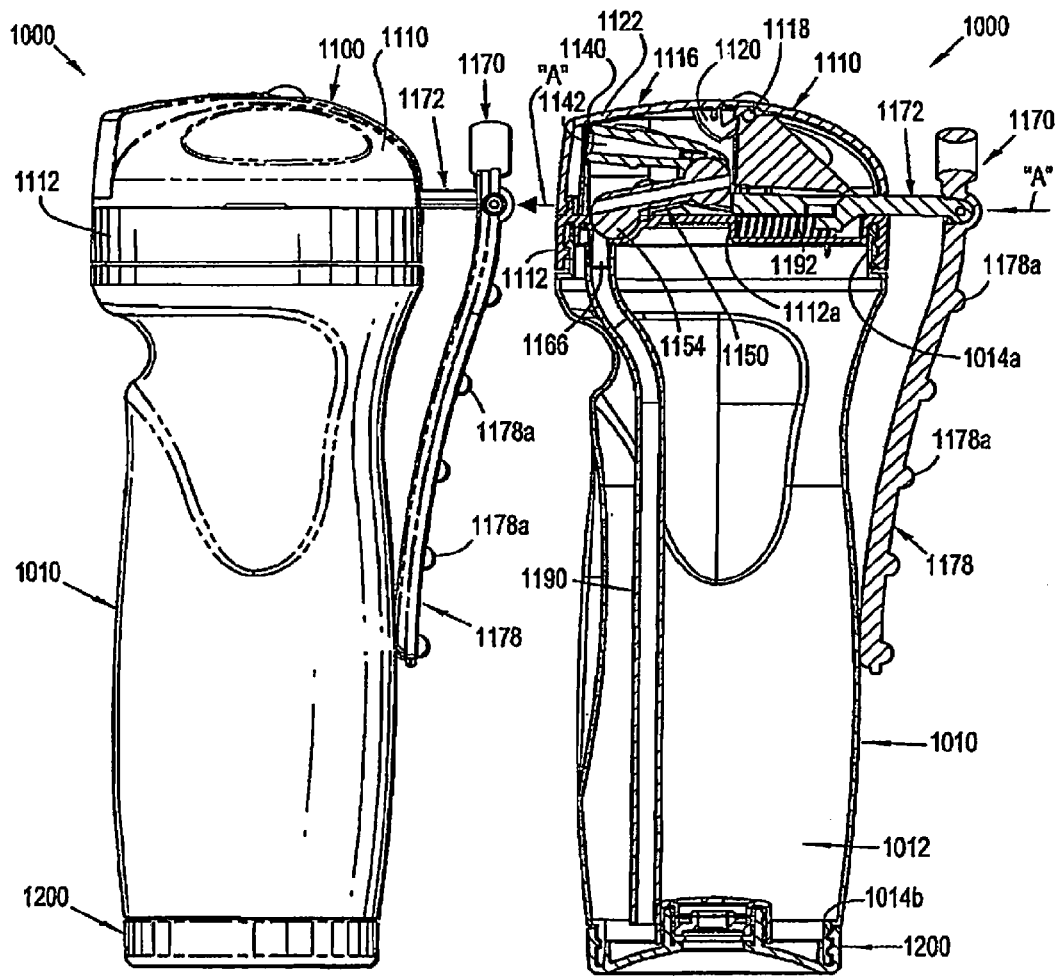
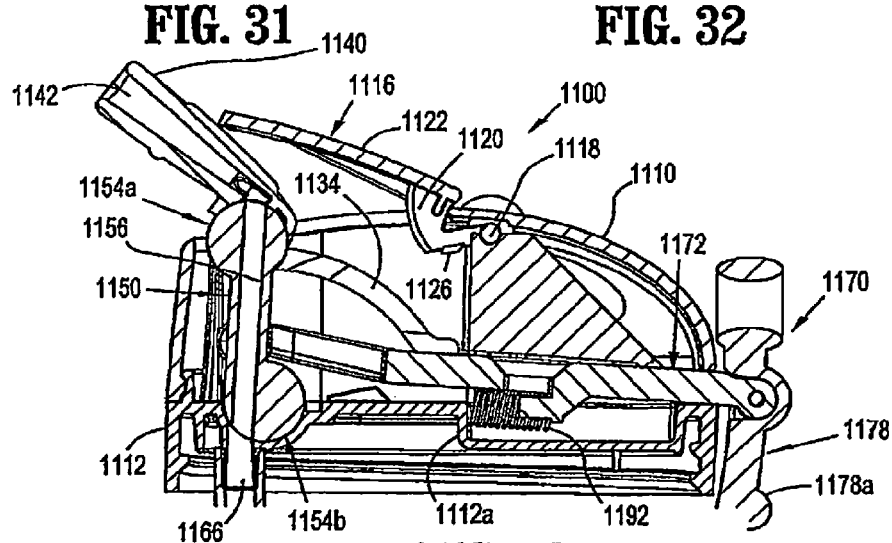
FIG. 31  FIG. 32
FIG. 33

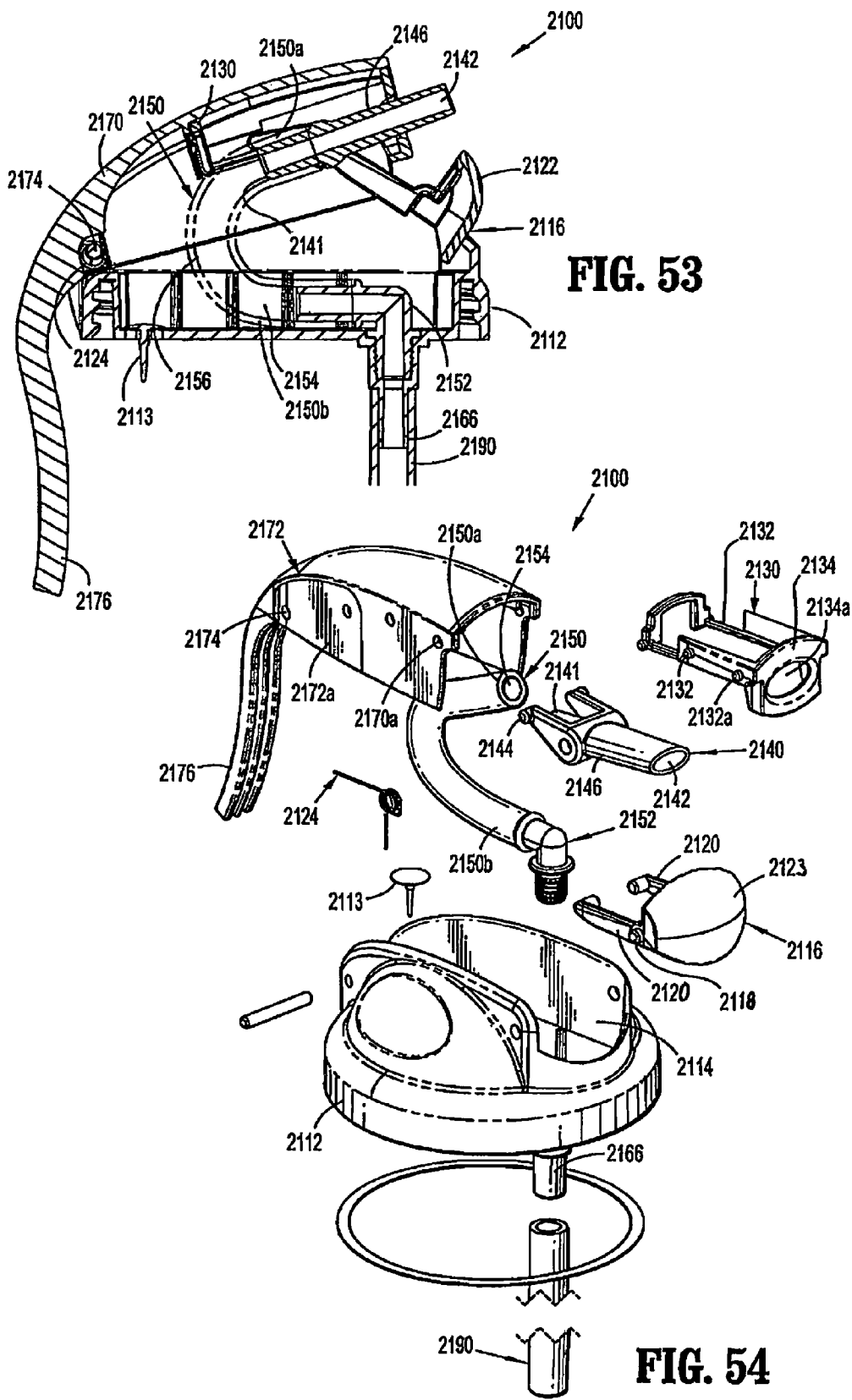

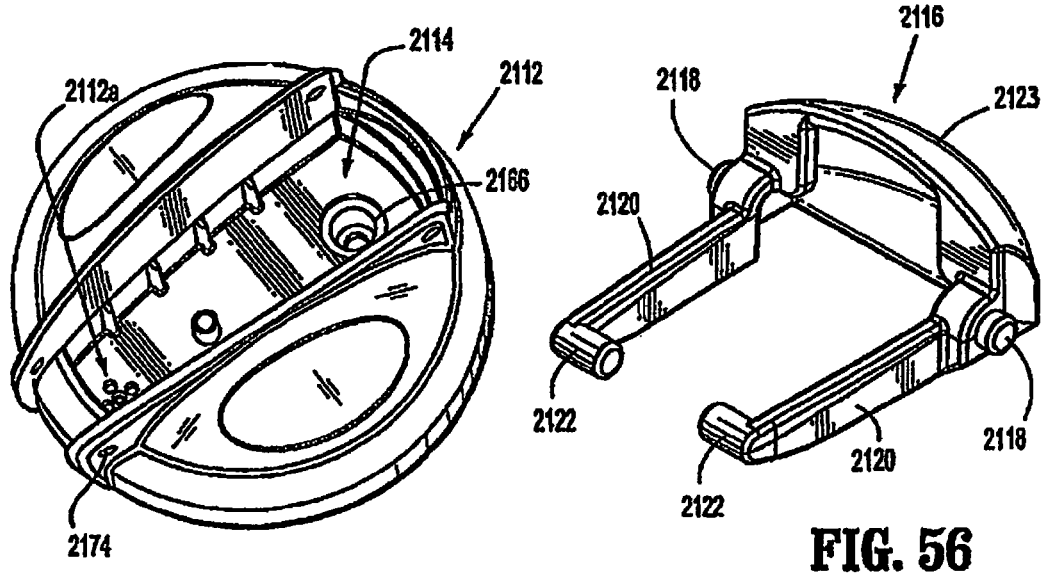
FIG. 55
FIG. 56
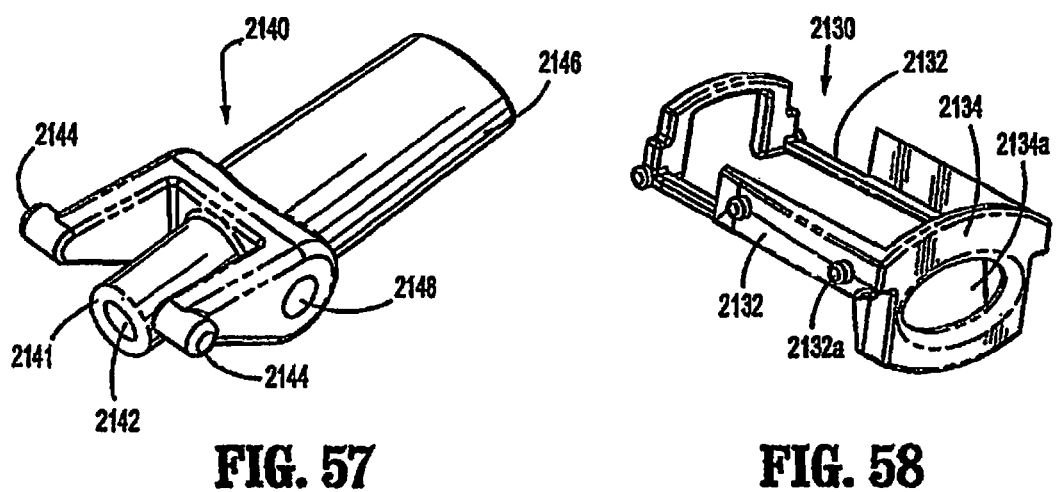
FIG. 57
FIG. 58

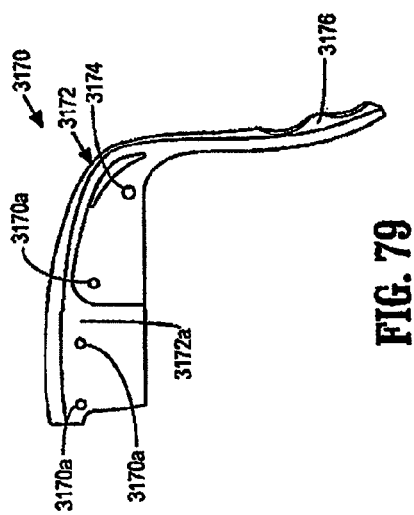
FIG. 79
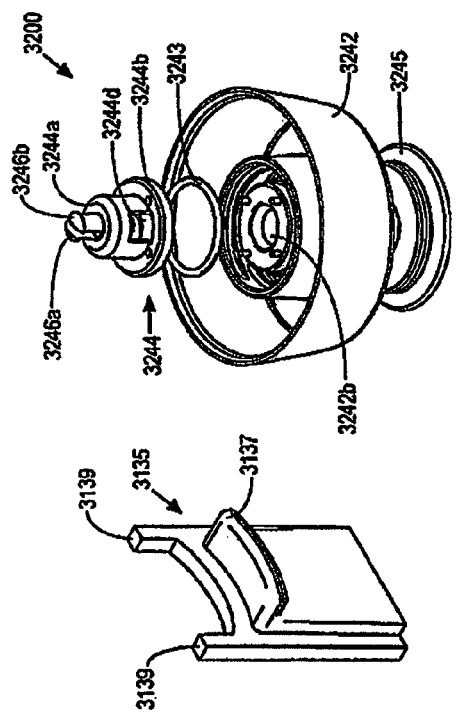
FIG. 80
FIG. 81

BOTTOM FILLABLE BOTTLES AND SYSTEMS FOR CHARGING THE SAME

CROSS-REFERENCE TO RELATED APPLICATIONS

The present application is a Continuation of and claims the benefit of and priority to U.S. application Ser. No. 12/732,500, filed on Mar. 26, 2010, and is a Continuation of and claims the benefit of and priority to U.S. application Ser. No. 12/137,240, filed on Jun. 11, 2008, which claims the benefit of and priority to U.S. Provisional Application Ser. No. 60/934,229 filed on Jun. 12, 2007 and is a Continuation-in-Part of U.S. application Ser. No. 11/791,247, filed on May 21, 2007, which claims the benefit of and priority to each of the following applications: International Application Serial No. PCT/US05/42043, filed Nov. 21, 2005; U.S. application Ser. No. 11/791,238, filed on Nov. 28, 2007 which claims the benefit of and priority to International Application Serial No. PCT/US05/42041, filed Nov. 21, 2005; U.S. application Ser. No. 11/791,244, filed on Oct. 18, 2007 which claims the benefit of and priority to International Application Serial No. PCT/US05/42042, filed Nov. 21, 2005; and U.S. application Ser. No. 11/791,237, filed on Oct. 18, 2007 which claims the benefit of and priority to International Application Serial No. PCT/US05/42051, filed Nov. 21, 2005, the entire contents of each of the above-noted applications which being incorporated herein by reference.

BACKGROUND

1. Technical Field

The present disclosure relates to fluid dispensers and containers and, more particularly, to bottles and the like which may be filled from the bottom thereof and to systems for charging the bottom fillable bottles with a fluid or the like.

2. Background of Related Art

Typically, bottles are filled with fluid through an opening formed near or at a top end thereof. The opening may then be closed with a cap which must first be removed in order to dispense the fluid from within the bottle, or closed with a dispensing cap which may be selectively opened in order to dispense the fluid from within the bottle without the dispensing cap being removed therefrom. The dispensing cap facilitates and expedites access to the fluid and dispensing of the fluid from the bottle.

However, the process of filling and closing the bottle is still relatively slow and inefficient. In order to fill the bottle, the cap must be removed, the bottle filled with the fluid, and the cap replaced on the bottle to close the bottle and prevent loss of the fluid therefrom.

A need exists for bottles which may be quickly and easily filled or charged with fluid, with or without removing a cap therefrom.

A need also exists for systems for charging and/or recharging empty or spent bottles with fluid in a facile and efficient manner.

SUMMARY

Bottle assemblies and the like, which may be filled from the bottom thereof, are provided.

According to one aspect of the present disclosure, a bottle assembly is provided and includes a body portion defining a cavity therein; a top lid assembly selectively connectable to an upper end of the body portion, the top lid assembly includes a selectively deployable and retractable spout, a spout bottom lid configured and adapted to selectively engage the upper end of the body portion; and a resilient tube having a first end fluidly connected to a proximal portion of the spout and a second end fluidly connected to an elbow which is fluidly connected to a port formed in a bottom surface of the spout bottom lid, the resilient tube having a lumen therethrough, wherein the lumen is occluded when the spout is retracted and the resilient tube is kinked, and wherein the lumen is opened when the spout is deployed and the resilient tube is not kinked; a trigger assembly operatively associated with the top lid assembly for selectively moving the spout between a deployed and a retracted condition; and a bottom lid assembly selectively connectable to a bottom end of the body portion, the bottom lid assembly including a valve assembly configured and adapted to open and close a fluid path into the cavity of the body portion.

The body portion may include an upper rim configured and adapted to selectively engage a top lid assembly and a bottom rim configured and adapted to selectively engage a bottom lid assembly.

The top lid assembly may be selectively connectable to the upper rim of the body portion. The top lid assembly may include a spout bottom lid configured and adapted to selectively engage the upper rim of the body portion; a spout cover supported on the spout bottom lid, wherein the spout cover defines a window therein; a spout lid operatively connected to the spout cover for selective closing of the window formed in the spout cover; a cam member positioned between the spout bottom lid and the spout cover, wherein the cam member defines a pair of spaced apart cam slots formed therein for guiding a spout out of and into the spout cover; a spout operatively associated with the cam member, wherein the spout includes a pair of guide pins extending therefrom for operative engagement in the cam slots of the cam member, and wherein the spout defines a lumen therethrough; and a straw stand defining a lumen therethrough, wherein the straw stand includes a first end pivotally supported on the spout bottom lid and a second end pivotally connected to a second end of the spout.

The spout and the straw stand may have a first position in which the spout is retracted into the spout cover and the lumen of the spout and the lumen of the straw stand are out of fluid alignment with one another, and a second position in which the spout is extended from the spout cover and the lumen of the spout and the lumen of the straw stand are in fluid alignment with one another, wherein when the spout and straw stand are in the second position, the lumen of the straw stand is fluidly aligned with a port formed in the spout bottom lid.

The top lid assembly may also include a lid lock having a tab for selectively locking the spout in either a deployed or retracted position.

The trigger assembly may be operatively supported associated with the top lid assembly for actuating the spout between the first and second positions. The trigger assembly may include a spout driver having a pair of tines extending from a first end thereof and pivotally connected to the straw stand and a second end extending out of the top lid assembly. Accordingly, in use, movement of the spout driver in a first direction may actuate the straw stand to extend the spout from the spout cover, and movement of the spout driver in a second direction may actuate the straw stand to retract the spout into the spout cover. The trigger assembly may be biased to a position which maintains the spout and straw stand in the first position.

The bottom lid assembly may be selectively connectable to the bottom rim of the body portion. The bottom lid assembly may include a bottom cover defining a central opening formed therein, wherein the bottom cover is configured and adapted to operatively engage the bottom rim of the body portion in a fluid tight manner; and a one-way valve assembly supported in the central opening of the bottom cover.

The one-way valve assembly may include a valve insert positioned within the central opening of the bottom cover, wherein the valve insert defines an annular inner wall bounding an opening therein; an elastomeric valve diaphragm operatively disposed over the valve insert, wherein the valve diaphragm defines an aperture formed therein, wherein the aperture is located radially outward of the annular inner wall of the valve insert; and wherein the valve diaphragm has a first position which is in contact with the annular inner wall of the valve insert and a second position which is spaced a distance from the annular inner wall of the valve insert; and a valve cap operatively connected to an inner surface of the bottom cover and over the central opening, wherein the valve cap defines at least one aperture formed in an upper surface thereof.

BRIEF DESCRIPTION OF THE DRAWINGS

The accompanying drawings, which are incorporated in and constitute a part of this specification, illustrate embodiments of the disclosure and, together with a general description of the disclosure given above and the detailed description of the embodiments given below, serve to explain the principles of the disclosure, wherein:

FIG. 1 is a longitudinal cross sectional view, with parts separated, of a portion of a bottle and nipple assembly of a charging system, in accordance with an embodiment of the present disclosure;

FIG. 2 is a longitudinal cross-sectional view of the portion of the bottle of FIG. 1, illustrating the nipple assembly connected to the bottle;

FIG. 3 is an exploded perspective view of the nipple assembly of FIGS. 1 and 2;

FIG. 4 is an exploded perspective view of a valve assembly of the charging system, in accordance with an embodiment of the present disclosure;

FIG. 5 is a longitudinal cross-sectional view of the valve assembly of FIG. 4 shown in an closed condition;

FIG. 6 is a longitudinal cross-sectional view of the valve assembly of FIGS. 4 and 5, shown in an open condition;

FIG. 31 is a side elevational view of the bottle assembly of FIG. 30;

FIG. 32 is a longitudinal, cross-sectional view of the bottle assembly of FIGS. 30 and 31, illustrating the top lid assembly thereof in a closed condition;

FIG. 33 is a longitudinal, cross-sectional view of the top lid assembly of FIG. 32 in an open condition;

FIG. 53 is a longitudinal, cross-sectional view of the top lid assembly of FIG. 52 in an open condition;

FIG. 54 is an exploded perspective view of the top lid assembly of FIGS. 52 and 53;

FIG. 55 is a perspective view of a spout cover of the top lid assembly of FIGS. 52-54;

FIG. 56 is a perspective view of a spout lid of the top lid assembly of FIGS. 52-54;

FIG. 57 is a perspective view of a spout of the top lid assembly of FIGS. 52-54;

FIG. 58 is a perspective view of a snap guide of the top lid assembly of FIGS. 52-54;

FIG. 79 is a side elevational view of the spout trigger of the top lid assembly of FIGS. 71-74;

FIG. 80 is a perspective view of a locking mechanism of the top lid assembly of FIGS. 71-74;

FIG. 81 is an exploded perspective view of the bottom lid assembly of the bottle assembly of FIGS. 68-70;

DETAILED DESCRIPTION OF THE EMBODIMENTS

Figure 7:
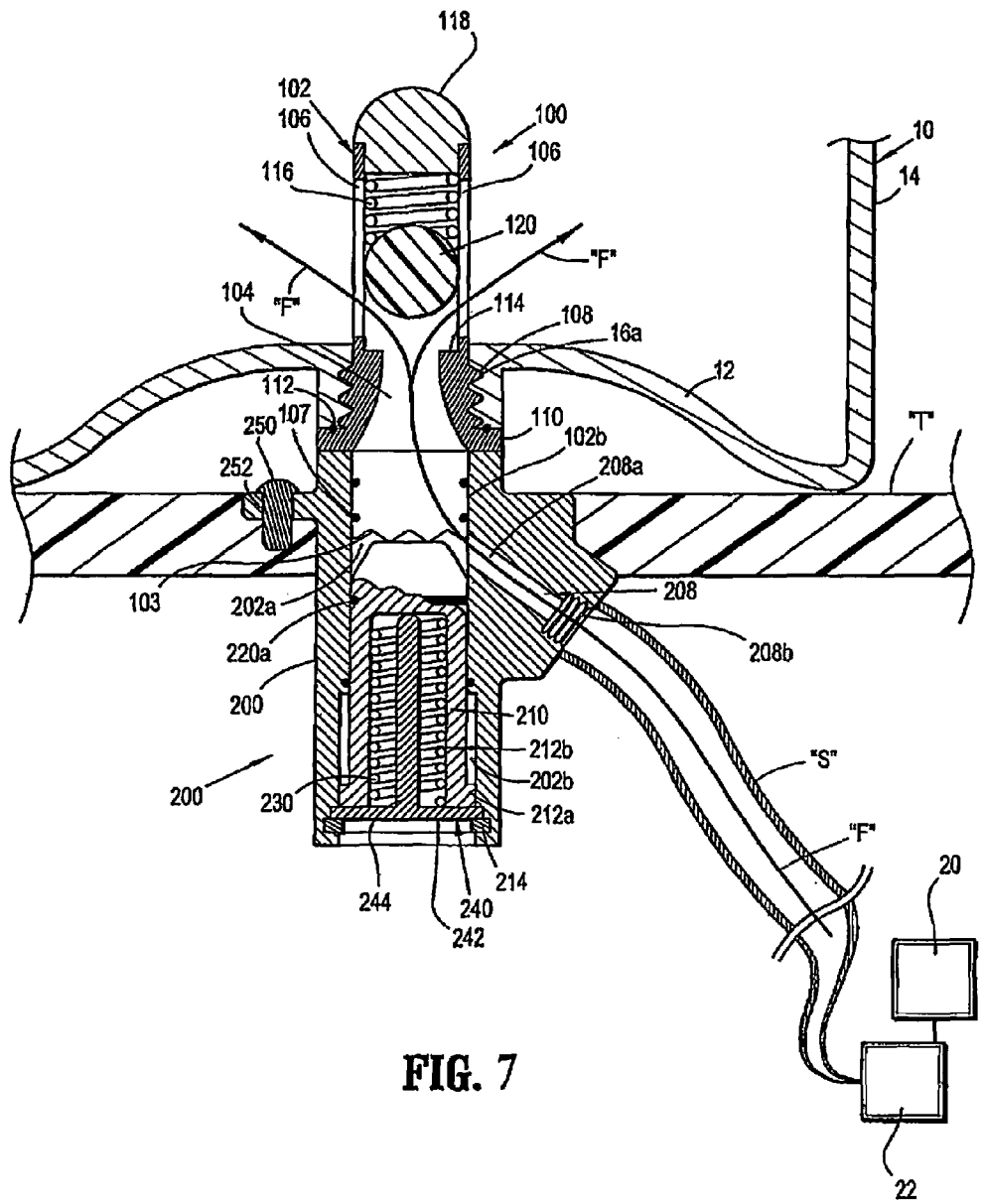
FIG. 7 is a longitudinal cross-sectional view, illustrating the connection of the bottle of FIGS. 1 and 2 to the valve assembly of FIGS. 4-6, in order to charge or recharge the bottle with a fluid.

Embodiments of the presently disclosed fluid charging or recharging system will now be described in detail with reference to the drawing figures wherein like reference numerals identify similar or identical elements. As used herein and as is traditional, the term "distal" refers to that portion which is furthest from the user while the term "proximal" refers to that portion which is closest to the user.

With reference to FIGS. 1-7, a charging or recharging system, in accordance with the present disclosure, is shown and described. The charging system includes a nipple assembly 100, as seen in FIGS. 1-3, and a valve assembly 200, as seen in FIGS. 4-6.

Referring now to FIGS. 1-3, a detailed discussion of nipple assembly 100 is provided. As seen in FIGS. 1-3, nipple assembly 100 is configured for selective attachment or connection to a bottle 10 or the like. Desirably, nipple assembly 100 is connected to and through a bottom surface 12 of bottle 10, however, it is envisioned and within the scope of the present disclosure that nipple assembly 100 may be connected to and through a side surface 14 of bottle 10. Nipple assembly 100 is connected to bottle 10 by connecting structure 108, here shown as a thread, which mates with complementary connecting structure 16a provided in a port 16 formed in bottom surface 12 of bottle 10. While connecting structures 108 and 16a are shown as threads, it is envisioned and within the scope of the present disclosure for the connecting structure to be any cooperating mating elements, such as, for example, bayonet-type connecting structure and the like. It is further envisioned that nipple assembly 100 may be fixedly secured to bottle 10, such as, for example, by welding, gluing and the like.

With continued reference to FIGS. 1-3, nipple assembly 100 includes a cylindrical body portion 102 defining a lumen 104 therethrough and at least one, preferably, a plurality of apertures 106 formed therearound. Body portion 102 includes connecting structure 108, desirably provided at a location proximal of apertures 106, for engaging connecting element 16a of port 16. Nipple assembly 100 includes an external flange 110 extending from body portion 102 which functions as a stop to prevent nipple assembly 100 from passing completely through port 16 and into bottle 10. A gasket or O-ring 112 may be positioned on a distal surface 110a of flange 110. Gasket 112 functions to create a fluid-tight seal between flange 110 of nipple assembly 100 and port 16 of bottle 10.

Nipple assembly 100 further includes a stopper 120, in the form of a sphere or ball, dimensioned to slidably sit within lumen 104 of body portion 102. Body portion 104 includes an internal flange or shoulder 114 (see FIG. 7) against which stopper 120 engages or contacts. Accordingly, in use, when stopper 120 is engaged against shoulder 114, lumen 104 of body portion 102 is closed, preventing passage of fluid therethrough. Additionally, when stopper 120 is spaced a distance from shoulder 114, lumen 104 of body portion is open, allowing for the passage of fluid therethrough. Stopper 120 is biased against shoulder 114 (i.e., to the closed condition) by a biasing member 116 (e.g., a compression spring or the like). Biasing member 116 is desirably positioned between stopper 120 and a plug or cap 118 connected to a distal end of body portion 102.

Desirably, a proximal end 102b of body portion 102 extends beyond external flange 112 to define a stem or the like. Stem 102b includes a series of undulations 103 formed around a proximal edge thereof. At least one gasket or O-ring 107 is provided around stem 102b in order to form a fluid-tight seal with valve assembly 200, as will be described in greater detail below.

Desirably, a cap 150 may be provided which snap-fits or friction fits onto stem 102b of nipple assembly 100.

Turning now to FIGS. 4-6, a detailed discussion of valve assembly 200 is provided. As seen in FIGS. 4-6, valve assembly 200 includes a body portion 202 defining a through-bore 204 therethrough. Through-bore 204 defines an open distal end 206. As seen in FIGS. 4 and 5, through-bore 204 includes a distal portion 204a having a first diameter and a proximal portion 204b having a second diameter, larger than the first diameter of distal portion 204a. A shoulder 204c is defined between distal portion 204a and proximal portion 204b of through-bore 204. Open distal end 206 is dimensioned to receive stem 102b of nipple assembly 100.

Body portion 202 further includes a channel or conduit 208 extending through a side thereof and in fluid communication with through-bore 204. Desirably, a distal end 208a of channel 208 is in close proximity to distal end 206 of through-bore 204. A proximal end 208b of channel 208 may include connecting structure 209 for connection with a free end of a fluid supply line "S" (see FIG. 7).

With continued reference to FIGS. 4-6, valve assembly 200 further includes a plunger 210 slidably disposed in through-bore 204 of body portion 202. Plunger 210 desirably includes an annular flange 212a extending radially outward therefrom which engages shoulder 204c of through-bore 204 and limits the distance plunger 210 travels in a distal direction. Desirably, valve assembly 200 includes a stop 214, in the form of a spring clamp or the like, selectively receivable in a complementary annular groove 216 formed in through-bore 204. Stop 214 limits the distance plunger 210 travels in a proximal direction.

Valve assembly 200 further includes a first gasket or O-ring 220a disposed in an annular groove formed in plunger 210. Desirably, first gasket 220a is positioned near a distal end of plunger 210. Valve assembly 200 includes a second gasket or O-ring 220b disposed in an annular groove formed in through-bore 204. Desirably, second gasket 220b is positioned distally of shoulder 204c. First and second gaskets 220a, 220b create a substantially fluid-tight seal between the outer surface of plunger 210 and the inner surface of through-bore 204.

As seen in FIG. 4, valve assembly 200 has a first or closed condition in which plunger 210 is positioned over distal end 208a of channel 208 and blocks or prevents fluid from flowing therefrom. Valve assembly 200 is in the closed condition when first gasket 220a of plunger 210 is positioned distally of distal end 208a of channel 208. Valve assembly 200 has a second or open condition in which plunger 210 is positioned proximally of distal end 208a of channel 208 to expose distal end 208a of channel 208 and permit fluid to flow from channel 208. Valve assembly 200 is in the open condition when first gasket 220a of plunger 210 is positioned proximally of distal end 208a of channel 208.

Desirably, plunger 210 is biased in such a manner so as to maintain valve assembly 200 in the closed condition. Any number of methods may be used to bias plunger 210 and thereby close valve assembly 200, such as, for example, pneumatic means, electrical means, and mechanical means. By way of example only, and in no way to be considered limiting, a biasing member 230, in the form of a compression spring, may be provided between a distally facing surface of body portion 202 of valve assembly 200 and a proximally facing surface of plunger 210. In particular, as seen in FIGS. 4-6, valve assembly 200 may include a guide member 240 having a plate 242 configured for seating in an annular shoulder 204d formed at a proximal end of through-bore 204, and a shaft 244 extending from plate 242 and into through-bore 204. Plunger 210 desirably includes a bore or recess 212b formed therein and extending substantially the entire length therethrough. Desirably, spring 230 is disposed about shaft 244 of guide member 240 and within bore 212b of plunger 210. Desirably, plate 242 of guide member 240 rests on stop 214.

Turning now to FIG. 7, a method of using the charging assembly of the present disclosure is shown and described. As seen in FIG. 7, valve assembly 200 may be mounted to surface or table top "T" by screws 250 extending through an annular flange 252 of body portion 202. Desirably, flange 252 of body portion is positioned such that a distal end 202a of body portion 202 extends above the surface of table top "T" and proximal end 208b of channel 208 is located below the surface of table top "T". A fluid supply line "S" is connected at a first end to channel 208 and at a second end to a source of fluid 20. Preferably, the source of fluid is under pressure.

Initially, valve assembly 200 is in the closed condition, wherein plunger 210 blocks or occludes channel 208 and prevents fluid "F" from being dispensed from valve assembly 200. An empty or substantially empty bottle 10 is then placed on valve assembly 200 such that stem 102b of body portion 102 of nipple assembly 100 is inserted into open distal end 206 of body portion 202 of valve assembly. As bottle 10 is placed on the surface of table top "T", stem 102b of nipple assembly 100 presses on plunger 210 of valve assembly 200 and urges or moves plunger 210, against the bias of spring 230, in a proximal direction. Desirably, as seen in FIG. 7, when bottle 10 is fully placed on valve assembly 200 (i.e., bottom surface 12 of bottle 10 rests on the top surface of table top "T"), stem 102b of nipple assembly 100 has displaced plunger 210 of valve assembly 200 by an amount sufficient to expose distal end 208a of channel 208, thereby opening valve assembly 200.

With plunger 210 depressed and distal end 208a of channel 208 exposed, fluid "F" flows through fluid supply line "S", through conduit 208 and into lumen 104 of body portion 102 of nipple assembly 100. In particular, fluid "F" enters lumen 104 through the spaces defined between undulations 103 of stem 102b and the surface of plunger 210 and exits lumen 104 through apertures 106 formed in body portion 102 of nipple assembly 100. Desirably, gaskets 107 create at least a substantially fluid-tight seal between the outer surface of stem 102b and the inner surface of through-bore 204.

As fluid "F" enters lumen 104, the force of the flow of fluid "F" moves stopper 120, against the bias of spring 116, in a distal direction thereby opening lumen 104 and allowing fluid "F" to enter and charge or recharge bottle 10. When the desired amount or volume of fluid "F" has been dispensed into bottle 10, bottle 10 is lifted off of valve assembly 200 and table top "T" to close valve assembly 200 and stop the flow of fluid "F" therefrom.

In particular, as bottle 10 is lifted off of table top "T" and, more particularly, valve assembly 200, stem 102b of nipple assembly 100 is withdrawn from through-bore 204 of body portion 202 of valve assembly 200. As stem 102b of nipple assembly 100 is withdrawn, the biasing force of spring 230, moves plunger 210 in a distal direction. Once first gasket 220a of plunger 210 crosses distal end 208a of channel 208, channel 208 is occluded (i.e., valve assembly 200 is closed) and fluid flow therethrough is stopped. Once the flow of fluid "F" is stopped the force of the flow of fluid "F", acting on stopper 120, is stopped and the biasing force of spring 116 moves stopper 120 into contact with shoulder 114 and closes lumen 104 of nipple assembly 100. With lumen 104 of nipple assembly 100 closed, fluid "F" is prevented from leaking or backing out of bottle 10.

When using the charging system of the present disclosure, bottle 10 must be vented. In other words, either an open container (i.e., the top of bottle 10 must be open or un-capped) or if the container is closed, the container must have an air vent or the like provided near an upper end thereof or the cap of the container must have an opening or be vented.

It is envisioned and within the scope of the present disclosure, that fluid "F" supplied by source 20 must first pass through a filter 22 or the like to thereby remove particles, impurities and/or contaminants.

Figure 8:
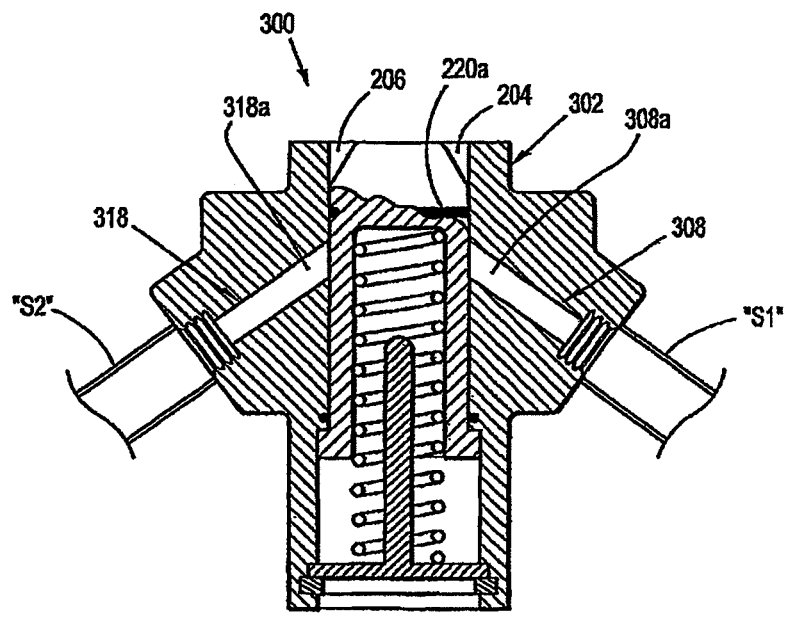
FIG. 8 is a longitudinal cross-sectional view of a valve assembly, according to an alternate embodiment of the present disclosure, shown in a closed condition.
Figure 9:
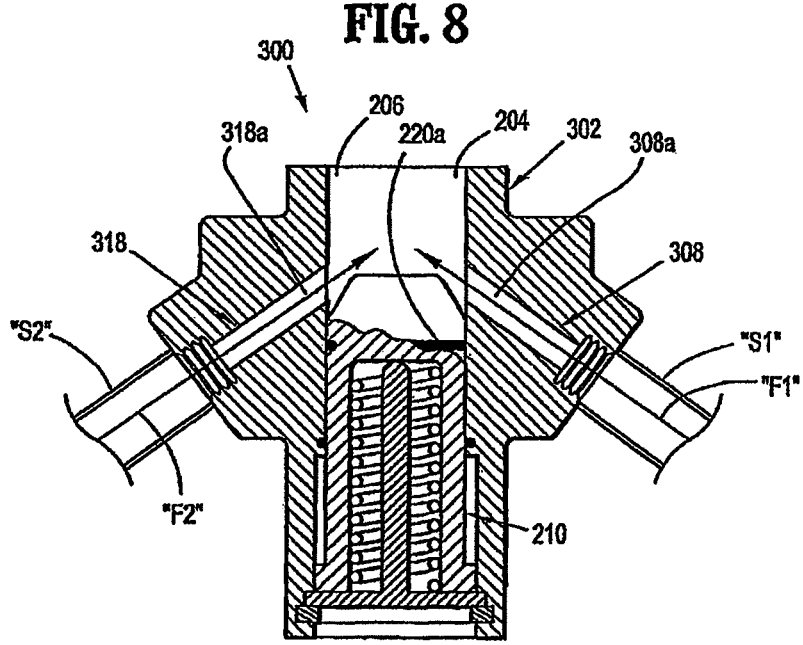
FIG. 9 is a longitudinal cross-sectional view of the valve assembly of FIG. 8, shown in an open condition.

Turning now to FIGS. 8 and 9, a valve assembly, in accordance with another embodiment of the present disclosure, is generally designated as 300. Valve assembly 300 is substantially similar to valve assembly 200 and will only be described in detail to the extent necessary to identify differences in construction and operation.

As seen in FIGS. 8 and 9, body portion 302 of valve assembly 300 includes a plurality of conduits or channels extending through a side thereof and in fluid communication with through-bore 204 thereof. For example, and in no way to be considered as limiting, valve assembly 300 includes a first conduit or channel 308 extending through a side of body portion 302 and in fluid communication with through-bore 204 thereof, and a second conduit or channel 318 extending through a side of body portion 302 and in fluid communication with through-bore 204 thereof. Desirably, first conduit 308 is spaced or offset a radial distance from second conduit 318.

In this manner, at least two separate fluid supply lines, for delivering two different fluids, may be connected to first and second conduits 308, 318. In particular, a first fluid supply line "S1" may be connected to first conduit 308 and a second fluid supply line "S2" may be connected to second conduit 318. Accordingly, during use, when valve assembly 300 is in an open condition, two fluids come together and mix with one another in through-bore 204 of valve assembly 300.

As seen in FIG. 8, valve assembly 300 has a first or closed condition in which plunger 210 is positioned over distal ends 308a, 318a of first and second conduits 308, 318, respectively, and blocks or prevents fluid from flowing therefrom. In particular, valve assembly 300 is in the closed condition when first gasket 220a of plunger 210 is positioned distally of distal ends 308a, 318a of first and second conduits 308, 318. Valve assembly 300 has a second or open condition in which plunger 210 is positioned proximally of distal ends 308a, 318a of first and second conduits 308, 318 to expose distal ends 308a, 318a of first and second conduits 308, 318 and permit a first fluid "F1" and a second fluid "F2" to flow from respective first and second conduits 308, 318. Valve assembly 300 is in the open condition when first gasket 220a of plunger 210 is positioned proximally of distal ends 308a, 318a of first and second conduits 308, 318.

When valve assembly 300 is in the open condition, first and second fluids "F1, F2" enter through-bore 204, are mixed together, and are forced out open distal end 206 of through-bore 204.

An exemplary use of valve assembly 300 is for the filling of bottle 10 with a soft drink or the like. The soft drink is mixed by valve assembly 300 wherein first fluid "F1" is carbonated water or seltzer, and second fluid "F2" is a syrup of a desired soft drink flavoring, for example, cola, root beer and the like. It is further envisioned that valve assembly 300 may be used for the mixing and dispensing of alcoholic or non-alcoholic mixed drinks, juices, sports drinks, other flavored beverages and the like. It is envisioned and within the scope of the present disclosure for the fluid to include and not be limited to water, carbonated water, juice, tea, milk, coffee, syrups (e.g., flavored syrups), alcohols, and the like.

Figure 10:
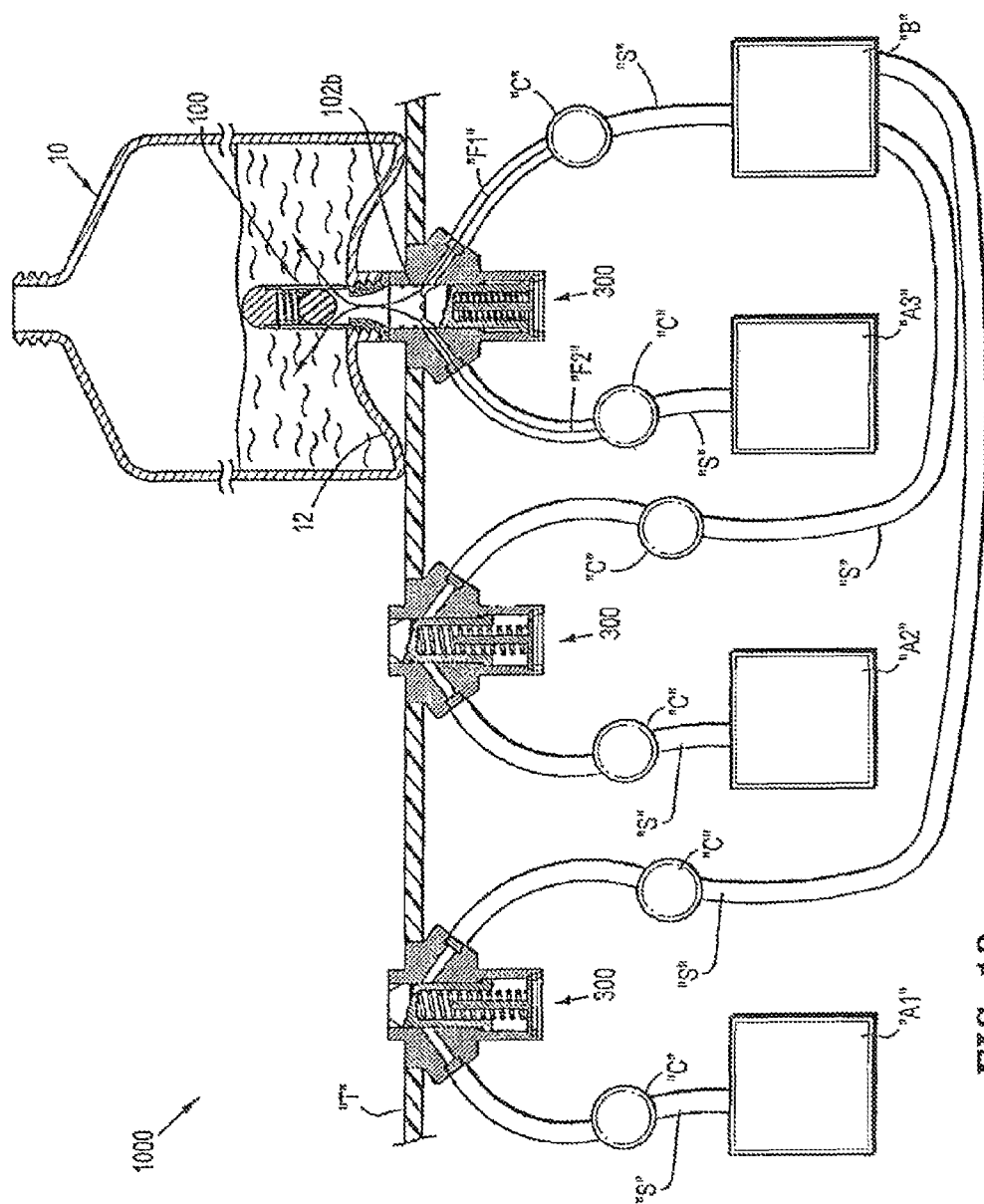
FIG. 10 is a schematic cross-sectional view of a charging/recharging system according to an embodiment of the present disclosure, illustrating the filling of a bottle with fluid.

Turning now to FIG. 10, a charging/recharging system, according to an embodiment of the present disclosure, is generally designated as 1000. Desirably, charging system 1000 includes a plurality of valve assemblies 300 mounted beneath a table top "T" or the like. Charging/recharging system 1000 further includes a nipple assembly 100 mounted to a bottom surface 12 of a bottle 10.

As seen in FIG. 10, each valve assembly 300 is fluidly connected to at least two sources of fluid. Desirably, each valve assembly 300 is fluidly connected to a discrete or unique source of fluid "A1-A3", and a common source of fluid "B". Valve assemblies 300 are connected to sources of fluid "A1-A3 and B" via fluid supply lines "S".

In FIG. 10, bottle 10 has been placed onto valve assembly 300 such that stem 102b of nipple assembly 100 is inserted into open distal end 206 (see FIG. 9) of valve assembly 300, as described in greater detail above. With stem 102b of nipple assembly 100 fluidly connected to valve assembly 300, a first fluid "F1", from common fluid source "B", is communicated to through-bore 204 (see FIG. 9) of valve assembly 300, and a second fluid "F2", from third fluid source "A3", is also communicated to through-bore 204. The combined or mixed fluid "F1 and F2" are then dispensed into bottle 10 in a manner as described above.

By way of example only, unique sources of fluid "A1-A3" may include syrups of differing flavors, such as, for example, cola, root beer, lemon-lime, orange, grape, cream, vanilla, cherry and the like. Meanwhile, common source of fluid "B" may include carbonated water, seltzer and the like. In this manner, bottle 10 may be filled with a desired soft drink by placing bottle 10 on the valve assembly associated with the desired soft drink flavor. It is further envisioned that bottle 10 may be filled with different combinations of soft drinks (e.g., cherry and vanilla, orange and vanilla, and the like).

In one embodiment, as seen in FIG. 10, charging/recharging system 1000 may include heat exchanging elements "C" (e.g., coolers or heaters) provided in each fluid supply line "S" to effect and/or alter the temperature of the fluid traveling therethrough. It is also envisioned that each source of fluid "A1-A3 and B" may be maintained in a climate controlled environment (e.g., a cooler or the like). In either manner, the fluid being dispensed by valve assembly 300 may be chilled prior to dispensing into bottles 10.

Optionally, the charging/recharging system 1000 may include a flavor mixing station (not shown), where a flavor component adding apparatus or unit, such as a flavor injection conduit adds a selected flavor component to the base fluid A1-A3. In one embodiment, a multi-head conduit may be used in order for the flavor conduit to retain flexibility during the operation for changing flavors, as needed.

Furthermore, in another embodiment more than one particular flavored beverage at a time, more than one conduit may be used with each flavor injection device distributing a different flavor. Additionally, other ingredients, for example acidulants or other heat sensitive ingredients used in producing, for example, isotonic flavored beverages, may be used by injecting them from supplies by additional conduits. The injection is preferably done under pressure to ensure more complete mixing of the flavor and additives with the beverage base fluid. However, other methods of injecting the flavor or additives are also possible, for example, by utilizing a Venturi injector. The flavor may be pumped through a narrow tube protruding to the center of the transferring base beverage fluid. The tube may positioned at a right angle for easy access and maintenance. If the feed rate of the flavor or other additives injected into the unflavored base beverage fluid is at a high enough level, enough turbulence or eddy currents may be generated at and after the injection point so that no additional mixing is required, however a dispersion mechanism may also be utilized.

The flavor component may include a flavoring compound, syrup or composition and also may include a color or other desired additive material such as proteins, vitamins, micronutrients, herbs, antioxidants, and the like. The flavor components may be retained in sterile containers or tanks prior to injection into the conduits to avoid deterioration if heated to pasteurizing temperatures.

Although the invention is described in the preferred form as having liquid flavor or micronutrient additives injected into the base beverage fluid stream, other modifications are possible. For example, injecting the flavor in solid form is contemplated by the invention. This may be performed by using an air lock mechanism and utilizing the flavor/micronutrient in tablets, or by injecting a flavoring by metered doses as a powder directly into the fluid stream of the base beverage fluid as it flows through the conduit. In another aspect, the flavor may be automatically or selectively added to the base beverage fluid.

Turning now to FIGS. 11-28, a fluid dispensing system and method is shown and described for charging and/or re-charging bottles and the like. According to the present disclosure, there is provided a fluid dispensing system including a bottle assembly 500; a charging valve assembly 600 configured for selective operative fluid engagement with bottle assembly 500; and a supply assembly 700 fluidly connected to charging valve assembly 600 for supplying fluid to bottle assembly 500. Generally, during use, the fluid dispensing system will provide fluid (e.g., chilled, heated, filtered or the like) from supply assembly 700, through charging valve assembly 600, to bottle assembly 500 and the like. The fluid dispensing system provides a fast, convenient manner by which to fill bottles and the like with desired fluids.

Referring to FIGS. 11-18, a bottle assembly, fillable from the top or the bottom, in accordance with the present disclosure, is generally shown as 500. As will be described in greater detail below, bottle assembly 500 includes a removable check valve in a bottom thereof for interfacing with charging valve assembly 600, and a self-retracting drinking spout which opens and extends upward when a lever is actuated. Desirably, when the lever is released the drinking spout will fully retract into the cover.

As seen in FIGS. 11-18, bottle assembly 500 includes a vessel or body portion 502 defining a cavity 502a for receiving fluid therein. Bottle assembly 500 includes a cover assembly 510 removably securable to an upper end thereof via a threaded engagement.

Cover assembly 510 includes a lid member 512 configured and adapted to removably, selectively engage and cooperate with an upper rim 504a of body portion 502 of bottle assembly 500. Cover assembly 510 further includes a spout cover 514 operatively secured to lid member 512. Spout cover 514 includes an opening or window 514a through which a spout will project and/or extend.

Figure 11:
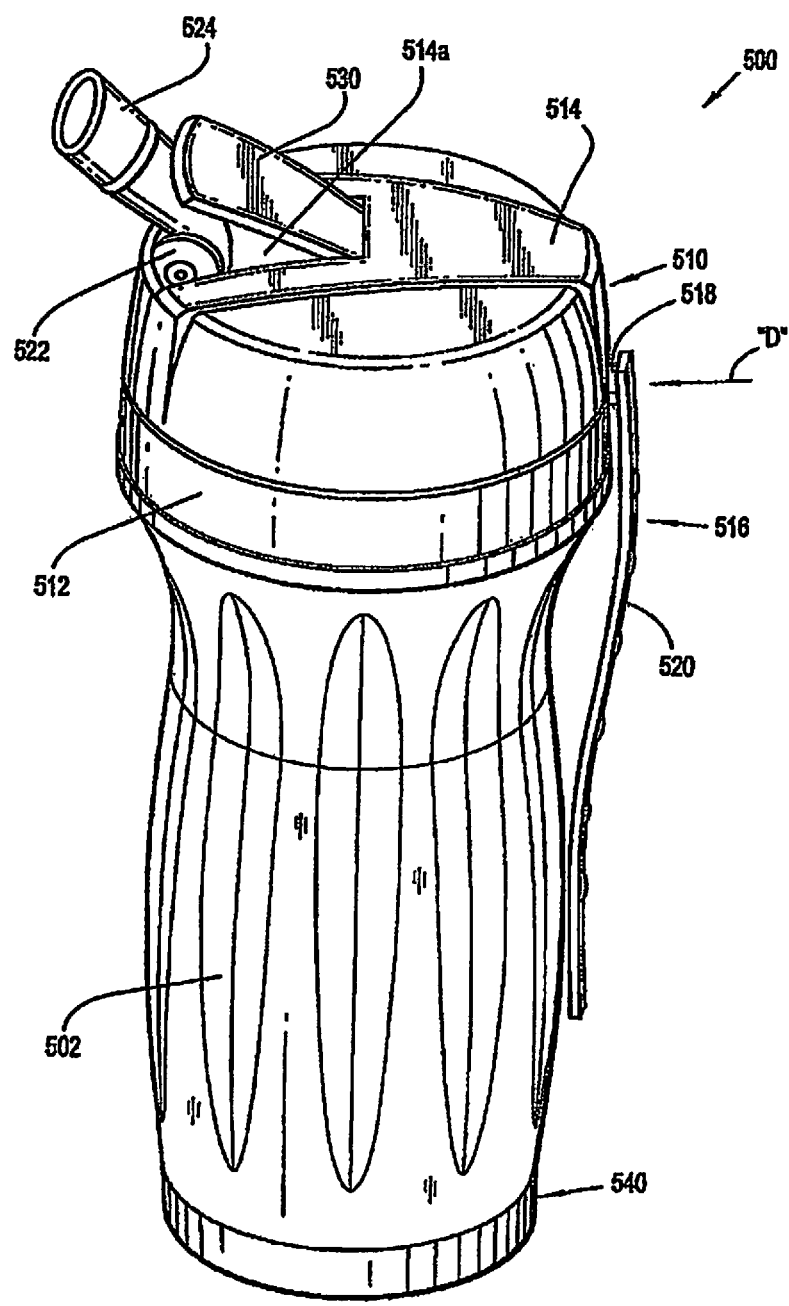
FIG. 11 is a perspective view of a bottom fillable bottle assembly in accordance with another embodiment of the present disclosure, illustrating the bottle assembly in an open condition.
Figure 12:
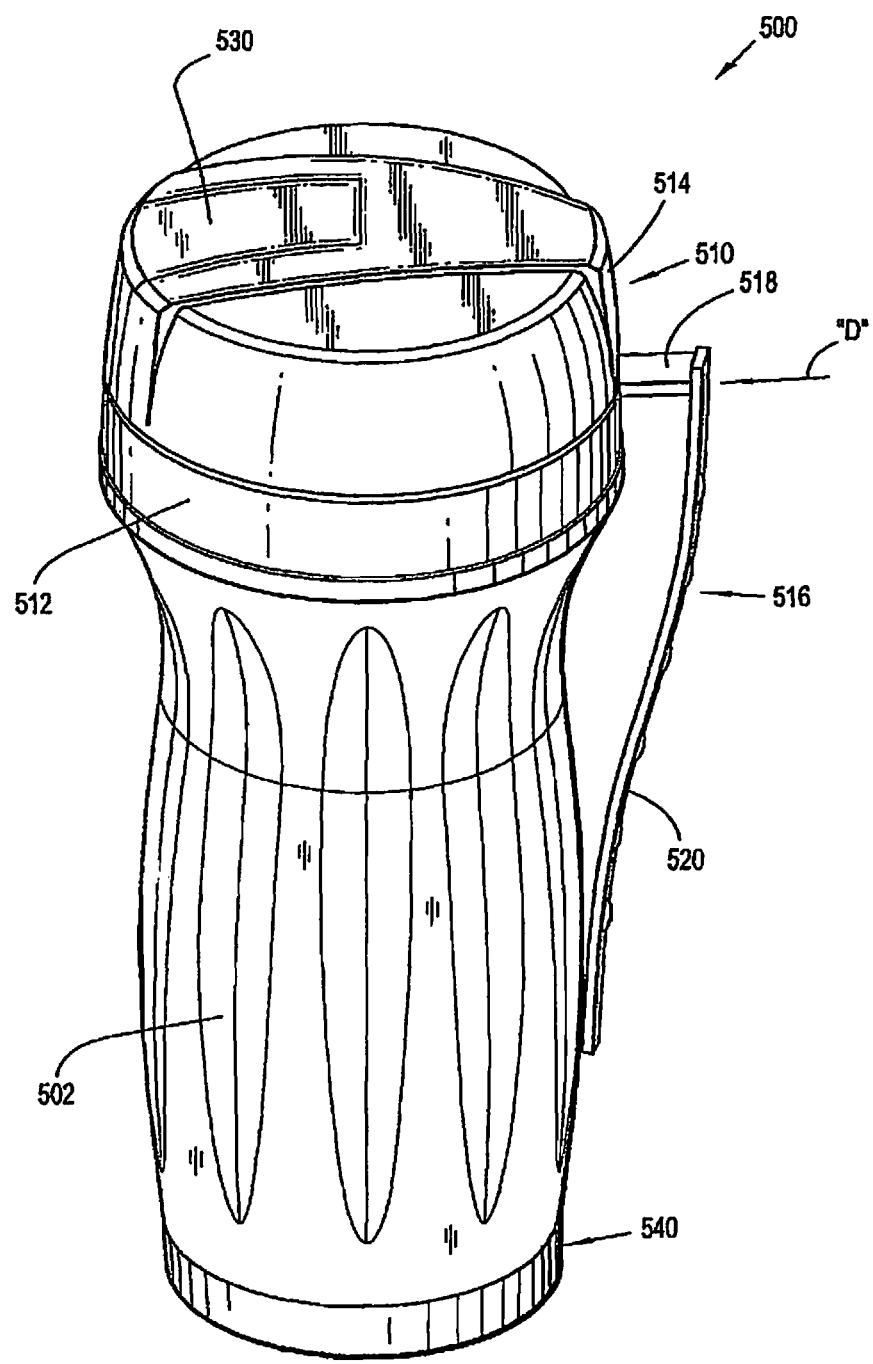
FIG. 12 is a perspective view of the bottle assembly of FIG. 11, shown in a closed condition.

Cover assembly 510 further includes a spout trigger or lever 516 operatively supported on lid member 512. Trigger 516 includes a slide arm 518 slidably supported in lid member 512 and a resilient leg 520 extending at an angle from slide arm 518 and configured and dimensioned to contact an outer surface of body portion 502 when cover assembly 510 is attached to body portion 502. As will be described in greater detail below, trigger 516 has a first or closed position (see FIG. 11), in which, a spout 524 is maintained in spout cover 514, and a second or opened position, in which, spout 524 projects or extends from an opening 514a in spout cover 514. In particular, when trigger 516 is in the first or closed position, as seen in FIG. 11, in order to deploy spout 524, trigger 516 is moved in the direction of arrow "D" (i.e., slide arm 518 is moved toward body portion 502) thereby biasing resilient leg 520 against body portion 502. When use of bottle assembly 500 is complete, in order to retract spout 524, trigger 516 is released and the bias of resilient leg 520 moves slide arm 518 in a direction opposite to arrow "D", thus retracting spout 524 into spout cover 514.

Figure 18:
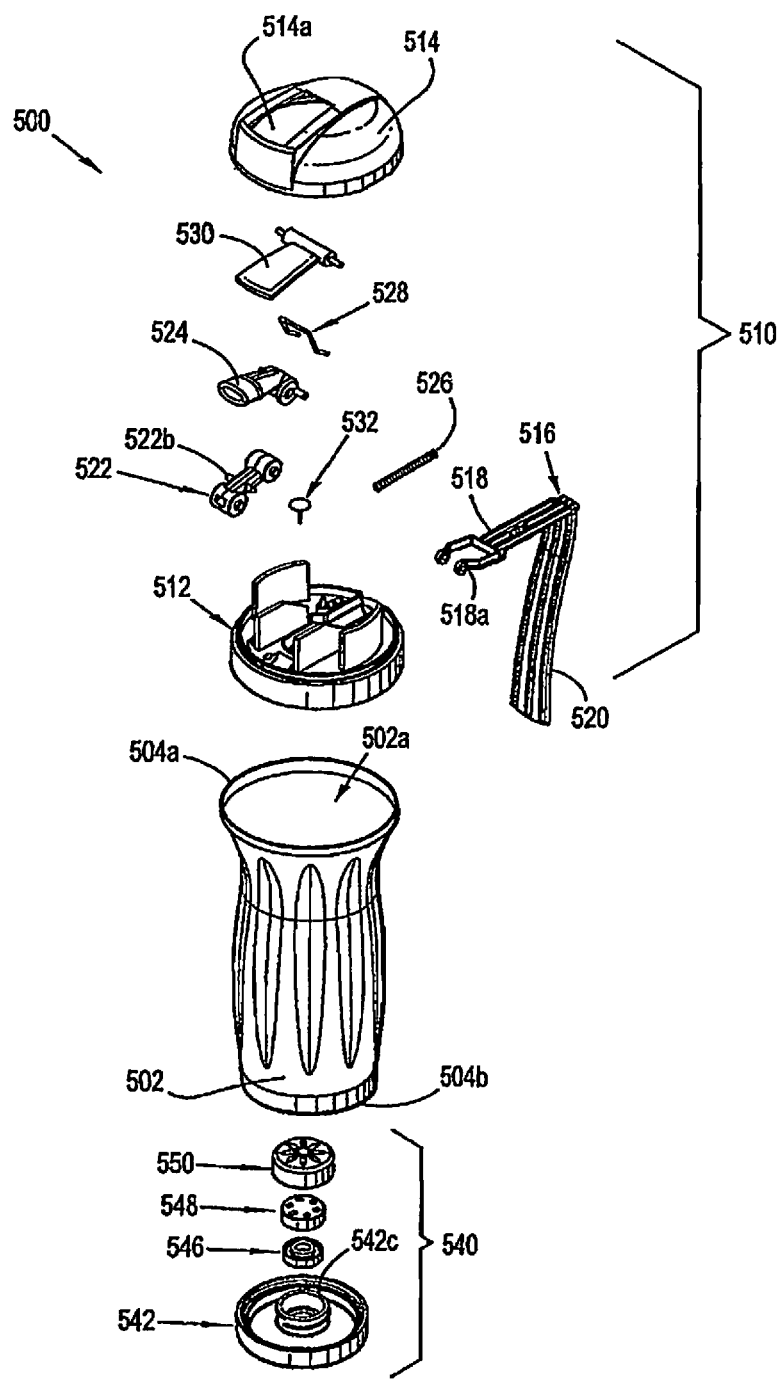
FIG. 18 is a perspective view, with parts separated, of the bottle assembly of FIGS. 11-17.
Figure 19:
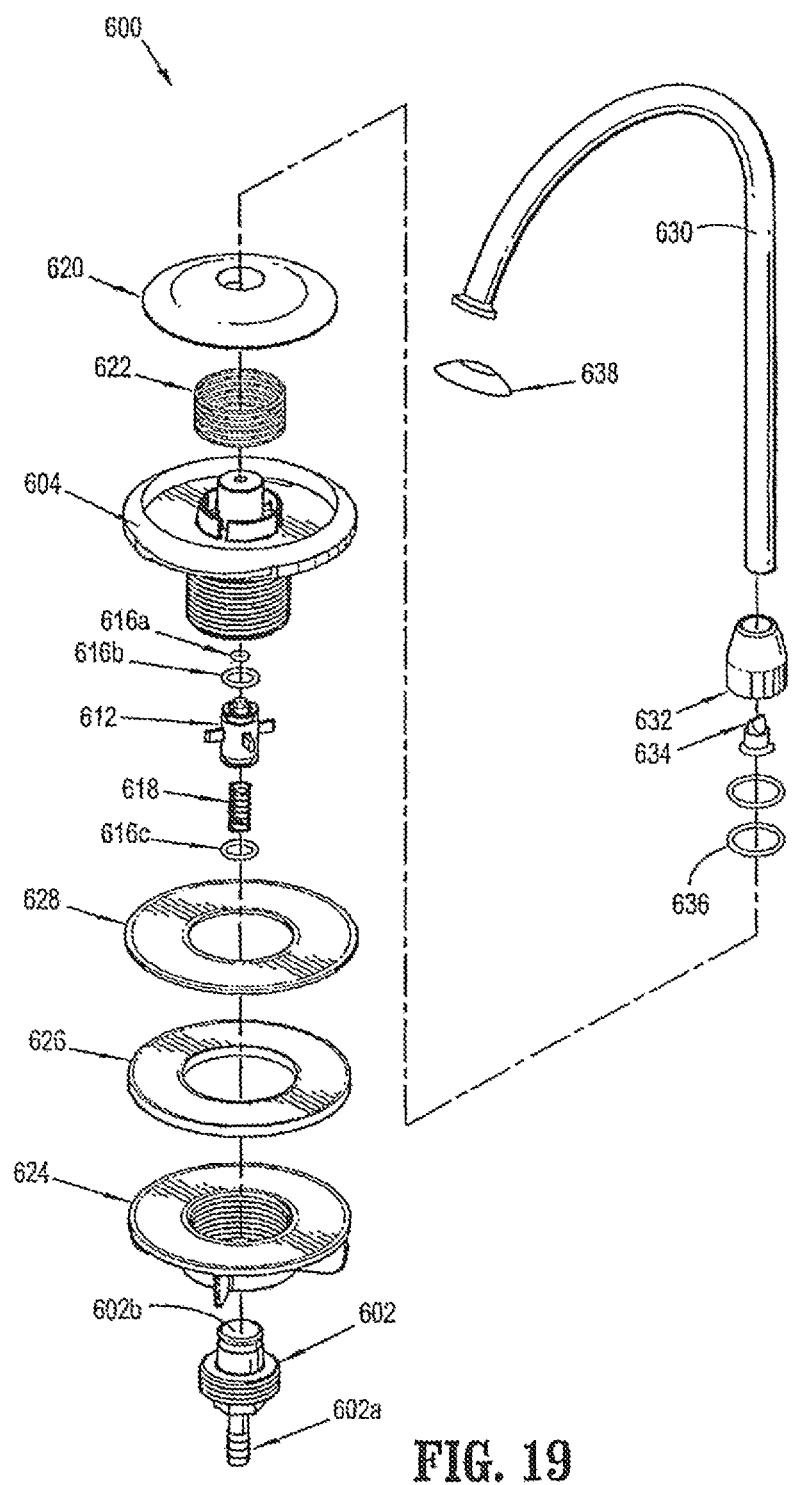
FIG. 19 is a perspective view, with parts separated, of a faucet assembly, in accordance with the present disclosure.
Figure 20:
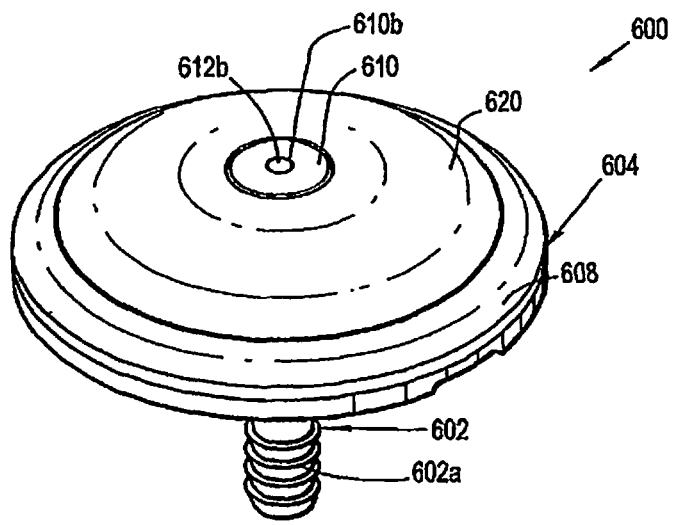
FIG. 20 is an enlarged perspective view of a charging valve assembly of the faucet assembly of FIG. 19.
Figure 21:
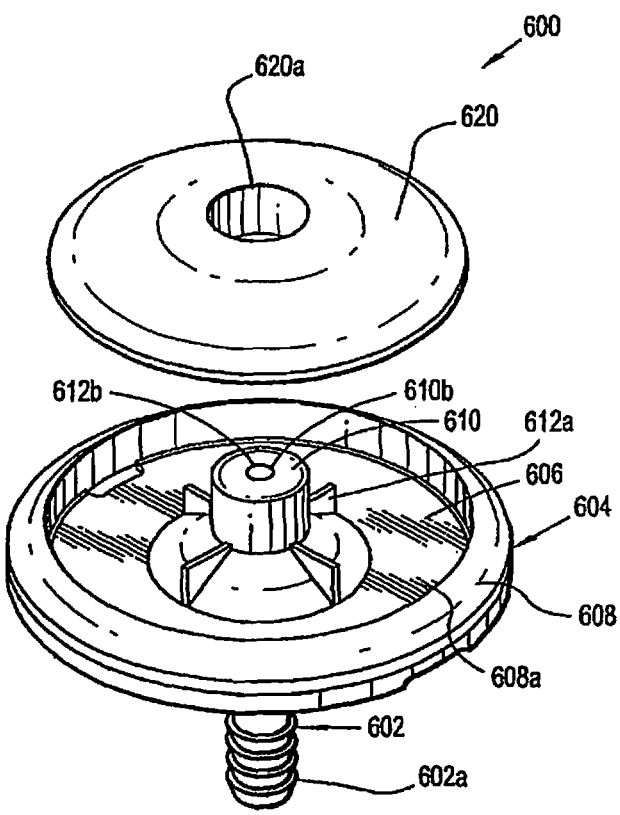
FIG. 21 is an enlarged perspective view, with parts separated, of the charging valve assembly of the faucet assembly of FIG. 19.

As seen in FIG. 18, a trigger spring 526 may be provided to bias slide arm 518 to the first position. Accordingly, as trigger 516 is manipulated from the first position to the second position, trigger spring 526 is compressed and/or biased. As such, upon release of trigger 516, trigger spring 526 un-compresses or un-biases (i.e., extends) to return trigger 516 to the first position.

Figure 13:
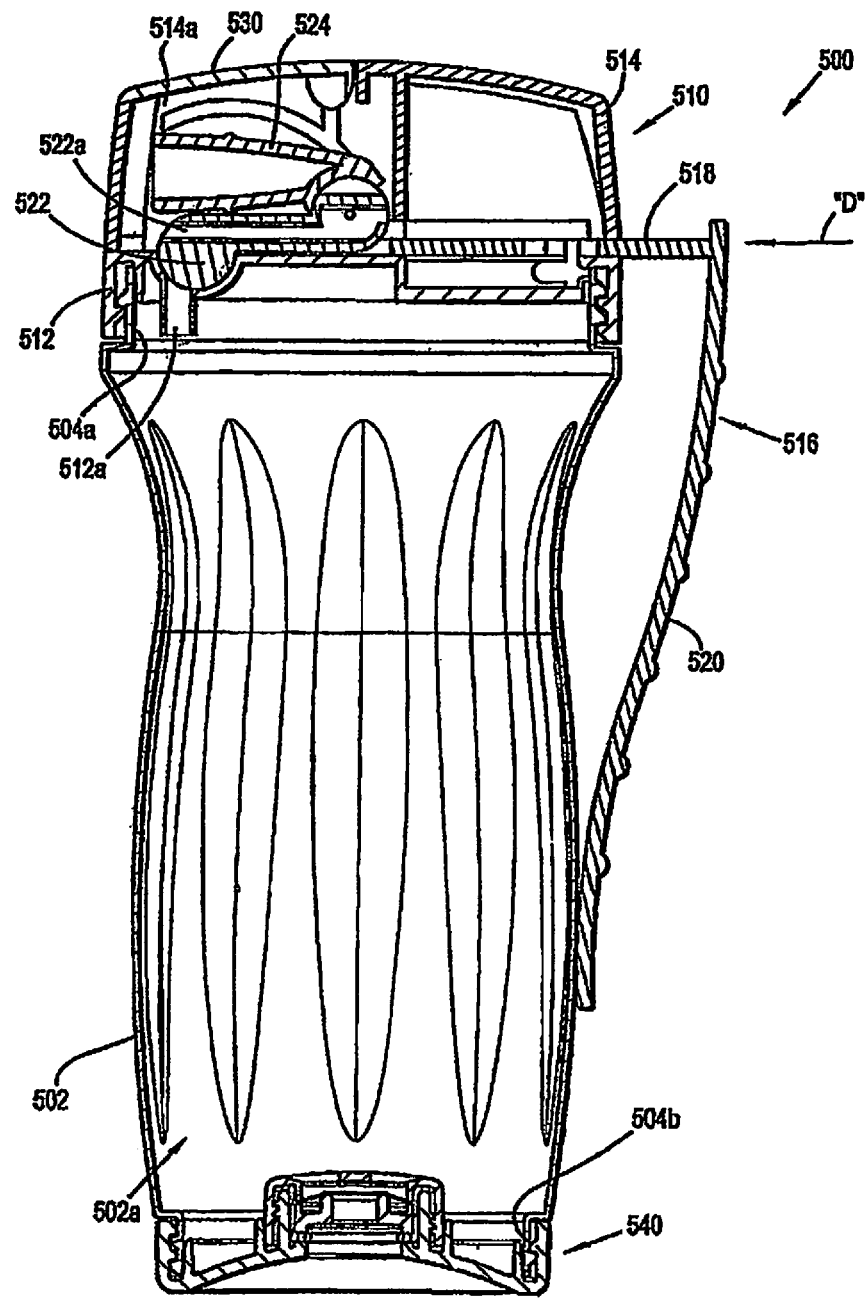
FIG. 13 is a longitudinal, cross-sectional view of the bottle assembly of FIGS. 11 and 12, as taken through 13-13 of FIG. 12.
Figure 14:
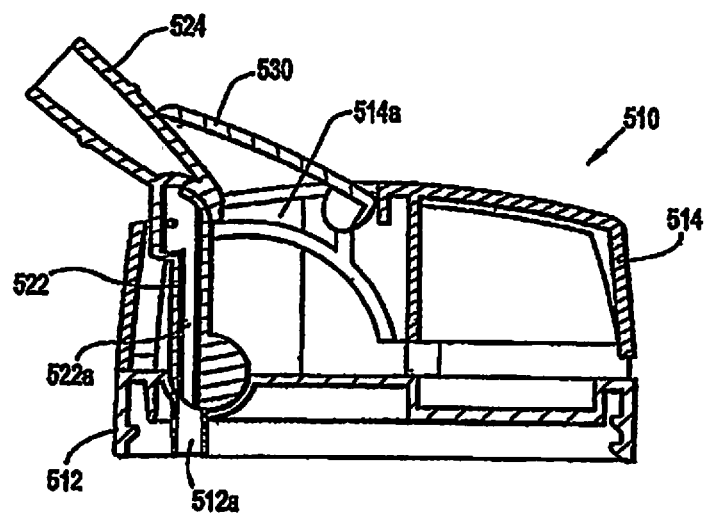
FIG. 14 is a longitudinal cross-sectional view of a cover assembly of the bottle assembly of FIGS. 11-13.
Figure 15:
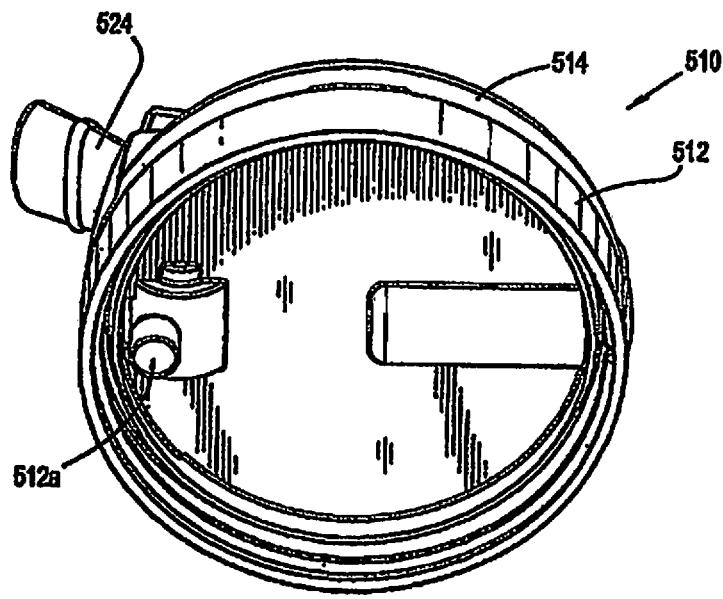
FIG. 15 is a bottom perspective view of the cover assembly of FIG. 14.
Figure 16:
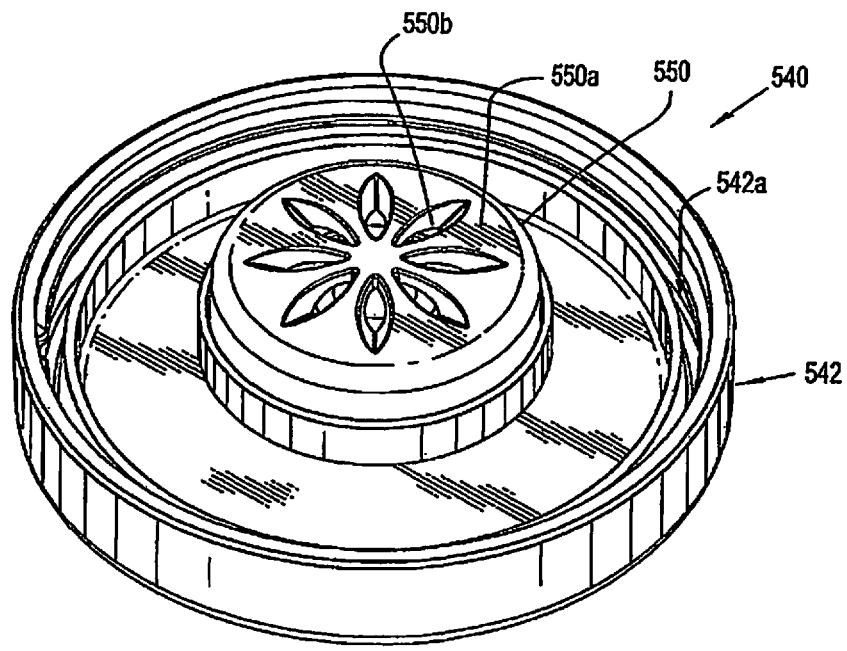
FIG. 16 is a top perspective view of a base assembly of the bottle assembly of FIGS. 11-13.
Figure 17:
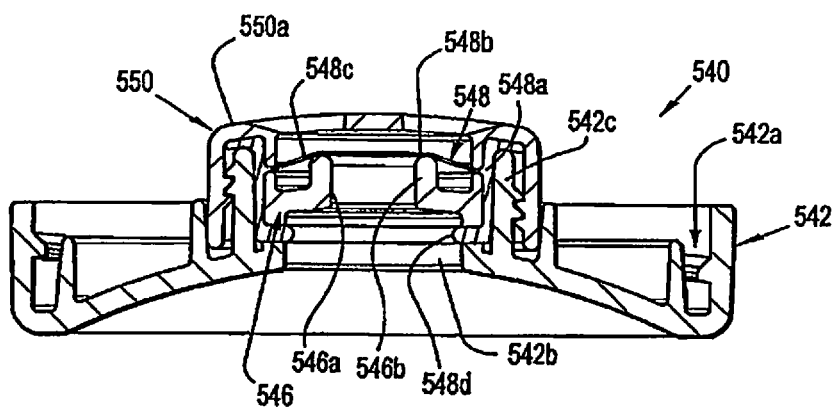
FIG. 17 is a longitudinal cross-sectional view of the base assembly of FIG. 16.

As seen in FIGS. 13, 14 and 18, cover assembly 510 includes a straw stand 522 pivotally connected to lid member 512, and a spout 524 pivotally connected to an end of straw stand 522. Straw stand 522 defines a lumen 522a extending therethrough. As seen in FIG. 18, straw stand 522 includes engaging members 522b extending therefrom for pivotal engagement with fingers 518a extending from slide arm 518 of trigger 516. In this manner, as trigger 516 is manipulated from the first position to the second position, straw stand 522 is moved from a first position (see FIG. 13) in which lumen 522a thereof is out of fluid engagement with a port 512a formed in lid member 512, to a second position (see FIGS. 14 and 15) in which lumen 522a thereof is in fluid engagement with port 512a of lid member 512.

Additionally, as trigger 516 is manipulated from the first position to the second position, lumen 522a of straw stand 522 is moved from a first position (see FIG. 13) in which lumen 522a thereof is out of fluid engagement with a lumen 524a of spout 524, to a second position (see FIG. 14) in which lumen 522a thereof is in fluid engagement with lumen 524a of spout 524. In this manner, when in the second position, fluid may be dispensed from cavity 502a of body portion, out of spout 524 through straw stand 522.

As seen in FIG. 18, a link 528 may be provided to help maintain straw stand 522 operatively connected to spout 524. A spout lid 530 may be pivotally connected to spout cover 514 and may be configured and dimensioned to close opening 514a of spout cover 514 when trigger 516 is in the first or closed position. An umbrella valve 532 may be operatively supported on lid member 512 for providing venting to cavity 502a of body portion 502 during charging and/or recharging of the same.

Bottle assembly 500 includes a base assembly 540 selectively connectable with a bottom rim 504b of body portion 504. As seen in FIGS. 13 and 16-18, base assembly 540 includes a bottom cover 542 defining an annular channel 542a configured and adapted to removably snap-fit engage bottom rim 504b in a fluid tight manner. Bottom cover 542 defines a central opening 542b formed therein.

Base assembly 540 further includes a one-way valve assembly 544 operatively connected to bottom cover 542 and disposed over central opening 542b. As will be described in greater detail below, one-way valve assembly 544 enables passage of fluid into cavity 502a of body portion 502 and not out of cavity 502a of body portion 502. In particular, one-way valve assembly 544 includes a valve insert 546 which is disposed over central opening 542b of bottom cover 542 and which includes an opening 546a therethrough defined by an inner annular wall 546b. Desirably, valve insert 546 is disposed within an annular rim 542c extending from bottom cover 542 and surrounding central opening 542b thereof.

One-way valve assembly 544 further includes a valve diaphragm 548 operatively disposed over valve insert 546. Valve diaphragm 548 includes an annular wall 548a and a membrane 548b extending across annular wall 548a. Membrane 548b of valve diaphragm 548 includes at least one aperture or window 548c formed therein. Valve diaphragm 548 is formed from an elastomeric material. Accordingly, when valve diaphragm 548 is properly secured in position, membrane 548b extends across an inner annular wall 546b of valve insert 546. Desirably, each aperture 548c of membrane 548b is disposed radially outward of annular wall 546b of valve insert 546. When membrane 548b is in contact with annular wall 546b of valve insert 546, a fluid tight seal is created therebetween. In order to break the fluid tight seal, membrane 548b must be separated from annular wall 546b of valve insert 546.

One-way valve assembly 544 further includes a valve cap 550 configured and adapted to selectively engage annular rim 542c of bottom cover 542. Valve cap 550 includes a top wall 550a defining at least one aperture or window 550b therein. Valve cap 550 is configured and dimensioned such that top wall 550a thereof is spaced a distance from annular wall 546b of valve insert 546.

In use, when a filling nipple configured to deliver fluid is introduced into central opening 542b of bottom cover 542 and through opening 546a of valve insert 546, a fluid tight seal is formed around an outer surface of the nipple by a seal 548d. Seal 548d is desirably an integral extension of annular wall 548a of valve diaphragm 548. A pressure of the fluid "F" to be delivered to cavity 502a of body portion, which is greater than a predetermined pressure (e.g. greater than about 10 psi or 68.95 pascal), causes membrane 548b to separate from annular wall 546b of valve insert 546 and permits fluid to flow between membrane 548b and annular wall 546b, through apertures 548c, and out through apertures 550b of valve cap 550 into cavity 502a of body portion 502. Once the pressure of the fluid is reduced below a predetermined level, membrane 548b re-engages or returns into contact with annular wall 546b of valve insert 546 to once again create the fluid tight seal therebetween and prevent leakage of fluid from cavity 502a of body portion 502 back through one-way valve assembly 540.

Alternatively, it is envisioned that a tip of the filling nipple may press into membrane 548b which in turn causes membrane 548b to separate from annular wall 546b of valve insert 546.

Turning now to FIGS. 19-22, a charging valve assembly, for use with and for filling or re-filling bottle assembly 500, is generally shown as 600. Charging valve assembly 600 includes a bung or fitting 602 including a stem 602a for connection to a fluid supply line and defining a fluid passage 602b therethrough.

Charging valve assembly 600 further includes a dispenser manifold 604 including a base wall 606 defining a central opening 606a and an annular rim 606b extending from a bottom of base wall 606 and around central opening 606a. Annular rim 606b is configured and dimensioned to fluidly connect with fitting 602 and to establish fluid communication between fluid passage 602b of fitting 602 and central opening 606a of dispenser manifold 604. Dispenser manifold 604 includes an annular outer wall 608 extending upwardly from base wall 606 and thus defines a recess 608a therein. Dispenser manifold 604 further includes a nipple 610 extending upwardly from base wall 606 and in fluid communication with central opening 606a of base wall 606. Nipple 610 defines a fluid passage or lumen 610a extending therethrough and an aperture 610b formed in an upper surface thereof.

Charging valve assembly 600 further includes a plunger 612 slidably supported within lumen 610a of nipple 610, central opening 606a of dispenser manifold 604, and fluid passage 602b of fitting 602. Plunger 612 includes at least one arm 612a extending radially outwardly from nipple 610 and into recess 608a of dispenser manifold 604. Plunger 612 further includes a plug 612b configured and dimensioned to mate with and/or selectively occlude opening 610b of nipple 610. Plunger 612 defines a lumen or passage 614 therethrough and terminating in an upper annular passage 614a. Annular passage 614a is disposed radially outward of plug 612b.

Desirably, a plurality of seals or O-rings is disposed about plunger 612. In particular, a first seal 616a is disposed about plug 612b to create a fluid tight seal between opening 610a in nipple 610 and plug 612b of plunger 612, a second seal 616b is disposed about plunger 612, above arms 612a, to create a fluid tight seal between an outer surface of plunger 612 and an inner surface of nipple 610 within lumen 610a, and a third seal 616c is disposed about plunger 612, below arms 612a, to create a fluid tight seal between an outer surface of plunger 612 and in inner surface of fitting 602 within lumen 602b.

A spring member 618 may be provided to bias plunger 612 to an occluded position against nipple 610. In particular, when in the occluded position, plug 612b of plunger 612 occludes opening 610b of nipple 610. In order to open opening 610b of nipple 610 arms 612a of plunger 612 are depressed in the direction of arrow "E", biasing spring member 618 and separating plug 612b from opening 610b, thus allowing fluid to flow through lumen 602b of fitting 602, through lumen 614 of plunger 612 and out through opening 610a of nipple 610.

Charging valve assembly 600 includes a plunger cap 620 configured and dimensioned for receipt in recess 608a of dispenser manifold 604 and for engagement with arms 612a of plunger 612. Plunger cap 620 includes a central opening 620a configured and dimensioned to receive nipple 610 therein. Plunger cap 620 may include a spring member 622 for spring biasing to a raised condition.

Charging valve assembly 600 includes a nut 624 and a washer 626 for securing dispenser manifold 604, from beneath, to a surface (e.g., a counter or the like), in a fluid tight arrangement. A gasket 628 may be provided for placement between bottom wall 606 of dispenser manifold 604 and an upper surface of the counter.

Desirably, charging valve assembly 600 has a low profile.

Figure 22:
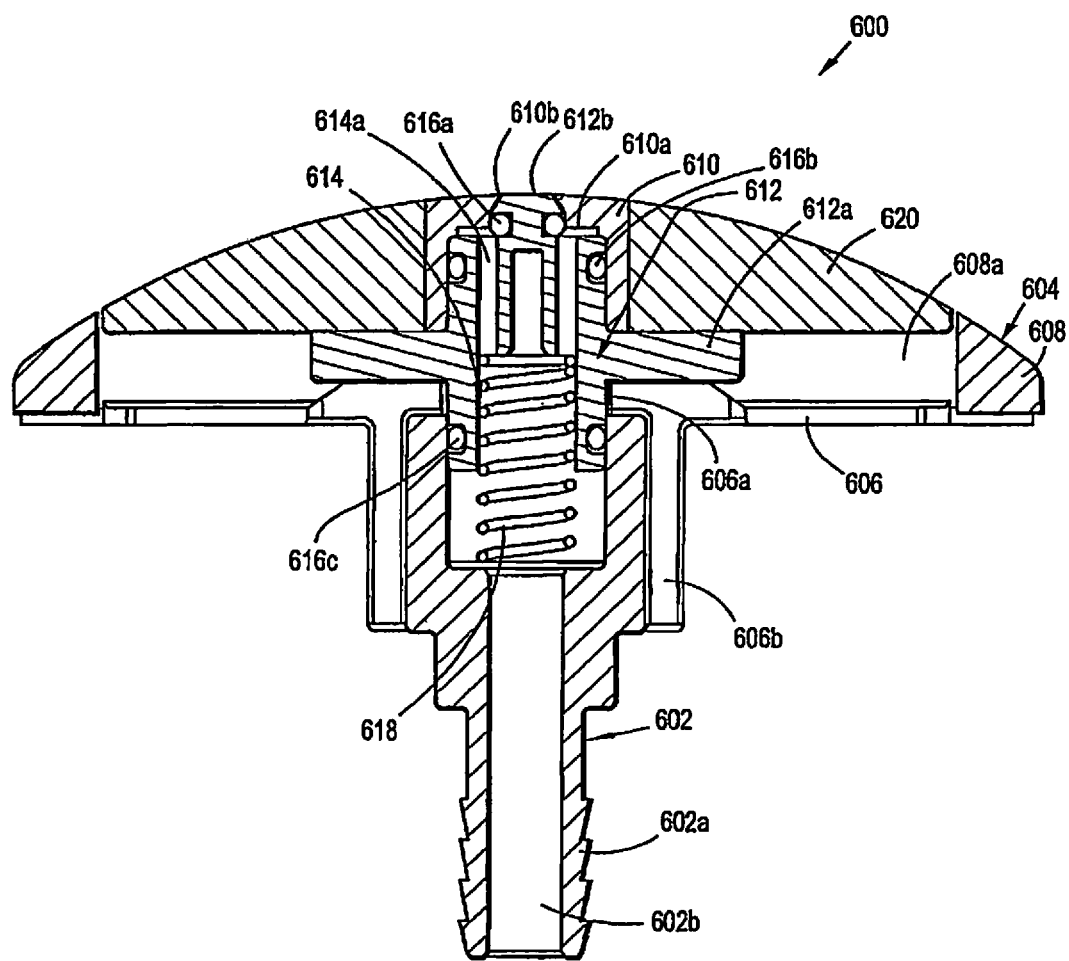
FIG. 22 is longitudinal cross-sectional view of the charging valve assembly of FIG. 20, shown in a closed condition.
Figure 22A:
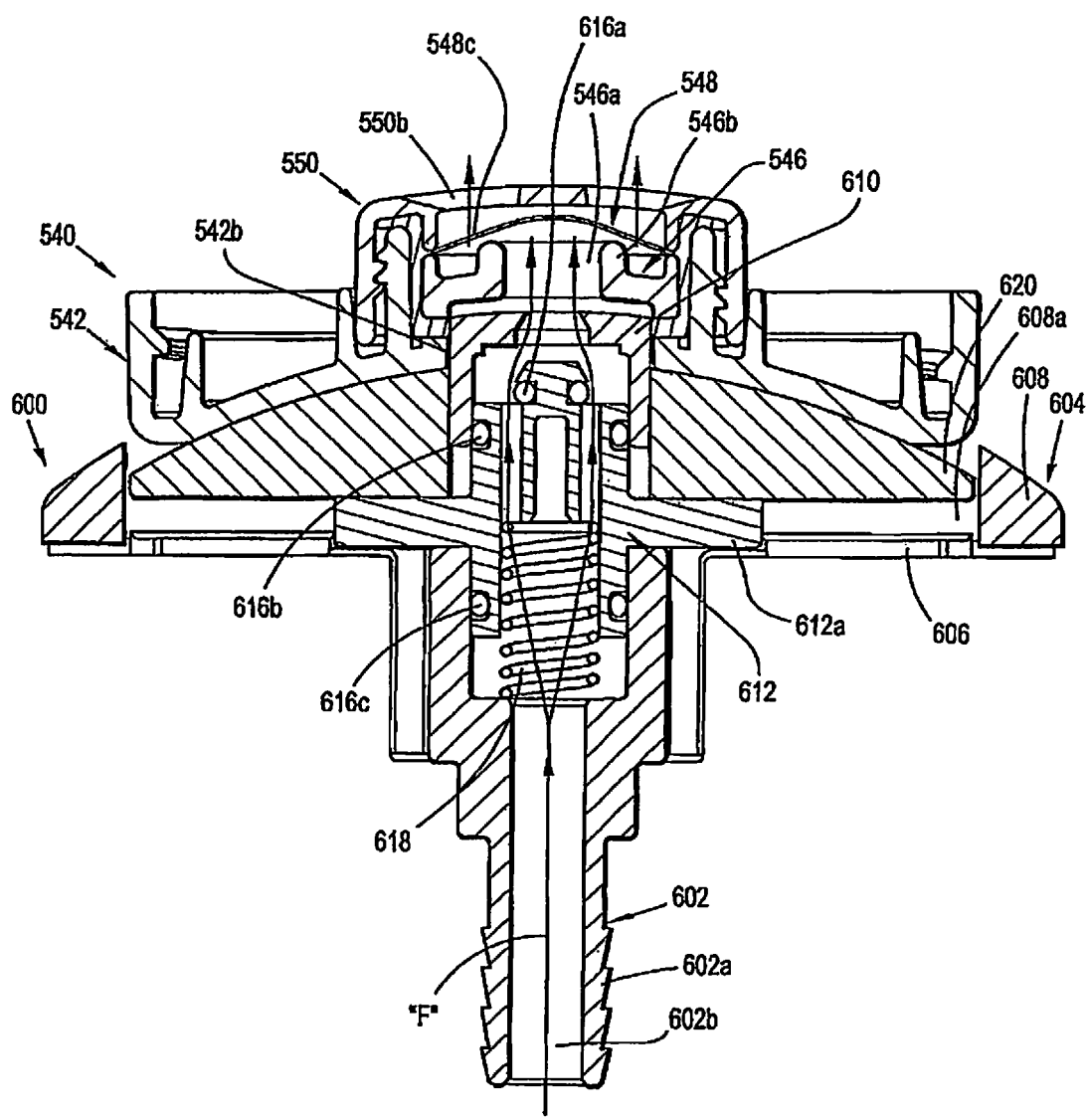
FIG. 22A is a longitudinal cross-sectional view illustrating the fluid engagement of the base assembly of FIGS. 16 and 17 with the charging valve assembly of FIGS. 19-22.
Figure 23:
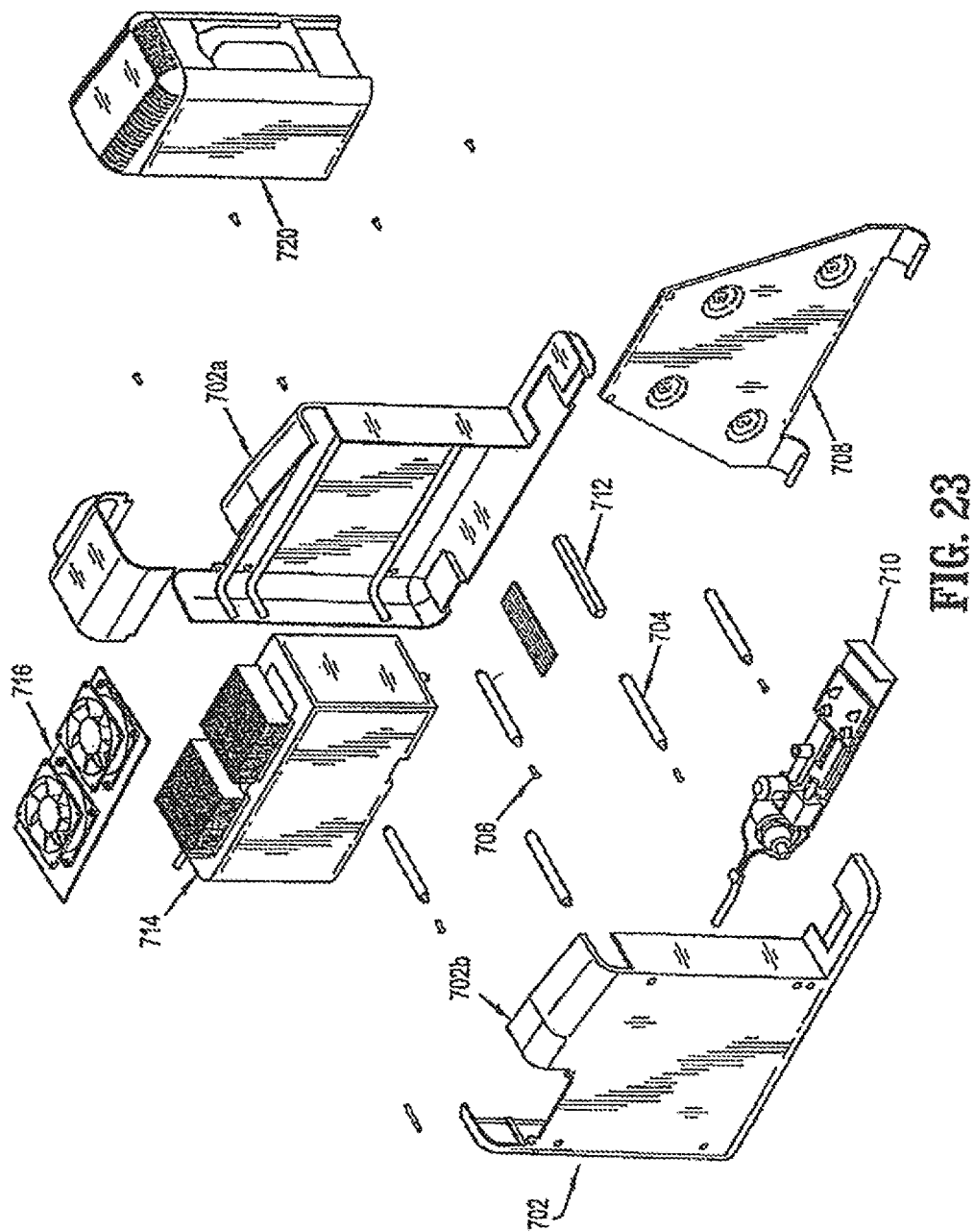
FIG. 23 is a perspective view, with parts separated, of a supply assembly according to an embodiment of the present disclosure.

As seen in FIG. 22A, use of charging valve assembly 600 with bottle assembly 500, entails placement of base assembly 540 of bottle assembly 500 onto charging valve assembly 600 such that central opening 542b of base assembly 540 is aligned with nipple 610 of charging valve assembly 600. Bottle assembly 500 is then pressed down onto charging valve assembly 600 such that bottle assembly 500 presses down on plunger cap 620, which in turn presses down on plunger 612, while concomitantly therewith, nipple 610 enters central opening 542b of bottom cover 542 and plug 612b of plunger 612 is spaced from opening 610b of nipple 610. With bottle assembly 500 so positioned on charging valve assembly 600 a fluid tight seal is created between seal 548d and an outer surface of nipple 610. As mentioned above, the force of the fluid "F" being delivered by charging valve 600 results in membrane 548b separating from annular wall 546b of valve insert 546. As so positioned, a fluid flow channel for fluid "F" is created through fitting 602, through plunger 612, through nipple 610, through one-way valve assembly 540 (i.e., through valve insert 546, through apertures 548c of membrane 548b and through apertures 550b of valve cap 550) of bottle assembly 500.

Desirably, the fluid is under pressure so as to force the fluid into cavity 502a of body portion 502. Once the desired amount of fluid is introduced into cavity 502a of bottle 500 or cavity 502a of bottle 500 is filled, bottle assembly 500 is lifted off of charging valve assembly 600. Accordingly, plug 612b is re-inserted into opening 610b of nipple 610 and the flow of fluid "F" is cut-off thereby allowing for membrane 548b to return into contact with annular wall 546b of valve insert 546 and prevent the escape of leakage of fluid "F" from within cavity 502a of bottle 500. The process may be repeated as many times as necessary to charge and re-charge bottle assemblies 500.

In order to fill other vessels other than bottle assemblies 500, charging valve assembly 600 may include a faucet tube 630 removably connectable to dispenser manifold 604 and nipple 610. Faucet tube 630 may be connected to dispenser manifold 604 through a faucet tube base 632, a duckbill valve 634, and a series of O-rings 636. A faucet bumper 638 may be provided for the tip of faucet tube 630.

It is envisioned and within the present disclosure that any vessel for containing fluid may be adapted for bottom filling (e.g., include a one-way valve assembly operatively provided in a bottom surface thereof). For example, it is envisioned that bottles, faucet taps, juggs, mugs, cups, thermoses, vases, tubs, bowls, pots, planters, and the like may be provided with a one-way valve assembly for filling from the bottoms thereof.

Turning now to FIGS. 23-29, a supply assembly for providing fluid and the like to charging valve assembly 600 is shown generally as 700. Supply assembly 700 includes a housing 702 having a first and second half-portion 702a, 702b, respectively. A series of spreaders 704 and screws 706 are used to secure the housing half-portions 702a, 702b to one another. A mounting bracket 708 may be provided for supporting housing 702 and anchoring housing 702 to a wall or the like.

Supply assembly 700 includes a hydraulic assembly 710 supported within housing 702 for pressurizing the fluid to be delivered to charging valve assembly 600. An LED display 712 may be provided which is supported in housing 702 and which provided individuals with information regarding the status of supply assembly 700, such as, for example, status of filters, fluid temperature, etc.

Supply assembly 700 includes a tank assembly 714 supported in housing 702 which stores and or retains a quantity of pre-conditioned fluid. In other words, tank assembly 714 contains fluid which has already been cooled and filtered and which is ready for dispensing. Tank assembly 714 is fluidly connectably with hydraulic assembly 710. A fan plate assembly 716 may be provided and may be in operative engagement with tank assembly 714 in order to help maintain the fluid contained within tank assembly 714, cool.

Supply assembly 700 may include a removable filter assembly 720 which is configured and dimensioned for operative connection with housing 702 and for fluid engagement with hydraulic assembly 710.

Figure 24:
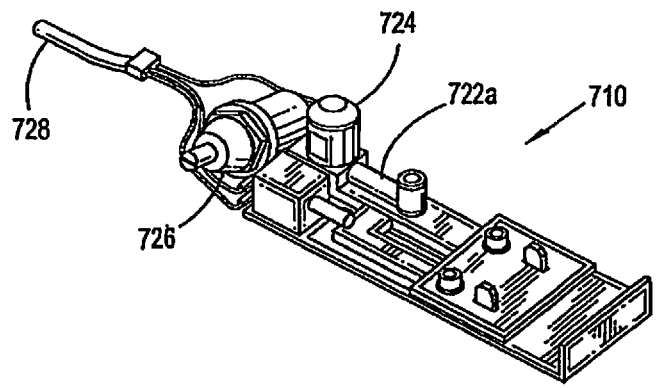
FIG. 24 is an enlarged perspective view of a hydraulics assembly of the supply assembly of FIG. 23.
Figure 25:
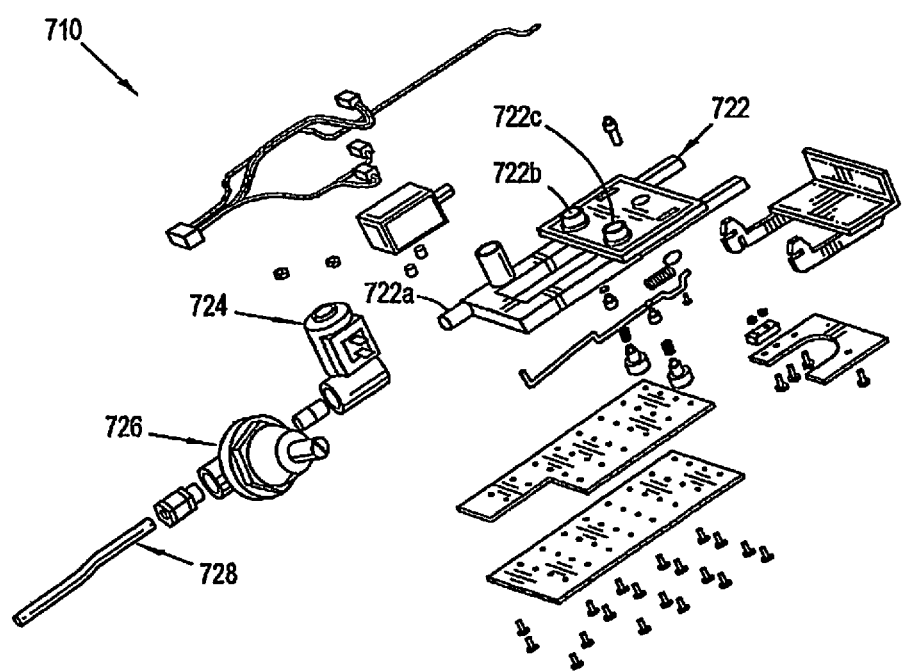
FIG. 25 is a perspective view, with parts separated, of the hydraulics assembly of FIG. 24.

As seen in FIGS. 24 and 25, hydraulic assembly 710 includes, inter alia, a support body 722, a solenoid shut-off 724 operatively connectable with a fitting 722a of support body 722. A pressure regulator 726 is connected to solenoid shut-off 724 and a supply line 728 is connected to pressure regulator 726. Support body 722 includes additional fittings 722b, 722c for supplying fluid to filter assembly 720 and for returning fluid from filter assembly 720. Supply assembly 700 may include a solenoid filter 730 in fluid engagement with solenoid shut-off 724.

Figure 26:
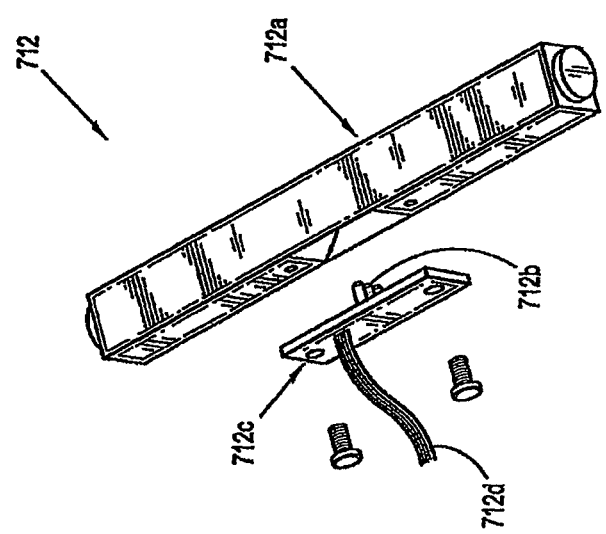
FIG. 26 is a perspective view, with parts separated, of an LED assembly of the supply assembly of FIG. 23.

As seen in FIG. 26, LED display 712 includes a lite pipe 712a, and a plurality of LEDS 712b operatively associated with lite pipe 712a and supported on a printed circuit board (PCB) 712c. A cable ribbon 712d connects PCB 712b to a controller or the like (not shown). PCB 712b monitors and keeps track of the number of uses of supply assembly 700 and/or the life of filter assembly 720, and then transmits that information to LED display 712 in order to indicate to the user when a change of the filters of filter assembly 720 may be warranted.

Figure 27:
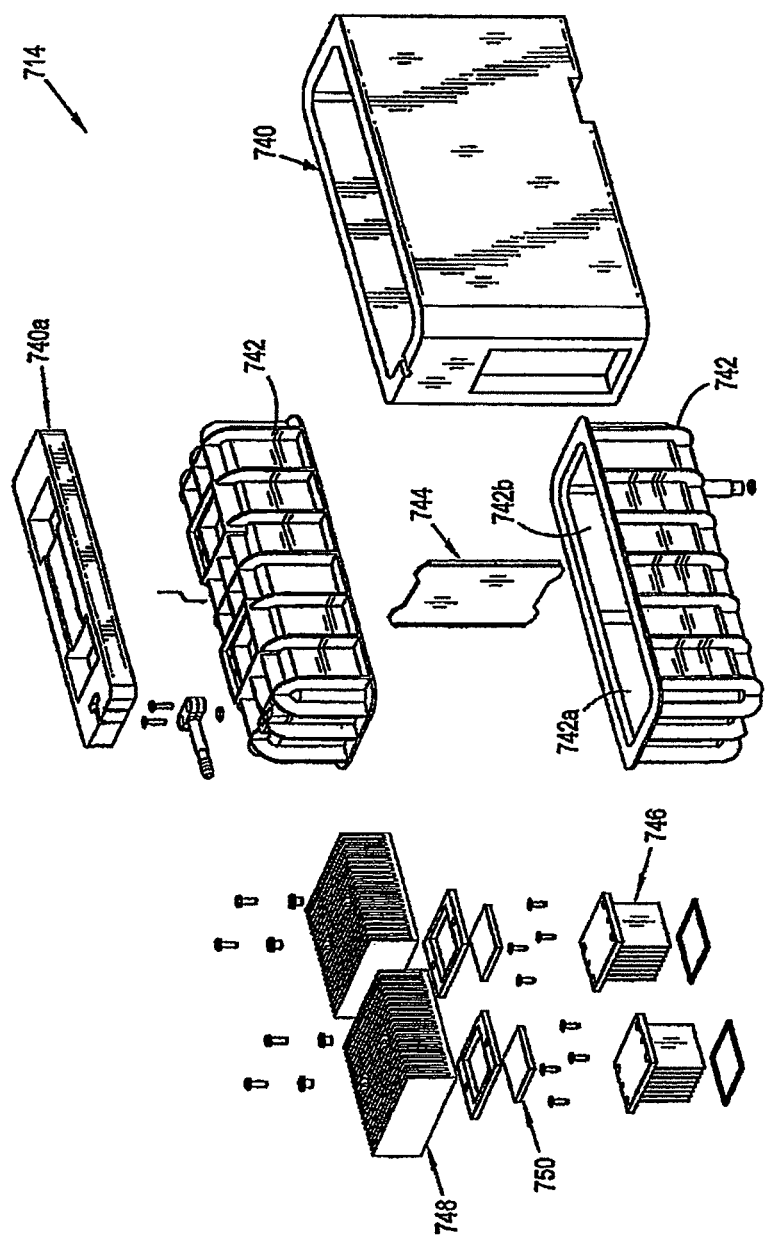
FIG. 27 is a perspective view, with parts separated of a tank assembly of the supply assembly of FIG. 23.
Figure 28:
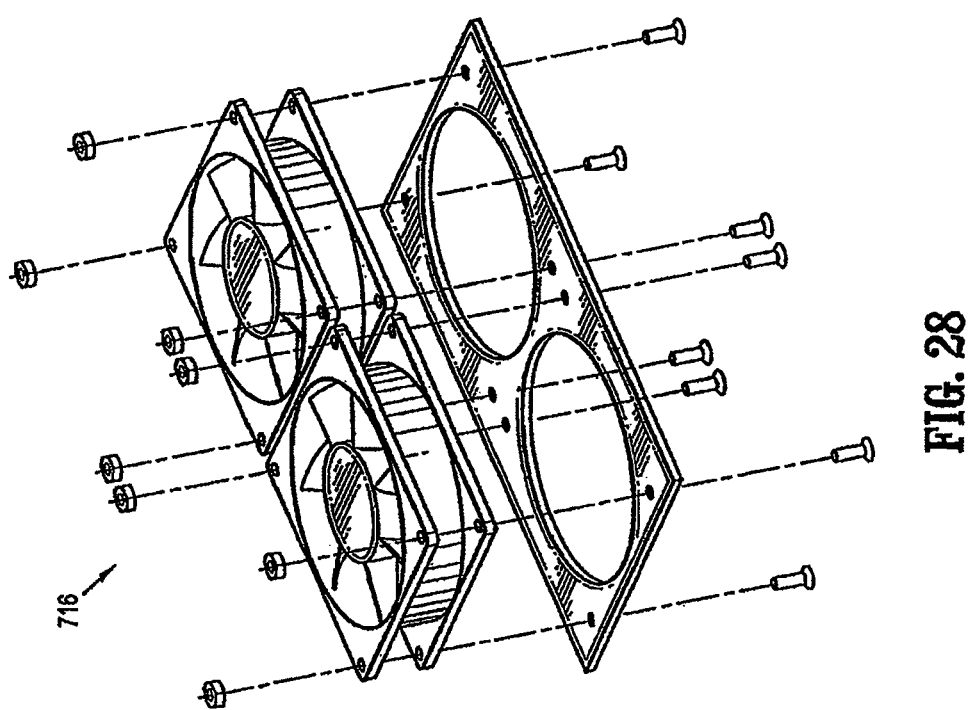
FIG. 28 is a perspective view, with parts separated, of a fan plate assembly of the supply assembly of FIG. 23.

As seen in FIG. 27, tank assembly 714 includes an insulated housing 740 including an insulated top 740a. Tank assembly 714 includes a reservoir 742 defining a volume for retaining fluid therein. Reservoir 742 is divided into a first chamber 742a and a second chamber 742b by a screen or filter 744. First heat sinks 746 may be provided which extending in to chambers 742a, 742b of reservoir 742 and help to cool fluid contained therein. Second heat sinks 748, operatively connected to first heat sinks 746 through peltiers 750, are provided to dissipate the heat with the air. As seen in FIG. 28, a fan plate assembly 716 may be provided which is in operative engagement with second heat sinks 748 for enhancing the cooling thereof.

In use, hydraulic assembly 710 forces fluid through reservoir 742 for cooling and initial filtering.

Figure 29:
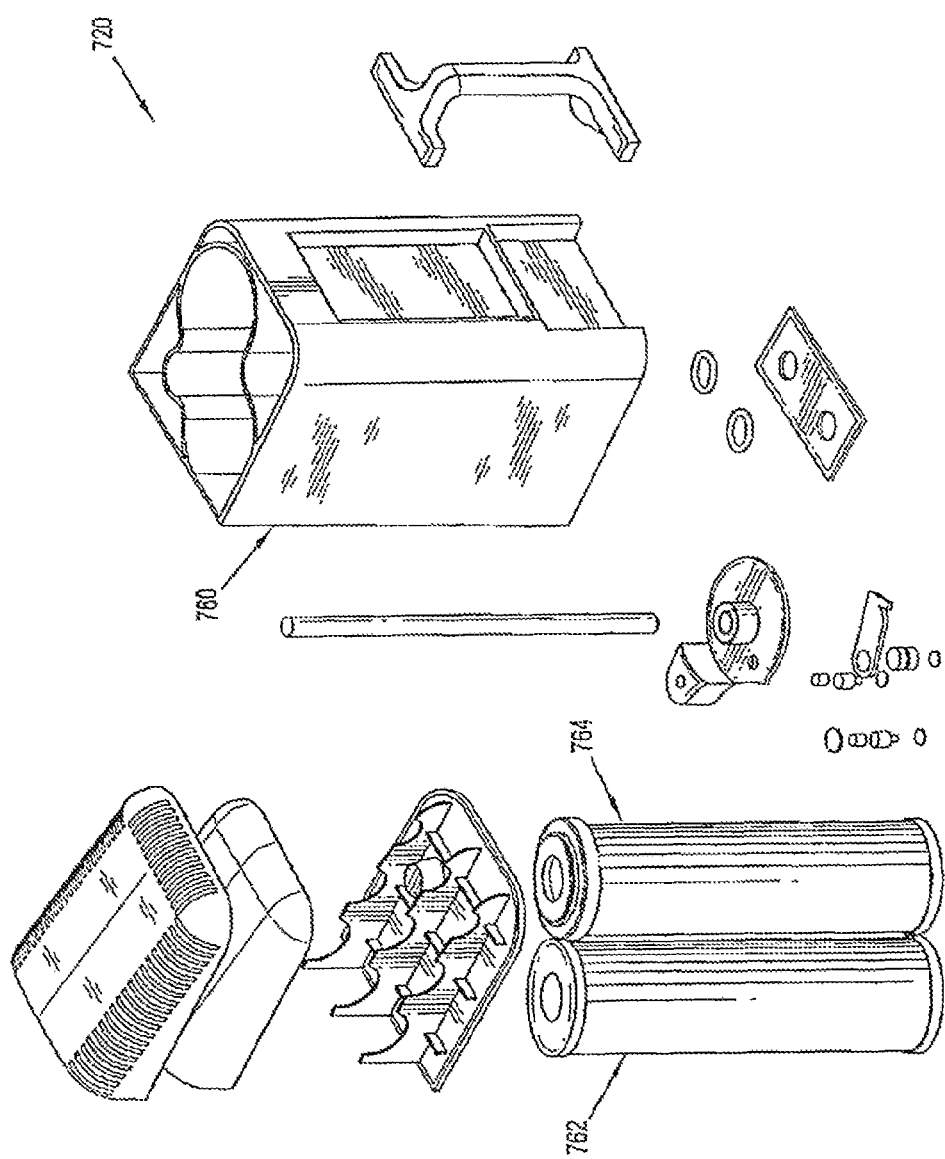
FIG. 29 is a perspective view, with parts separated, of a filter assembly for use with the supply assembly of FIG. 23.

As seen in FIG. 29, filter assembly 720 includes a housing 760 configured and adapted to removably retain a sediment filter 762 and a carbon-block filter 764 therein. In use, fluid is pumped from hydraulic assembly 710 through reservoir 742 and through filter assembly 720, in any order desired, prior to transmission to charging valve assembly 600.

It is envisioned that supply assembly 700 may be provided with an automatic filter replacement mechanism or the like. In use, when it is time to replace either of sediment filter 762, carbon-block filter 764 or any other filter, an indicator signal alerts the user that such a change is necessary. The user then presses a first button or switch (e.g., a change filter button/switch) which automatically activates/manipulates the water supply valve to turn off the water supply, and which automatically activates/manipulates a release mechanism which automatically disconnects the filter from the water supply or the like (i.e., rotates the filter to unlock the filter). The user then exchanges the used filter with a new filter. Once the new filter is in position, the user presses a second button/switch which automatically activates/manipulates the release mechanism to thereby lock the new filter into fluid communication with the water supply, to open the water supply valve, and to reset the counter.

Figure 30:
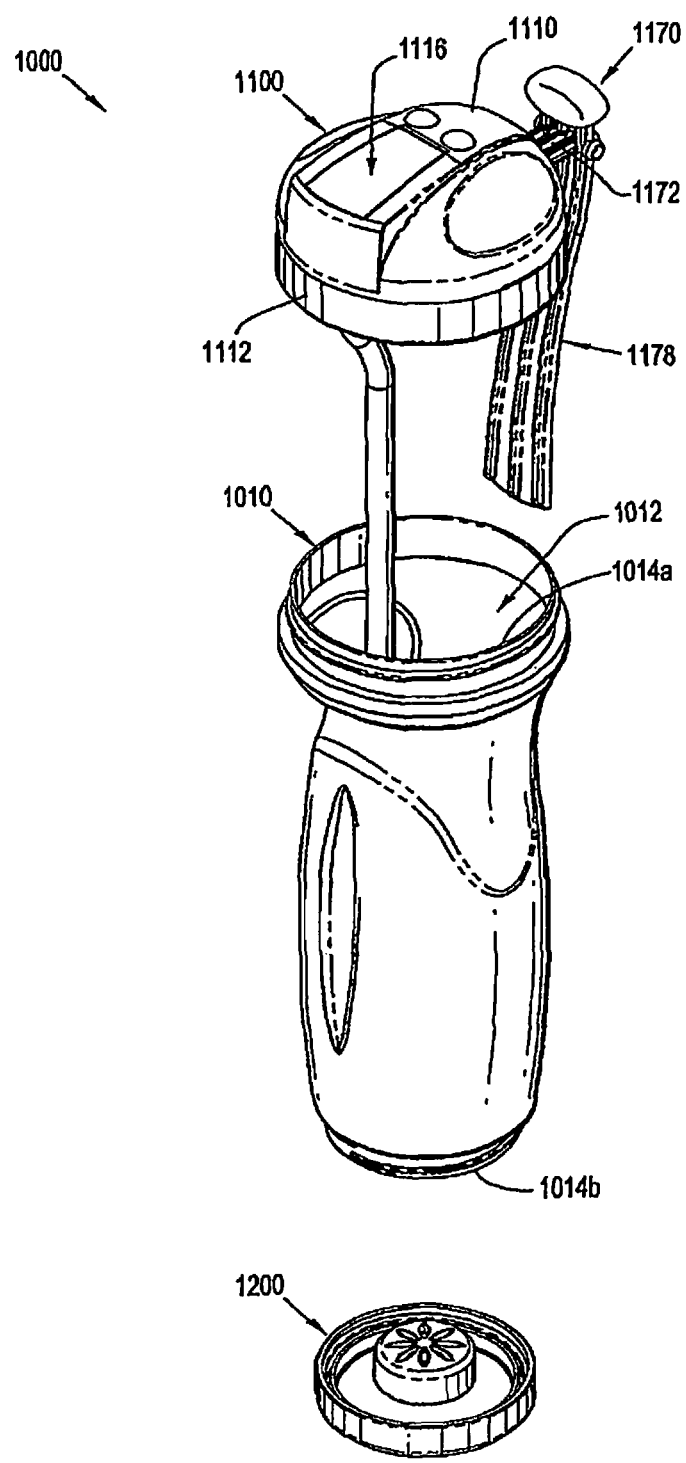
FIG. 30 is a perspective view, with parts separated, of a bottle assembly in accordance with another embodiment of the present disclosure.

Turning now to FIGS. 30-49, a bottle assembly according to another embodiment of the present disclosure is generally designated as 1000. As seen in FIG. 30, bottle assembly 1000 includes a body portion 1010, a top lid assembly 1100 configured and adapted for selective connection to an upper rim or edge of body portion 1010; and a bottom lid assembly 1200 configured and adapted for selective connection to a lower rim or edge of body portion 1010.

As seen in FIG. 30, body portion 1010 defines a cavity 1012 for receiving, retaining and/or storing a fluid therein. Body portion 1010 is ergonomically formed to accommodate a hand of a user during use and manipulation of bottle assembly 1000. Body portion 1010 includes an upper rim 1014a configured and adapted to operatively engage top lid assembly 1100; and a bottom rim 1014b configured and adapted to operatively engage bottom lid assembly 1200. It is envisioned that each of upper rim 1014a and bottom rim 1014b may include a thread for engaging a complementary thread provided on or in top lid assembly 1100 and bottom lid assembly 1200, respectively. It is further envisioned that each of upper rim 1014a and bottom rim 1014b and each of top lid assembly 1100 and bottom lid assembly 1200, may include any complementary engaging structure, such as, for example, bayonet-type structure, screw threads and the like.

Figure 34:
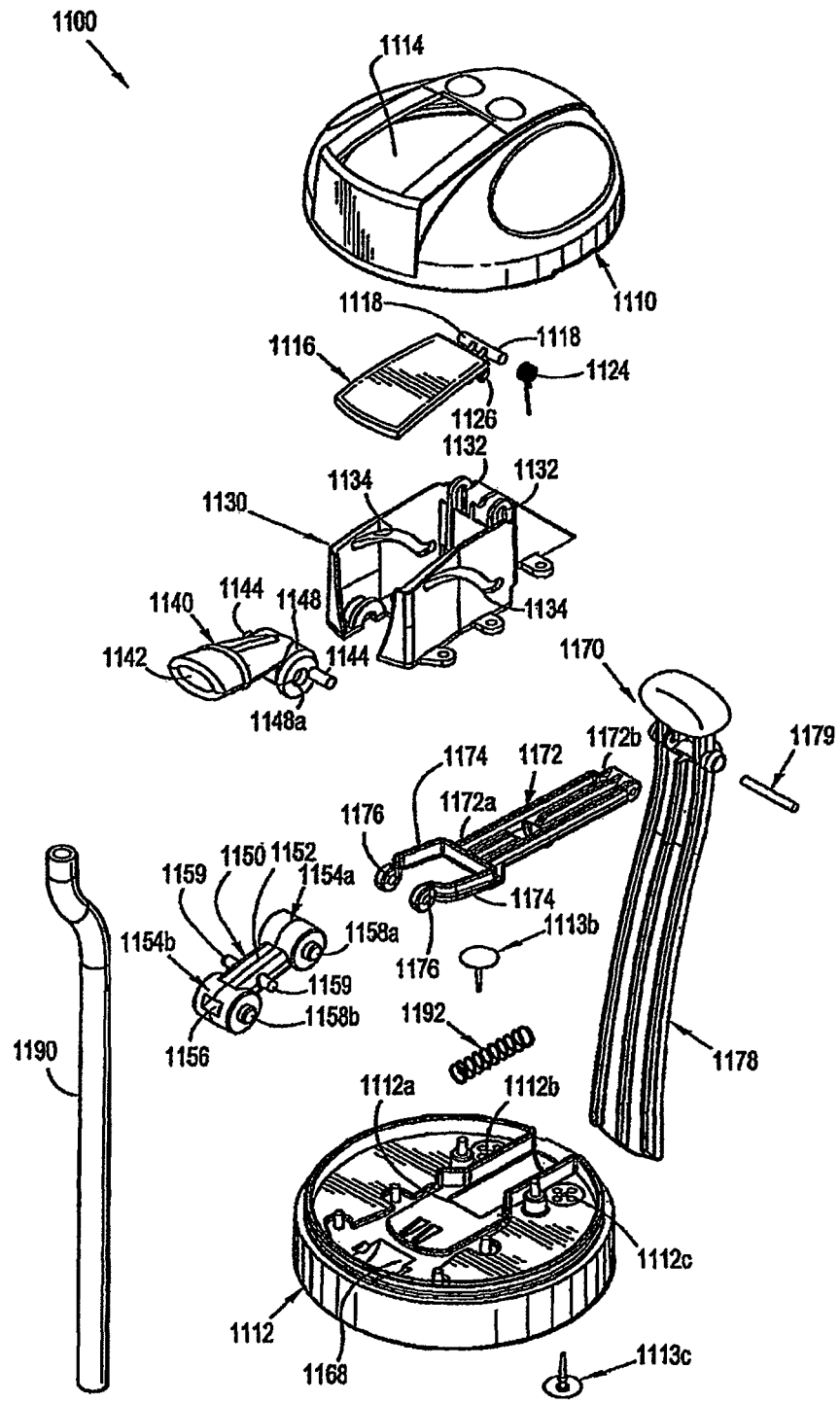
FIG. 34 is an exploded perspective view of the top lid assembly of FIGS. 32 and 33.
Figure 35:
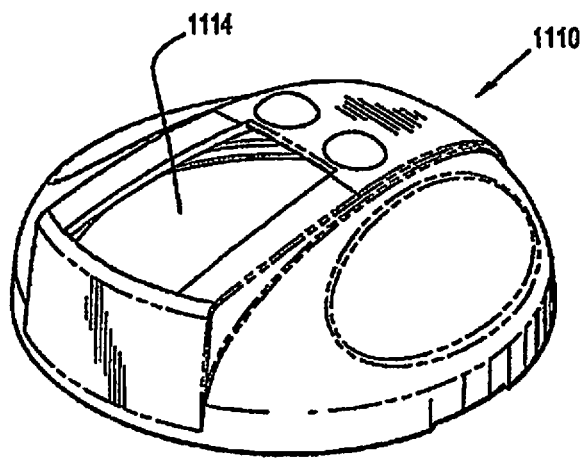
FIG. 35 is a perspective view of a spout cover of the top lid assembly of FIGS. 32-34.
Figure 36:
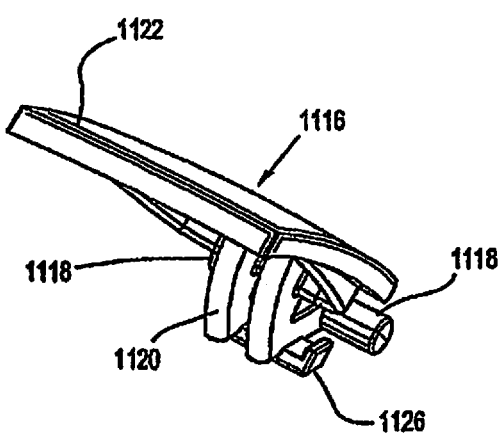
FIG. 36 is a perspective view of a spout lid of the top lid assembly of FIGS. 32-34.

With particular reference to FIGS. 30-46, a detailed description of top lid assembly 1100 will now be provided. Top lid assembly 1100 includes a spout cover 1110 supported on or snap-fit engaged to a spout bottom lid 1112, which spout bottom lid 1112 is configured and adapted to operatively engage upper rim 1014a of body portion 1010. As best seen in FIGS. 34 and 35, spout cover 1110 defines a window 1114 formed therein, through which a spout is selectively deployable, as will be described in greater detail below.

Top lid assembly 1100 includes a spout lid 1116 operatively associated with spout cover 1110 to selectively close and open window 1114 formed therein and allow for the spout to extend or be deployed therefrom. Spout lid 1116 includes a pair of pivot bosses 1118 extending outwardly from a support arm 1120 extending from a bottom surface of flap 1122. Spout lid 1116 is pivotable from a first condition, as seen in FIG. 32, in which flap 1122 of spout lid 1116 closes window 1114 of spout cover 1110 to a second condition, as seen in FIG. 33, in which flap 1122 of spout lid 1116 opens window 1114 of spout cover 1110 to enable a spout to extend therefrom.

It is envisioned that top lid assembly 1100 may include structure or the like for maintaining spout lid 1116 in the first or closed condition or for automatically returning spout lid 1116 to the closed condition following opening thereof. For example, top lid assembly 1100 may include a biasing member 1124 for accomplishing such an automatic closing function. In particular, as seen in FIG. 34, top lid assembly 1100 may include a torsion spring 1124 which is supported on one of pivot bosses 1118 and which includes a first arm thereof for engaging a ledge 1126 provided on spout lid 1116 and a second arm thereof for engaging structure of top lid assembly 1100 other than spout lid 1116. In this manner, in operation, torsion spring 1124 will tend to maintain spout lid 1116 in the closed condition as described above.

Figure 37:
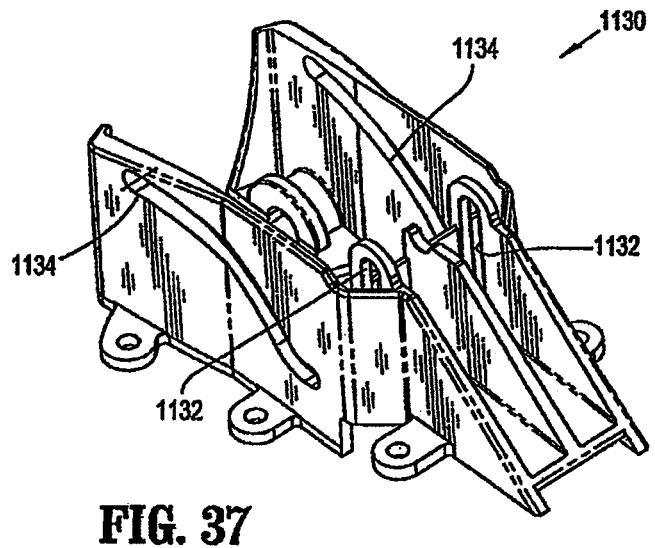
FIG. 37 is a perspective view of a cam member of the top lid assembly of FIGS. 32-34.
Figure 38:
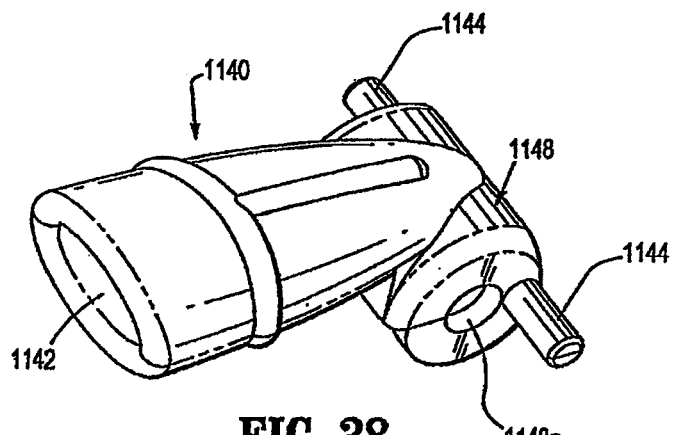
FIG. 38 is a top perspective view of a spout of the top lid assembly of FIGS. 32-34.
Figure 39:
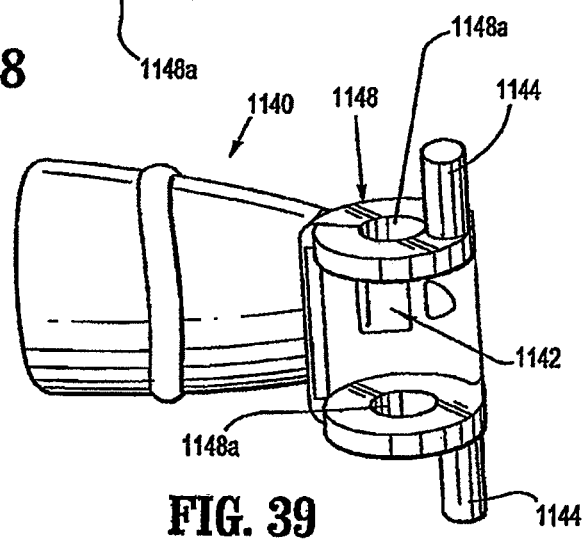
FIG. 39 is a bottom perspective view of the spout of FIG. 38.

With reference to FIGS. 32-34 and 37, top lid assembly 1100 includes a cam member 1130 operatively supported between spout cover 1110 and spout bottom lid 1112. As seen in FIGS. 34 and 37, cam member 1130 includes a pair of spaced apart, elongate, linear slots 1132 formed therein for slidably and pivotably receiving pivot bosses 1118 of spout lid 1116. Cam member 1130 further defines a pair of spaced apart cam slots 1134 formed therein for guiding and facilitating deployment and retraction of the spout out of and into spout cover 1110.

With reference to FIGS. 32-34 and 38-41, top lid assembly 1100 further includes a spout 1140 supported in cam member 1130. Spout 1140 defines a lumen 1142 extending therethrough and at least one guide pin 1144 extending outwardly therefrom. Desirably, a pair of guide pins 1144 are provided which slidably engage cam slots 1134 of cam member 1130. Spout 1140 is ergonomically shaped so as to be better received between the lips of a user. In particular, spout 1140 has a generally conical or frusto-conical outer profile which expands in a distal direction. It is further envisioned that lumen 1142 may have a generally ovular or elliptical inner profile or the like.

With continued reference to FIGS. 32-34 and 38-41, top lid assembly 1100 further includes a straw stand 1150 pivotably supported between spout bottom lid 1112 and cam member 1130. Straw stand 1150 includes a central body portion 1152, a first lobe 1154a integrally formed at a first end 1152a of central body portion 1152, a second lobe 1154b integrally formed at a second end 1152b of central body portion 1152, and a lumen 1156 extending entirely therethrough. First lobe 1154a of straw stand 1150 includes a pair of pivot bosses 1158a formed on either side thereof for engaging pivot openings 1148a formed in lobe 1148 of spout 1140. Second lobe 1154b of straw stand 1150 is slidably seating within a complementary arcuate recess 1168 formed in a top surface of spout bottom lid 1112. Second lobe 1154b of straw stand 1150 may include a pair of pivot bosses 1158b formed on either side thereof for engaging pivot points defines between cam member 1130 and spout bottom lid 1112.

With reference now to FIGS. 30-46, top lid assembly 1100 further includes a trigger assembly 1170 for actuating or moving spout 1140 between an extended condition and a retracted condition. Trigger assembly 1170 includes a spout driver 1172 slidably supported between spout cover 1110 and spout bottom lid 1112. Spout driver 1172 includes a proximal end 1172b extending from spout bottom lid 1112, and a distal end 1172a defining a pair of tines 1174 configured and adapted to engage straw stand 1150. In particular, each tine 1174 of spout driver 1172 includes a bore 1176 formed near a distal end thereof for pivotably receiving and/or engaging a pivot pin 1159 extending from central body portion 1152 of straw stand 1150.

In use or operation, with spout 1140 in the retracted condition and with spout cover 1110 in the closed condition, as spout driver 1172 is moved in the direction of arrow "A", as seen in FIGS. 31 and 32 (i.e., into spout cover 1110), straw stand 1150 is caused to be rotated about pivot bosses 1158b of second lobe 1158b. In so doing, guide pins 1144 of spout 1140 are caused to be slidably advanced through cam slots 1134 of cam member 1130 and spout 1140 pivots about pivot bosses 1158a of first lobe 1154a of straw stand 1150. As such, spout 1140 lifts up spout flap 1116 and extends out of spout cover 1110.

When spout 1140 is in the extended condition, as seen in FIG. 33, lumen 1142 of spout 1140 is in fluid communication with lumen 1156 of straw stand 1150 which is, in turn, in fluid communication with a port 1166 formed in recess 1168 of spout bottom lid 1112. Desirably, a straw 1190 (see FIGS. 32 and 34) is connected to port 1166 and extends down through cavity 1012 of body portion 1010. In this manner, fluid may be withdrawn from cavity 1012 of body portion 1010.

In order to retract or withdraw spout 1140 back into spout cover 1110, spout driver 1172 is moved in a direction opposite to arrow "A" thus causing straw stand to once again be rotated about pivot bosses 1158b of second lobe 1158b. In so doing, guide pins 1144 of spout 1140 are caused to be slidably retracted through cam slots 1134 of cam member 1130 and spout 1140 pivots about pivot bosses 1158a of first lobe 1154a of straw stand 1150. As such, spout 1140 pulls back, withdraws or retracts into spout cover 1110 and spout flap 1116 automatically closes, as described in detail above. With spout 1140 withdrawn into spout cover 1110, the fluid communication between lumen 1142 of spout 1140 and port 1166 of spout bottom lid 1112 is disrupted and no fluid may pass through port 1166. In fact, as seen in FIG. 32, second lobe 1154b of straw stand 1150 function to occlude port 1166 when spout 1140 is in the withdrawn or retracted condition.

With spout 1140 in the retracted condition, spout 1140 is protected from exposure to the elements and/or from exposure to the outside environment. In this manner, contamination of spout 1140 is reduced and/or eliminated.

It is contemplated that the retraction or withdrawal of spout 1140 back into spout cover 1110 may be accomplished automatically upon the release of spout driver 1172. For example, a biasing member 1192 (e.g., a compression spring) may be disposed between spout driver 1172 and a surface or shoulder 1112a of bottom spout lid 1112 or any other element of top lid assembly 1100.

As seen in FIGS. 30-34, proximal end 1172b of spout driver 1172 operatively supports a spout trigger 1178 via a pin 1179 or the like. As seen in FIGS. 31-33 and 44, spout trigger 1178 may include a plurality of spaced apart nubs 1178a formed along a length thereof which define spaces therebetween for receiving the fingers of a user.

In use, deployment and retraction of spout 1140 out of and/or into spout cover 1110 is accomplished by single handed operation. In other words, the deployment of spout 1140 from spout cover 1110 is accomplished by squeezing spout trigger 1178 with a single hand, i.e., moving spout trigger 1178 toward body portion 1010.

Figure 42:
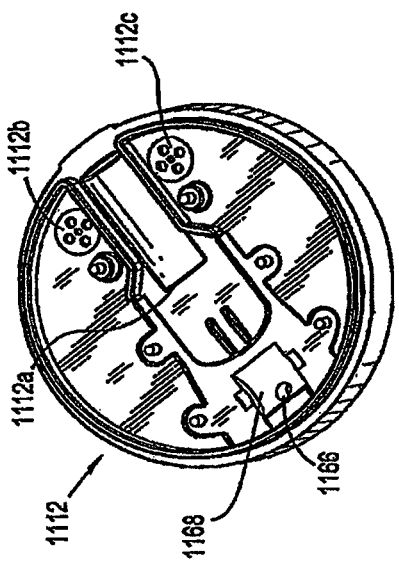
FIG. 42 is a top perspective view of a spout bottom lid of the top lid assembly of FIGS. 32-34.
Figure 43:
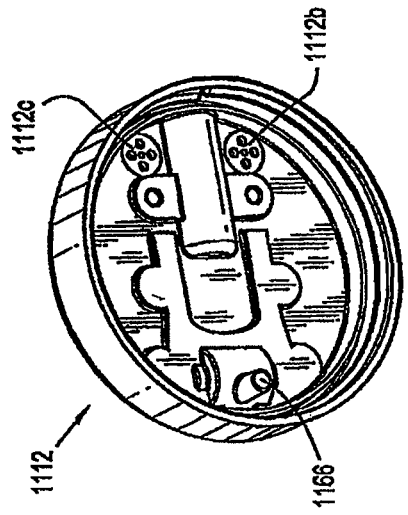
FIG. 43 is a bottom perspective view of the spout bottom lid of FIG. 42.
Figure 40:
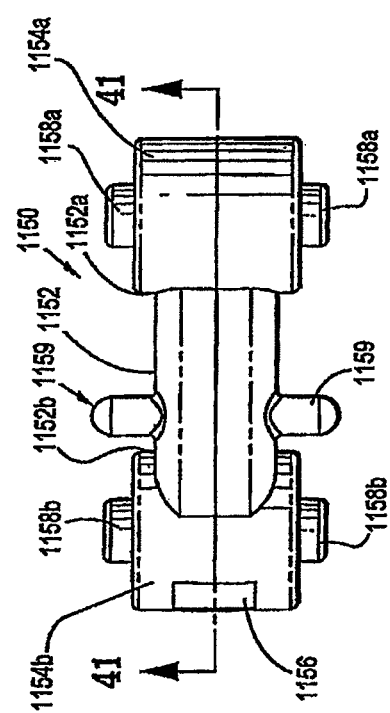
FIG. 40 is a top plan view of a straw stand of the top lid assembly of FIGS. 32-34.
Figure 41:
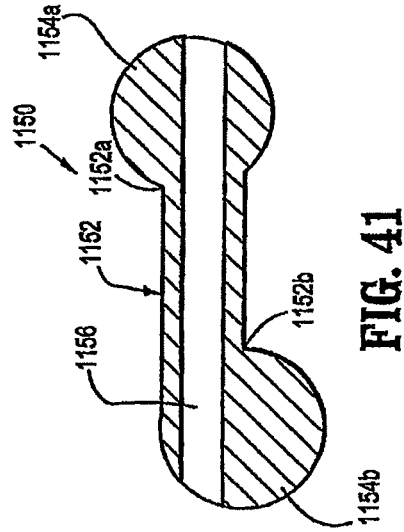
FIG. 41 is a cross-sectional view of the straw stand of FIG. 40, as taken through 41-41 of FIG. 40.
Figure 45:
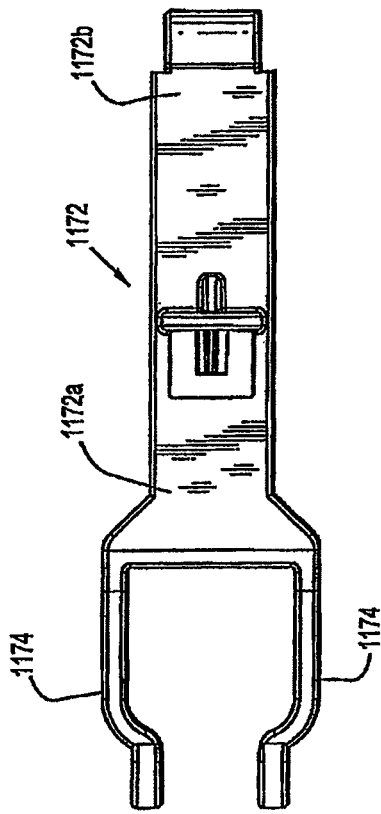
FIG. 45 is a bottom plan view of a spout driver of the top lid assembly of FIGS. 32-34.
Figure 46:
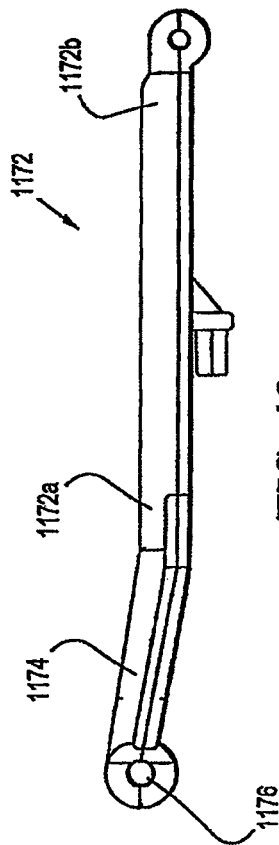
FIG. 46 is a side, elevational view of the spout driver of FIG. 45.
Figure 44:
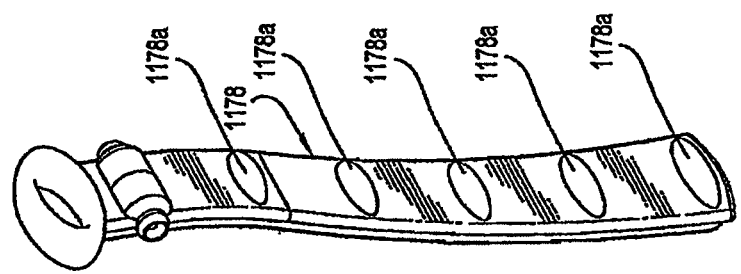
FIG. 44 is a perspective view of a spout trigger of the top lid assembly of FIGS. 32-34.

Turning now to FIGS. 34, 42 and 43, spout bottom lid 1112 includes a pair of venting regions 1112b, 1112c formed therein. Preferably, venting regions 1112b, 1112c include pores which extend through the surface of spout bottom lid 1112. Top lid assembly 1100 further includes a pair of umbrella valves 1113b and 1113c operatively associated with venting regions 1112b, 1112c, respectively. In particular, a first umbrella valve 1113b is positioned on an upper surface of venting region 1112b and a second umbrella valve 1113c is positioned on a bottom surface of venting region 1112c. In use, umbrella valves 1113b, 1113c cooperate with one another to provide venting into and out of cavity 1012 of body portion 1010 during charging, recharging, draining and/or emptying of bottle assembly 1000.

Figure 47:
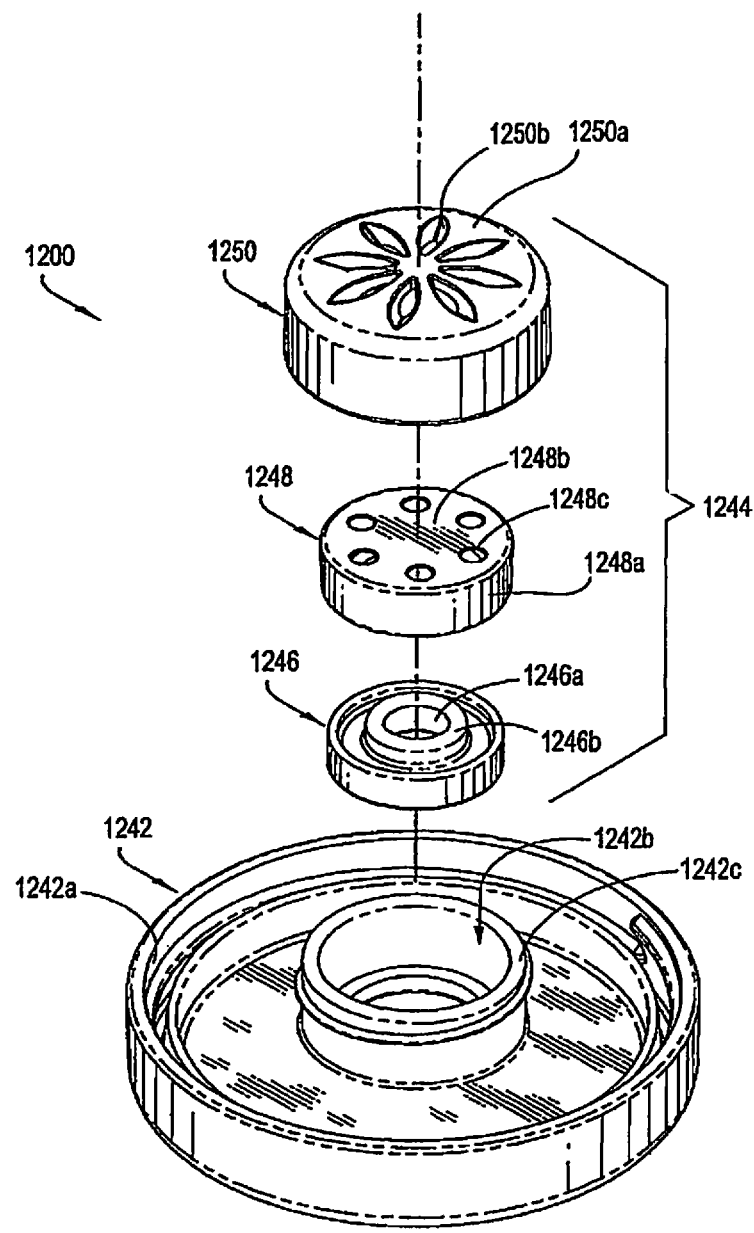
FIG. 47 is an exploded perspective view of a bottom lid assembly of the bottle assembly of FIGS. 30 and 31.
Figure 48:
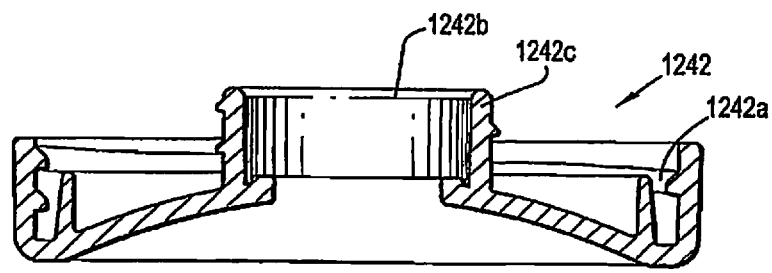
FIG. 48 is a longitudinal cross-sectional view of the bottom lid of FIG. 47.

Turning now to FIGS. 47 and 48, a detailed discussion of bottom lid assembly 1200 is provided. Bottom lid assembly 1200 is substantially similar to base assembly 540 and thus will only be described herein in detail to the extent necessary to identify differences in construction and operation.

Bottom lid assembly 1200 includes a bottom cover 1242 defining an annular channel 1242a configured and adapted to threadingly engage bottom rim 1014b of body portion 1010 in a fluid tight manner. Bottom cover 1242 defines a central opening 1242b formed therein.

Bottom lid assembly 1200 further includes a one-way valve assembly 1244 operatively connected to bottom cover 1242 and disposed over central opening 1242b. As will be described in greater detail below, one-way valve assembly 1244 enables passage of fluid into cavity 1012 of body portion 1010 and not out of cavity 1012 of body portion 1010. In particular, one-way valve assembly 1244 includes a valve insert 1246 which is disposed over or in central opening 1242b of bottom cover 1242 and which includes an opening 1246a therethrough defined by an inner annular wall 1246b. Desirably, valve insert 1246 is disposed within an annular rim 1242c extending from bottom cover 1242 and surrounding central opening 1242b thereof.

One-way valve assembly 1244 further includes a valve diaphragm 1248 operatively disposed over valve insert 1246. Valve diaphragm 1248 includes an annular wall 1248a and a membrane 1248b extending across annular wall 1248a. Membrane 1248b of valve diaphragm 1248 includes at least one aperture or window 1248c formed therein. Valve diaphragm 1248 is formed from an elastomeric material. Accordingly, when valve diaphragm 1248 is properly secured in position, membrane 1248b extends across inner annular wall 1246b of valve insert 1246. Desirably, each aperture 1248c of membrane 1248b is disposed radially outward of inner annular wall 1246b of valve insert 1246. When membrane 1248b is in contact with inner annular wall 1246b of valve insert 1246, a fluid tight seal is created therebetween. In order to break the fluid tight seal, membrane 1248b must be separated from inner annular wall 1246b of valve insert 1246.

One-way valve assembly 1244 further includes a valve cap 1250 configured and adapted to selectively engage annular rim 1242c of bottom cover 1242. Valve cap 1250 includes a top wall 1250a defining at least one aperture or window 1250b therein. Valve cap 1250 is configured and dimensioned such that top wall 1250a thereof is spaced a distance from annular wall 1246b of valve insert 1246.

In use, when a filling nipple, configured to deliver fluid, is introduced into central opening 1242b of bottom cover 1242 and fluid is forced out of the nipple, the fluid pressure acts on membrane 1248b thus separating membrane 1248b from annular wall 1246b of valve insert 1246 and permits fluid to flow between membrane 1248b and annular wall 1246b, through apertures 1248c, and out through apertures 1250b of valve cap 1250 into cavity 1012 of body portion 1010. Once the tip of the filling nipple is withdrawn and the fluid pressure is reduced and/or cut-off, membrane 1248b re-engages or returns into contact with annular wall 1246b of valve insert 1246 to once again create the fluid tight seal therebetween and prevent leakage of fluid from cavity 1012 of body portion 1010 back through one-way valve assembly 1240.

Figure 49:
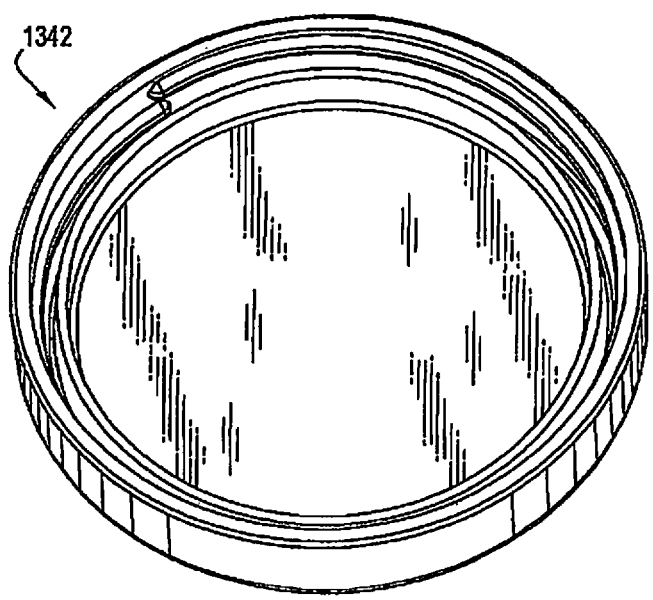
FIG. 49 is a perspective view of an alternate bottom lid for use with the bottle assembly of FIGS. 30 and 31.

As seen in FIG. 49, bottle assembly 1000 may include a bottom cover 1342 which does not include any apertures or openings formed in a center thereof.

Figure 50:
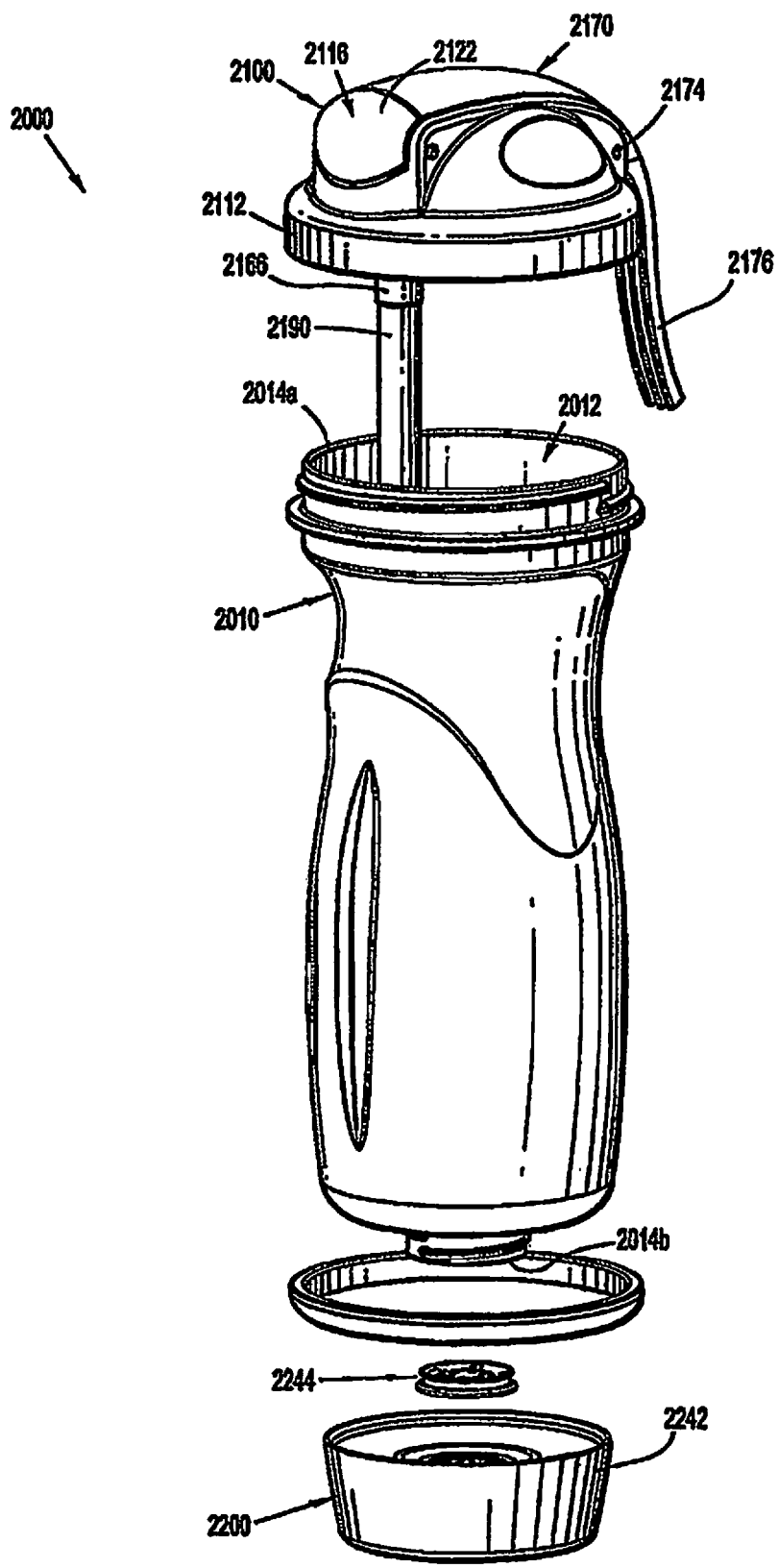
FIG. 50 is a perspective view, with parts separated, of a bottle assembly in accordance with yet another embodiment of the present disclosure.

Turning now to FIGS. 50-62, a bottle assembly according to another embodiment of the present disclosure is generally designated as 2000. As seen in FIG. 50, bottle assembly 2000 includes a body portion 2010, a top lid assembly 2100 configured and adapted for selective connection to an upper rim or edge 2014a of body portion 2010; and a bottom lid assembly 2200 configured and adapted for selective connection to a lower rim or edge 2014b of body portion 2010.

As seen in FIG. 50, body portion 2010 defines a cavity 2012 for receiving, retaining and/or storing a fluid therein. Body portion 2010 is ergonomically formed to accommodate a hand of a user during use and manipulation of bottle assembly 2000. As mentioned above, body portion 2010 includes an upper rim 2014a configured and adapted to operatively engage top lid assembly 2100; and a bottom rim 2014b configured and adapted to operatively engage bottom lid assembly 2200. It is envisioned that each of upper rim 2014a and bottom rim 2014b may include a thread for engaging a complementary thread provided on or in top lid assembly 2100 and bottom lid assembly 2200, respectively. It is further envisioned that each of upper rim 2014a and bottom rim 2014b and each of top lid assembly 2100 and bottom lid assembly 2200, may include any complementary engaging structure, such as, for example, bayonet-type structure, screw threads and the like.

With particular reference to FIGS. 50-59, a detailed description of top lid assembly 2100 will now be provided. Top lid assembly 2100 includes a spout bottom lid 2112 configured and adapted to operatively engage upper rim 2014a of body portion 2010. As best seen in FIGS. 54 and 55, spout bottom lid 2112 defines an upper recess 2114 formed therein, in which a spout is retained and from which the spout is selectively deployable, as will be described in greater detail below.

Top lid assembly 2100 includes a spout lid 2116 operatively associated with spout bottom lid 2112 to selectively close and open recess 2114 formed therein and allow for the spout to extend or be deployed therefrom. Spout lid 2116 includes a pair of pivot bosses 2118 extending outwardly from a respective support arm 2120 which extend from a flap 2123. Spout lid 2116 is pivotable from a first condition, as seen in FIGS. 50-53, in which flap 2123 of spout lid 2116 closes recess 2114 of spout bottom lid 2112 to a second condition, as seen in FIG. 53, in which flap 2123 of spout lid 2116 opens recess 2114 of spout bottom lid 2112 to enable a spout to extend therefrom.

It is envisioned that top lid assembly 2100 may include structure or the like for maintaining spout lid 2116 in the first or closed condition or for automatically returning spout lid 2116 to the closed condition following opening thereof. For example, top lid assembly 2100 may include a biasing member 2124 for accomplishing such an automatic closing function. In particular, as seen in FIG. 54, top lid assembly 2100 may include a torsion spring 2124 which is supported on spout bottom lid 2112 and which includes a first arm thereof for engaging a shoulder or a portion of spout bottom lid 2112 and a second arm thereof for engaging structure of trigger 2170. In this manner, in operation, torsion spring 2124 will tend to maintain spout lid 2116 in the closed condition as described above.

With reference to FIGS. 52-54 and 58, top lid assembly 2100 includes a guide member 2130 operatively supported on trigger 2170. As seen in FIGS. 54 and 58, guide member 2130 includes a pair of spaced apart, elongate, linear rails 2132 including external mounting bosses 2132a extending therefrom for receipt into respective mounting holes 2170a formed in trigger 2170. Guide member 2130 further includes a distal wall 2134 extending between rails 2132 and defining an aperture 2134a therein. Aperture 2134a is configured and adapted to permit slidable passage of a spout 2140 therethrough.

With reference to FIGS. 52-54 and 57, top lid assembly 2100 further includes a spout 2140 operatively supported on guide member 2130. Spout 2140 defines a lumen 2142 extending therethrough and a pair of guide bosses 2144 extending outwardly from opposed sides thereof. Guide bosses 2144 slidably engage an upper surface of rails 2132 of guide member 2130. A distal portion 2146 of spout 2140 is configured and dimensioned to slidably extend through aperture 2134a of guide member 2130. Spout 2140 further includes a pair of opposed pivot apertures 2148 formed therein for receiving pivot bosses 2122 extending inwardly from arms 2120 of spout lid 2116 (see FIG. 56).

In operation, as will be described in greater detail below, as trigger 2170 is actuated, spout 2140 is distally advanced along rails 2132 of guide member 2130 and distal portion 2146 of spout 2140 is deployed or extended out of aperture 2134 of guide member 2130. When trigger 2170 is actuated to distally advance spout 2140, advancement of spout 2140 results in spout lid 2116 pivoting about pivot bosses 2118 in order to open recess 2114 of spout bottom lib 2112. It follows that, when trigger 2170 is released, spout 2140 is withdrawn proximally along rails 2132 of guide member 2130 and distal portion 2146 of spout 2140 is withdrawn into aperture 2134 of guide member 2130. When trigger 2170 is released to withdraw spout 2140, withdrawal of spout 2140 results in spout lid 2116 pivoting about pivot bosses 2118 in order to close recess 2114 of spout bottom lid 2112.

With reference now to FIGS. 50-54 and 59, top lid assembly 2100 further includes a trigger 2170 for actuating or moving spout 2140 between an extended condition and a retracted condition. Trigger 2170 is pivotally supported in recess 2114 of spout bottom lid 2112, about pivot point 2174. Trigger 2170 includes a body portion 2172 including a pair of spaced apart side walls 2172a. Trigger 2170 includes an arm 2176 extending from body portion 2172.

Figures 51, 52:
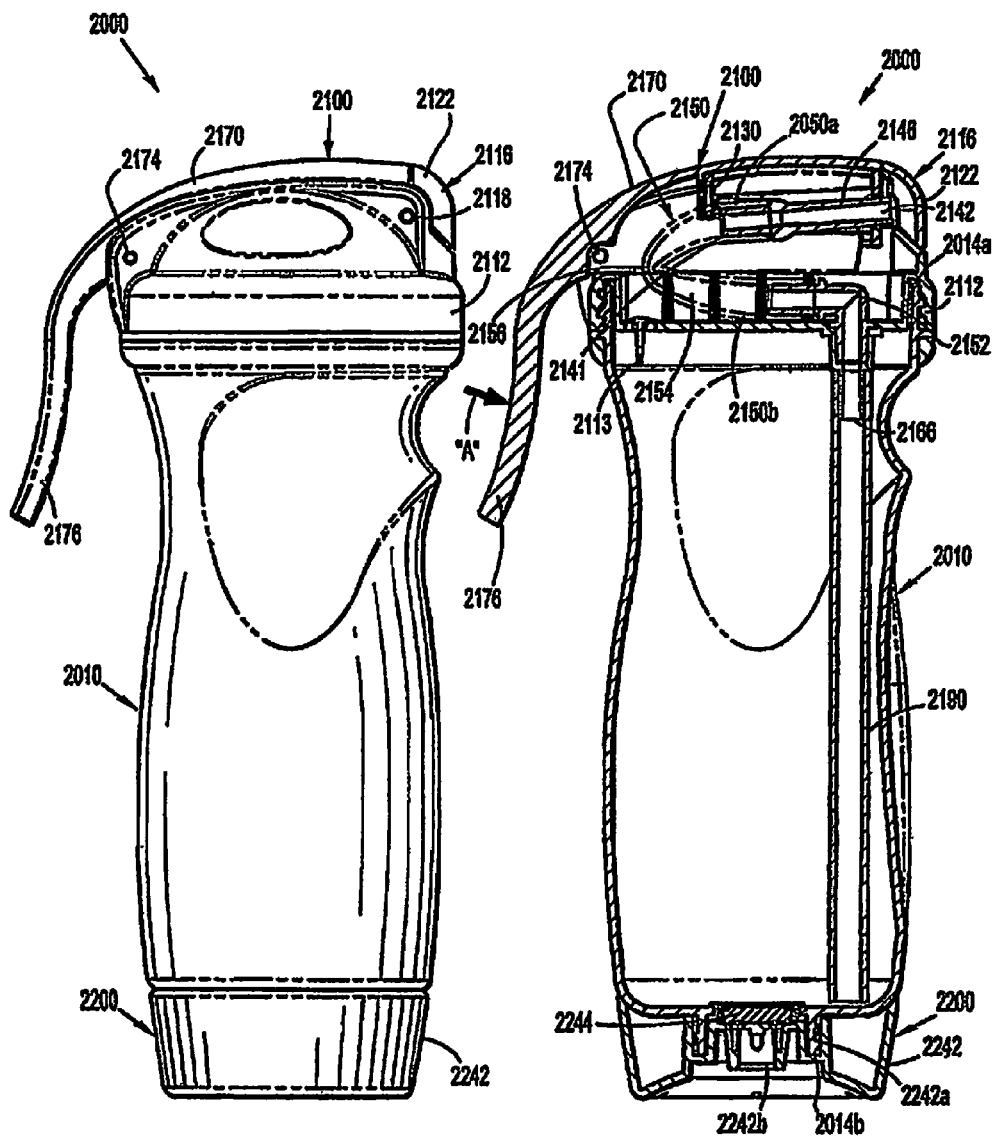
FIG. 51 is a side elevational view of the bottle assembly of FIG. 50.
FIG. 52 is a longitudinal, cross-sectional view of the bottle assembly of FIGS. 50 and 51, illustrating the top lid assembly thereof in a closed condition.
Figure 59:
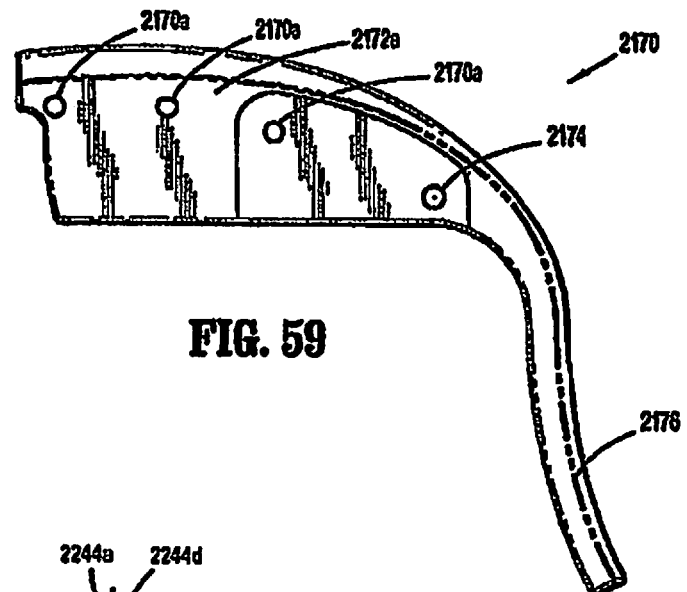
FIG. 59 is a side elevational view of the spout trigger of the top lid assembly of FIGS. 52-54.

In use or operation, with spout 2140 in the retracted condition and with spout cover 2110 in the closed condition, as arm 2176 of trigger 2170 is moved in the direction of arrow "A", as seen in FIG. 52 (i.e., toward body portion 2010 of bottle assembly 2000), body portion 2172 of trigger 2170 is pivoted about pivot point 2174 causing guide member 2130, supported on body portion 2172 of trigger 2170 to also be raised thus causing spout 2140 to be deployed, as described above. When arm 2176 of trigger 2170 is released, biasing member 2124 automatically returns body portion 2172 of trigger 2170 to an un-pivoted position (i.e., moves arm 2176 in a direction opposite to arrow "A") and causes spout 2140 to be withdrawn into top lid assembly 2100.

As seen in FIGS. 52-54, top lid assembly 2100 further includes an upper resilient tube 2150 having a first end 2150a fluidly connected to a proximal portion 2141 of spout 2140 and a second end 2150b fluidly connected to an elbow 2152 which is fluidly connected to a port 2166 (see FIG. 55) formed in a bottom surface of spout bottom lid 2112. In operation, when spout 2140 is fully retracted, as seen in FIG. 52, resilient tube 2150 is kinked or bent over, thereby occluding a lumen 2154 extending therethrough. With the lumen of resilient tube 2150 occluded, fluid is prevented from traveling therethrough. Then spout 2140 is deployed, as seen in FIG. 53, resilient tube 2150 is partially extended thereby opening the kink and opening the lumen extending through resilient tube 2150. With the lumen of resilient tube 2150 at least partially open, fluid is allowed to flow therethrough.

As seen in FIGS. 50 and 52-54, top lid assembly 2100 further includes a straw 2190 extending from port 2166 into cavity 2012 of body portion 2010 of bottle assembly 2000. An end of straw 2190 extends into cavity 2012 of body portion 2010 and terminates near a bottom of body portion 2010.

As seen in FIGS. 52-55, spout bottom lid 2112 includes a venting region 2112a formed therein. Venting region 2112a includes pores which extend through the surface of spout bottom lid 2112. Top lid assembly 2100 further includes an umbrella valve 2113 operatively associated with venting region 2112a. In particular, umbrella valve 2113 is positioned on an upper surface of venting region 2112a and provides venting into and/or out of cavity 2012 of body portion 2010 during charging, recharging, draining and/or emptying of bottle assembly 2000.

Figure 60:
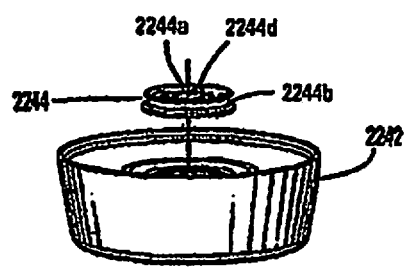
FIG. 60 is an exploded perspective view of the bottom lid assembly of the bottle assembly of FIGS. 50-52.
Figure 61:
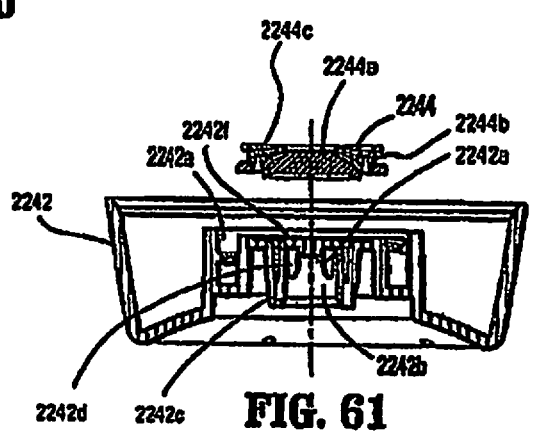
FIG. 61 is a longitudinal cross-sectional view of the bottom lid assembly of FIG. 60.

Turning now to FIGS. 52, 60 and 61, a detailed discussion of bottom lid assembly 2200 is provided. Bottom lid assembly 2200 is substantially similar to bottom lid assembly 1200 and thus will only be described herein in detail to the extent necessary to identify differences in construction and operation.

Bottom lid assembly 2200 includes a bottom cover 2242 defining an annular channel 2242a configured and adapted to threadingly engage bottom rim 2014b of body portion 2010 in a fluid tight manner. Bottom cover 2242 includes a central opening 2242b defined by an inner annular wall 2242c. Inner annular wall 2242c defines at least one aperture 2242d formed in a side wall thereof and a stem 2242e extending axially into central opening 2242b from an upper wall 2242f extending over inner annular wall 2242c.

Bottom lid assembly 2200 further includes a valve 2244 operatively connected to bottom cover 2242 and disposed over central opening 2242b. Valve 2244 enables passage of fluid into cavity 2012 of body portion 2010 and not out of cavity 2012 of body portion 2010. Valve 2244 may be constructed from a suitable elastomeric material capable of being stretched and automatically returning to an un-stretched condition. Valve 2244 includes a central hub 2244a connected to an annular rim 2244b via webs 2244c thereby defining apertures or windows 2244d.

Figure 62:
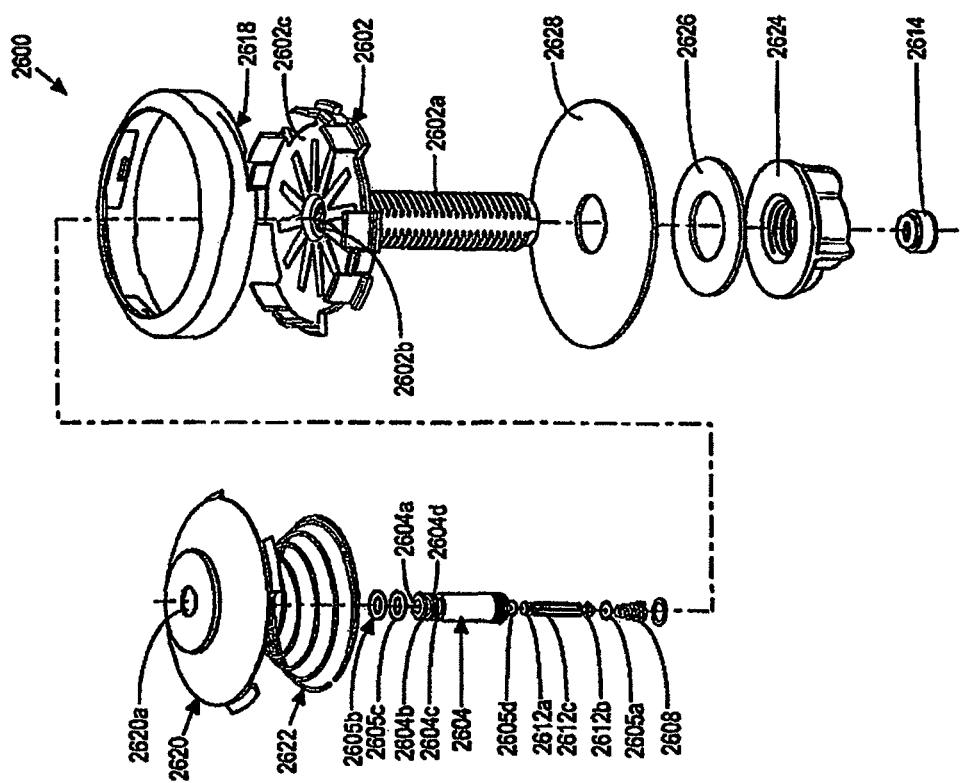
FIG. 62 is a perspective view, with parts separated, of a charging valve assembly, in accordance with another embodiment of the present disclosure.
Figure 63:
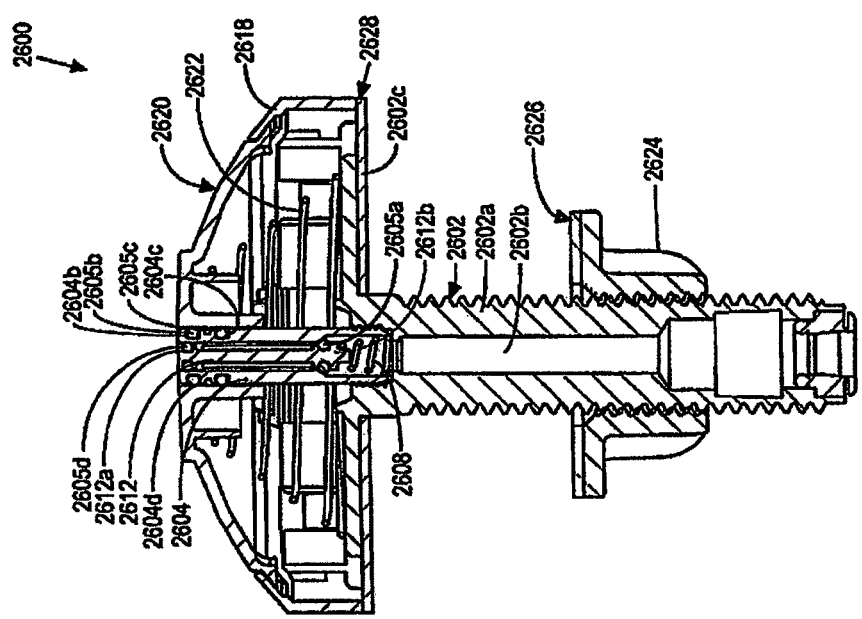
FIG. 63 is longitudinal cross-sectional view of the charging valve assembly of FIG. 62, shown in a closed condition.

Turning now to FIGS. 62 and 63, a charging valve assembly according to another embodiment of the present disclosure, for use with and for filling or re-filling bottle assembly 2000, is generally shown as 2600. Charging valve assembly 2600 includes a bung or fitting 2602 including a stem 2602a for connection to a fluid supply line and defining a fluid passage 2602b therethrough. Fitting 2602 further includes or defines a base wall 2602c.

Charging valve assembly 2600 further includes an outlet stem 2604 connected to fitting 2602 in manner so as to fluidly connect a lumen or central opening 2604a thereof with fluid passage 2602b of fitting 2602. Stem 2604 defines a pair of upper annular channels 2604b, 2604c formed therein for receiving respective gaskets or O-rings 2605b, 2605c. Stem 2604 further defines an annular channel 2604d disposed between the pair of annular channels 2604b and 2604c and which is in fluid communication with central opening 2604a of outlet stem 2604.

Charging valve assembly 2600 further includes a center plunger 2612 slidably disposed within central opening 2604a of outlet stem 2604. Center plunger 2612 defines an upper annular channel 2612a configured to receive and support a gasket or O-ring 2605d and a lower annular channel 2612b configured to receive and support a gasket or O-ring 2605a. Center plunger 2612 includes a plurality of ribs 2612c extending along a length thereof around the periphery thereof.

Charging valve assembly 2600 further includes a biasing member 2608 disposed within central opening 2604a of outlet stem 2604 and supported on a ledge formed in fluid passage 2602a of fitting 2602. Biasing member 2608 functions to maintain center plunger 2612 in an upper position relative to outlet stem 2604 such that gasket 2605a is seated against a ledge (e.g., an annular ledge) defined in central opening 2604a of outlet stem 2604, thereby occluding or closing fluid passage 2602b of fitting 2602.

Charging valve assembly 2600 includes a flange 2618 supported on fitting 2602 and a plunger cap 2620 configured and dimensioned to overlie base 2602c of fitting 2602 and to be retained by flange 2618. Plunger cap 2620 includes a central opening 2620a configured and dimensioned to receive an end of outlet stem 2604 therein. A spring or biasing member 2622 may be disposed between base 2602c of fitting 2602 and plunger cap 2620 for maintaining plunger cap 2620 in a raised condition.

Charging valve assembly 2600 may further include a nut 2624 and a washer 2626 for securing fitting 2602, from beneath, to a surface (e.g., a counter or the like), in a fluid tight arrangement. A gasket 2628 may be provided for placement between base wall 2602c of fitting 2602 and an upper surface of the counter. Charging valve assembly 2600 may further include a push connect fitting 2614 connected to a lower end of fitting 2602 for enabling fluid connection of fitting 2602 to a fluid source.

Figure 64:
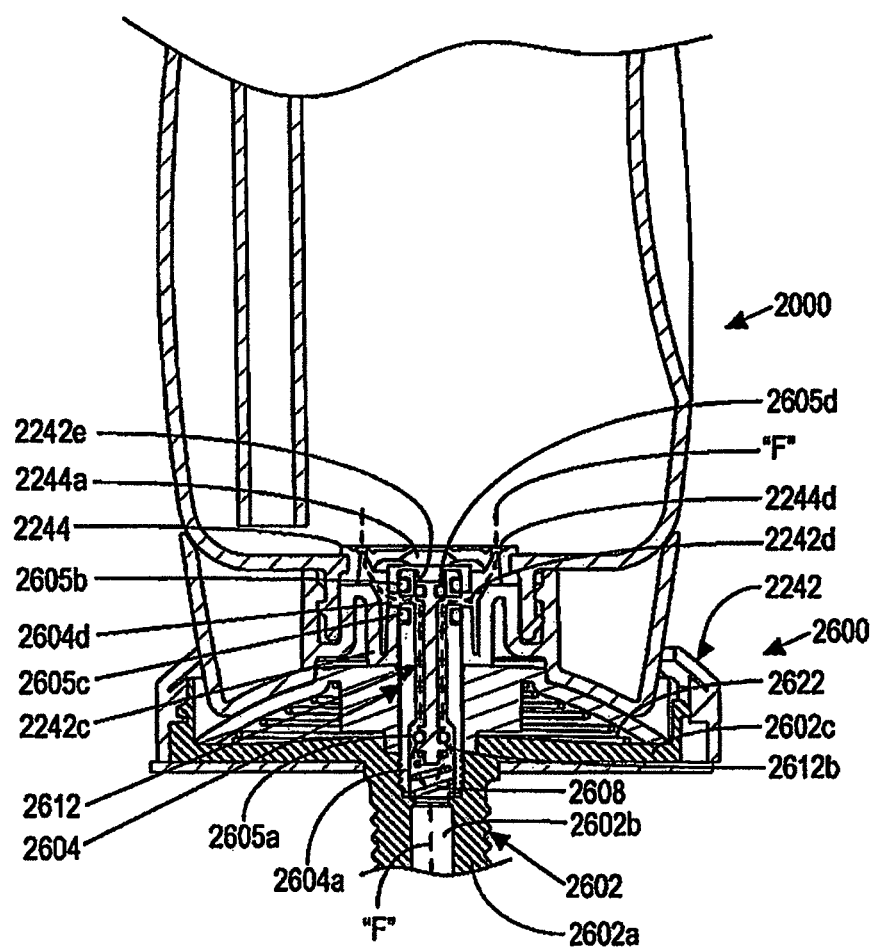
FIG. 64 is a longitudinal cross-sectional view illustrating the fluid engagement of the bottle assembly of FIGS. 50-61 with the charging valve assembly of FIGS. 62 and 63.

As seen in FIG. 64, use of charging valve assembly 2600 with bottle assembly 2000, entails placement of bottom lid assembly 2200 of bottle assembly 2000 onto charging valve assembly 2600 such that central opening 2242b of bottom lid assembly 2200 is aligned with central opening 2620a of plunger cap 2620. Bottle assembly 2000 is then pressed down onto charging valve assembly 2600 such that bottle assembly 2000 presses down on plunger cap 2620, which in turn allows for an end of outlet stem 2604 to be exposed from plunger cap 2620 and to extend into central opening 2242b of bottom lid assembly 2200.

When bottle assembly 2000 is fully placed on charging valve assembly 2600, as seen in FIG. 64, plunger cap 2620 is fully depressed thereby compressing biasing member 2622. Also, the end of outlet stem 2604, exposed from plunger cap 2620, is aligned with stem 2242e extending from the upper wall 2242f overlying inner annular wall 2242c of bottom cover 2242. Additionally, annular channel 2604d of stem 2604 is aligned with the at least one aperture 2242d formed in a side wall of inner annular wall 2242c of bottom cover 2242.

As such, when bottle assembly 2000 is fully placed on charging valve assembly 2600, stem 2242e of bottom cover 2242 presses down on center plunger 2612 thus spacing or unseating gasket 2605a from the ledge defined in central opening 2604a of outlet stem 2604 and compressing biasing member 2608. With gasket 2605a unseated, a fluid channel or passage is opened through which fluid, as indicated by arrow "F", is delivered to bottle assembly 2000. In operation, as mentioned above, the force of the fluid being delivered results in hub 2244a of valve 2244 separating from inner annular wall 2242c of bottom cover 2242. As so positioned, a fluid flow channel for fluid "F" is created through lumen 2602b of fitting 2602, through central opening 2604a of outlet stem 2604 along ribs 2612c of center plunger 2612, through annular channel 2604d of stem 2604, through the at least one aperture 2242d formed in a side wall of inner annular wall 2242c of bottom cover 2242, through windows 2244d of valve 2244 and into bottle assembly 2000.

When bottle assembly 2000 is fully positioned on charging valve assembly 2600 a fluid tight seal is created between gaskets 2605b and 2605c of stem 2604 and an inner surface of from inner annular wall 2244c of bottom cover 2242, wherein an upper gasket 2605b is disposed above the at least one aperture 2242d formed in a side wall of inner annular wall 2242c of bottom cover 2242 and a lower gasket 2605c is disposed below the at least one aperture 2242d formed in a side wall of inner annular wall 2242c of bottom cover 2242.

When bottle assembly 2000 is charged or recharged to a full or desired amount of fluid, bottle assembly 2000 is lifted-off, removed or disconnected from charging valve assembly 2600. In so doing, valve 2244 is closed or reseated due to the resiliency thereof and charging valve assembly 2600 is closed due to biasing member 2608 moving center plunger 2612 in order to reseat gasket 2605*a* against the ledge defined in central opening 2604*a* of outlet stem 2604.

Figure 65:
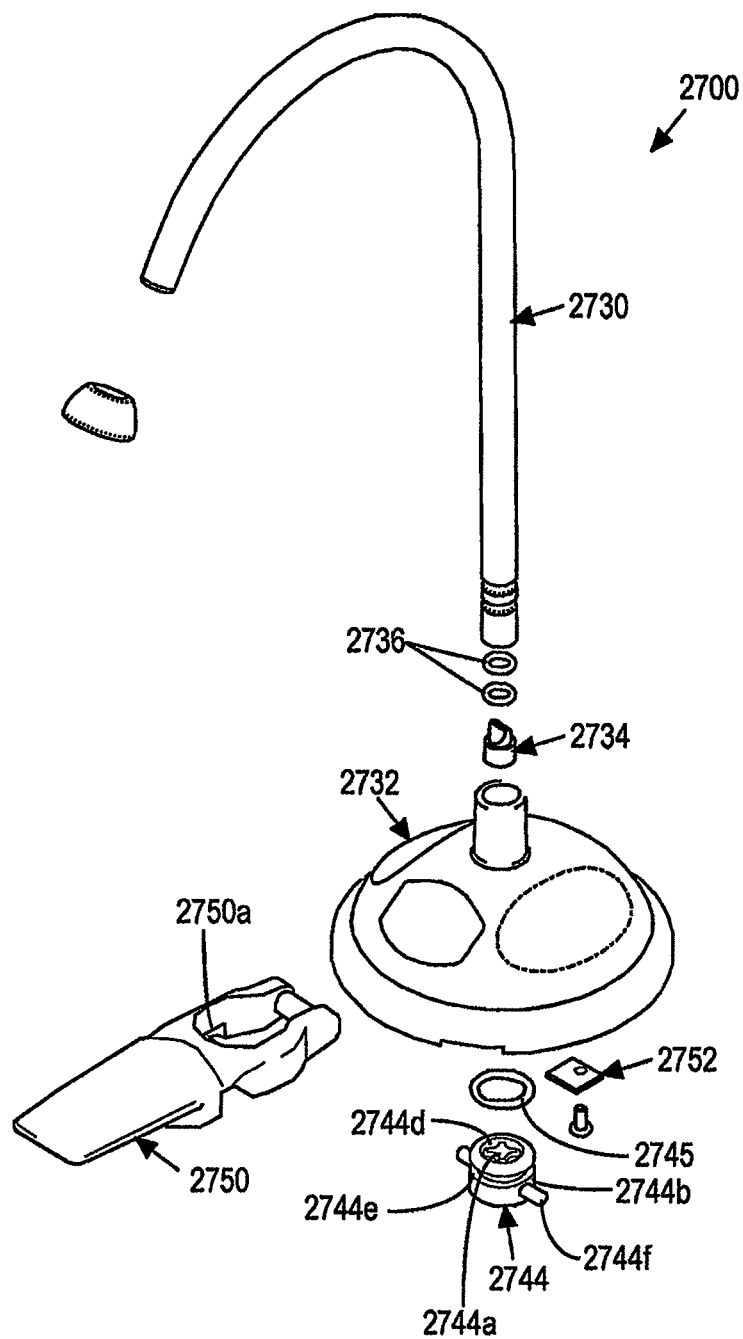
FIG. 65 is a perspective view, with parts separated, of a faucet assembly, in accordance with another embodiment of the present disclosure.
Figure 66:
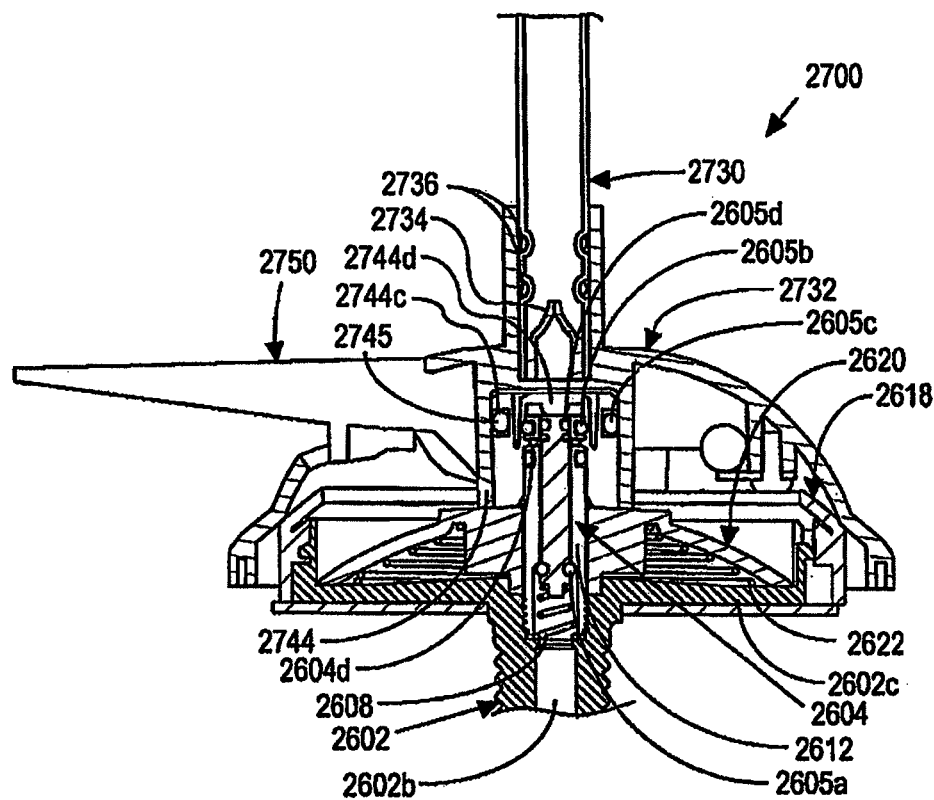
FIG. 66 is a longitudinal cross-sectional view illustrating the fluid engagement of the faucet assembly of FIG. 65 with the charging valve assembly of FIGS. 62 and 63.
Figure 67:
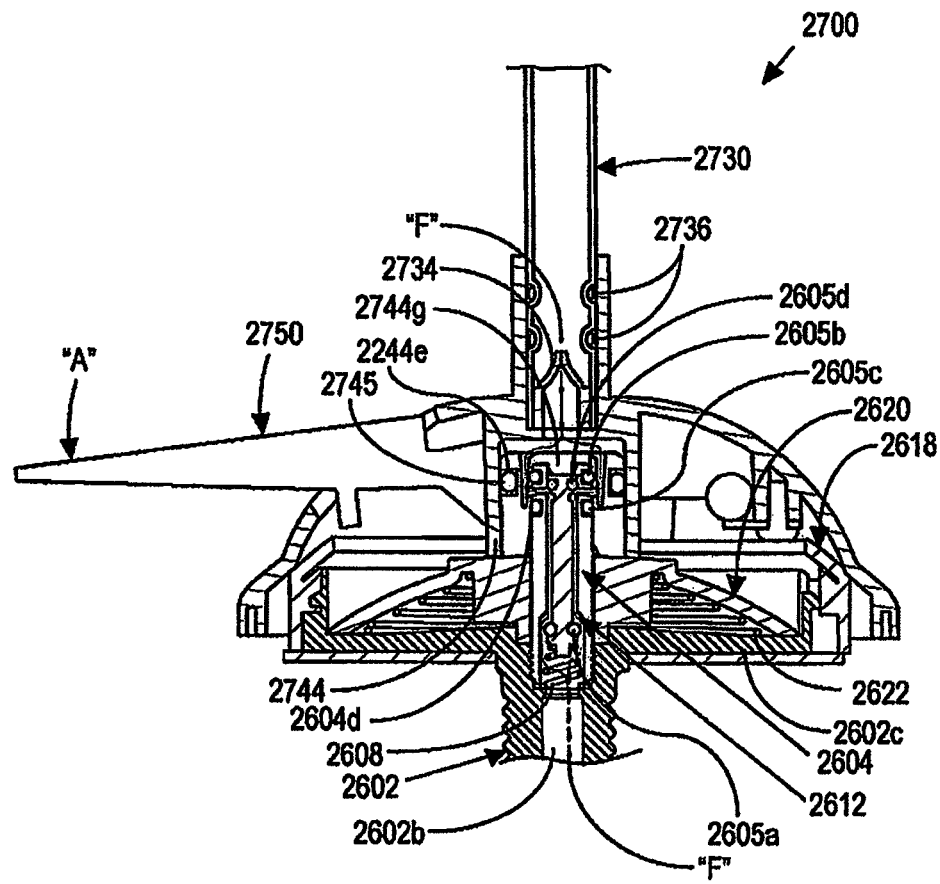
FIG. 67 is a longitudinal cross-sectional view illustrating the use of the faucet assembly of FIG. 65 when engaged with the charging valve assembly of FIGS. 62 and 63.

In order to fill other vessels other than bottle assemblies 2000, as seen in FIGS. 65-67, charging valve assembly 2600 may be configured for use with a faucet assembly 2700 which is configured and adapted for selective removable connection to charging valve assembly 2600. Faucet assembly 2700 is substantially similar to faucet assembly 630 and thus will only be discussed in detail herein to the extent necessary to identify differences in construction and operation.

Faucet assembly 2700 may be connected to fitting 2604 of charging valve assembly 2600 through a faucet tube base 2732, a duckbill valve 2734, and a series of O-rings 2736.

As seen in FIGS. 65-67, faucet assembly 2700 includes a valve 2744 operatively supported in an annular recess 2732*a* of base 2732. Valve 2744 enables passage of fluid into faucet tube 2730. Valve 2744 includes a central hub 2744*a* connected to an annular rim 2744*b* via webs (not shown) thereby defining apertures or windows 2744*d*. Valve 2744 defines an outer annular channel 2744*e* formed in an outer surface of annular rim 2744 which is configured to retain a gasket or O-ring 2745 therein. Valve 2744 further includes a pair of pins 2744*f* extending from an outer surface of annular rim 2744.

Faucet assembly 2700 further includes a lever 2750 extending from base 2732. Lever 2750 defines a pair of cam slots 2750*a* configured to slidably engage respective pins 2744*f* of valve 2744. Faucet assembly 2700 may further include a lever retainer 2752 configured and adapted for returning lever 2750 to an un-actuated position upon the removal of an actuating force thereto, thereby closing off any fluid flow.

In use, as seen in FIGS. 66 and 67, as lever 2750 is moved in the direction of arrow "A" (e.g., downward), valve 2744 is caused to be moved downward due to the interaction of cam slots 2750*a* of lever 2750 and pins 2744*f* of valve 2744. In so doing, a stem 2744*g* extending from an upper inner surface of valve 2744 presses down on center plunger 2612 thus spacing or unseating gasket 2605*a* from the ledge defined in central opening 2604*a* of outlet stem 2604 and compressing biasing member 2608. With gasket 2605*a* unseated, a fluid channel or passage is opened through which fluid, as indicated by arrow "F", is delivered to faucet tube 2730.

With gasket 2605*a* unseated, a fluid channel or passage is opened through which fluid, as indicated by arrow "F", is delivered to faucet tube 2730. As so positioned, a fluid flow channel for fluid "F" is created through lumen 2602*b* of fitting 2602, through central opening 2604*a* of outlet stem 2604 along ribs 2612*c* of center plunger 2612, through window 2744*d* formed in valve 2744, and into faucet tube 2730.

Figure 68:
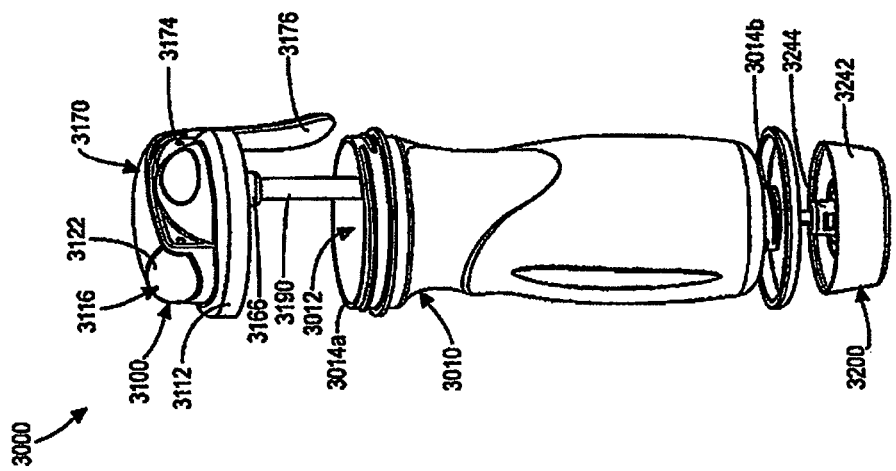
FIG. 68 is a is a perspective view, with parts separated, of a bottle assembly in accordance with yet another embodiment of the present disclosure.

Turning now to FIGS. 68-85, a bottle assembly according to another embodiment of the present disclosure is generally designated as 3000. As seen in FIG. 68, bottle assembly 3000 includes a body portion 3010, a top lid assembly 3100 configured and adapted for selective connection to an upper rim or edge 3014*a* of body portion 3010; and a bottom lid assembly 3200 configured and adapted for selective connection to a lower rim or edge 3014*b* of body portion 3010.

As seen in FIG. 68, body portion 3010 defines a cavity 3012 for receiving, retaining and/or storing a fluid therein. Body portion 3010 is ergonomically formed to accommodate a hand of a user during use and manipulation of bottle assembly 3000. As mentioned above, body portion 3010 includes an upper rim 3014*a* configured and adapted to operatively engage top lid assembly 3100; and a bottom rim 3014*b* configured and adapted to operatively engage bottom lid assembly 3200. It is envisioned that each of upper rim 3014*a* and bottom rim 3014*b* may include a thread for engaging a complementary thread provided on or in top lid assembly 3100 and bottom lid assembly 3200, respectively. It is further envisioned that each of upper rim 3014*a* and bottom rim 3014*b* and each of top lid assembly 3100 and bottom lid assembly 3200, may include any complementary engaging structure, such as, for example, bayonet-type structure, screw threads and the like.

Figure 72:
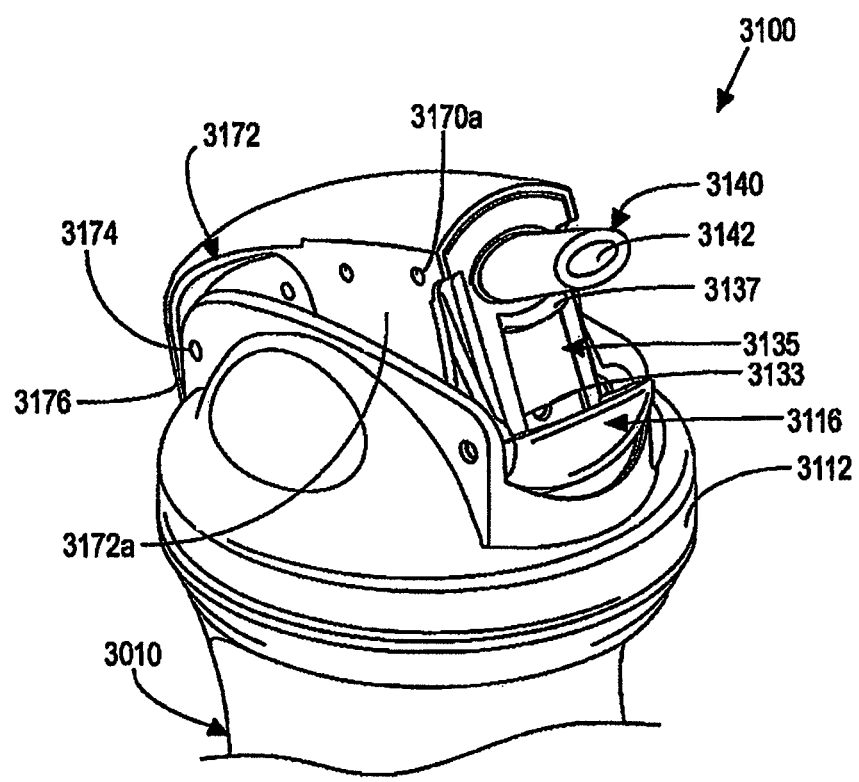
FIG. 72 is a perspective view of the top lid assembly shown in an open condition.
Figure 73:
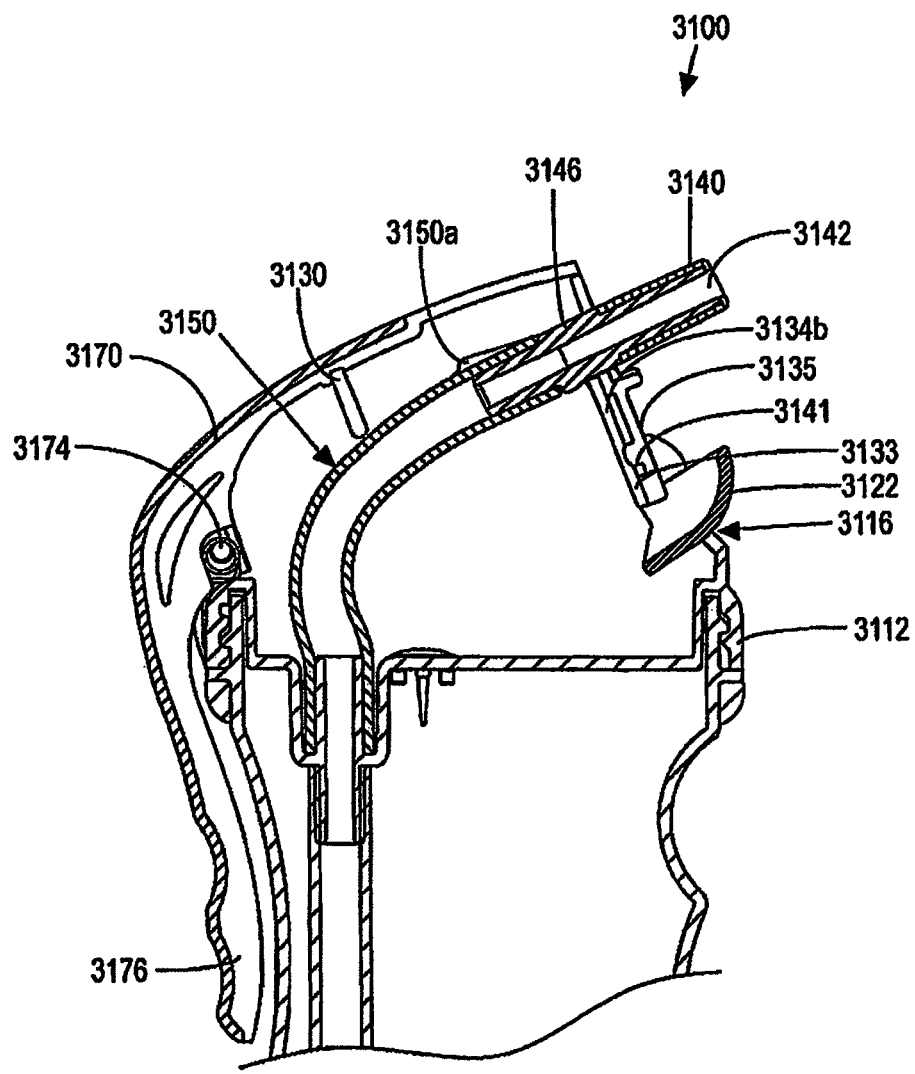
FIG. 73 is a longitudinal, cross-sectional view of the top lid assembly of FIG. 72 shown in an open condition.
Figure 74:
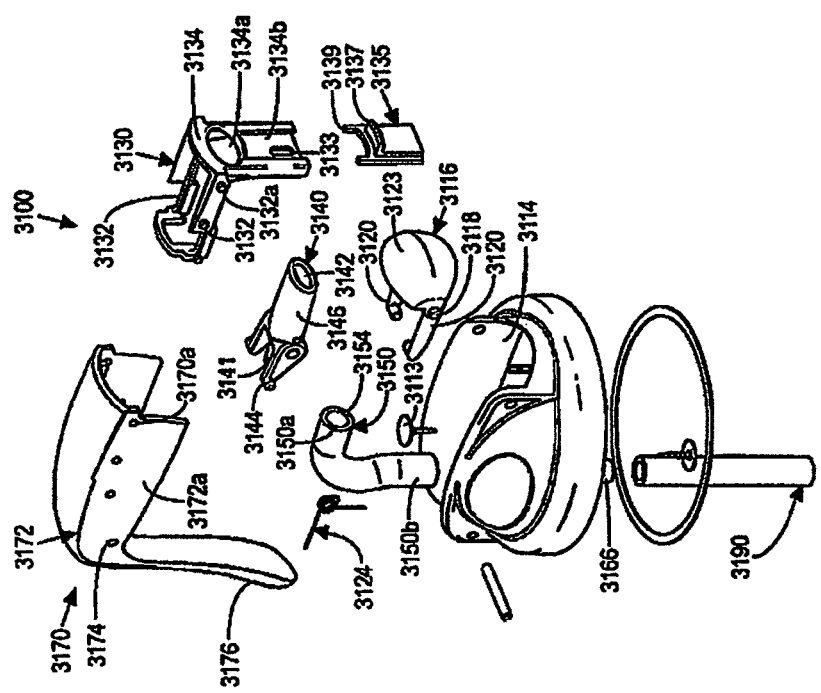
FIG. 74 is an exploded perspective view of the top lid assembly of FIGS. 71-73.
Figure 76:
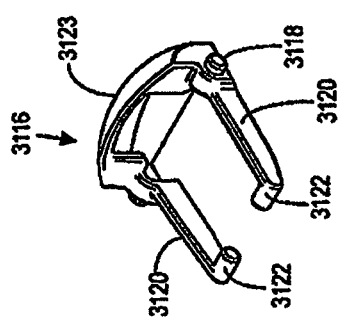
FIG. 76 is a perspective view of a spout lid of the top lid assembly of FIGS. 71-74.
Figure 75:
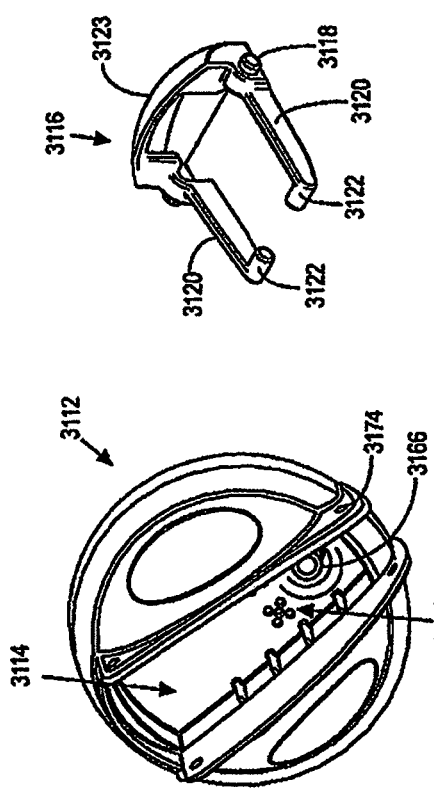
FIG. 75 is a perspective view of a spout cover of the top lid assembly of FIGS. 71-74.
Figure 77:
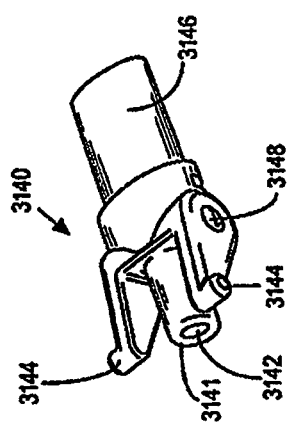
FIG. 77 is a perspective view of a spout of the top lid assembly of FIGS. 71-74.
Figure 82:
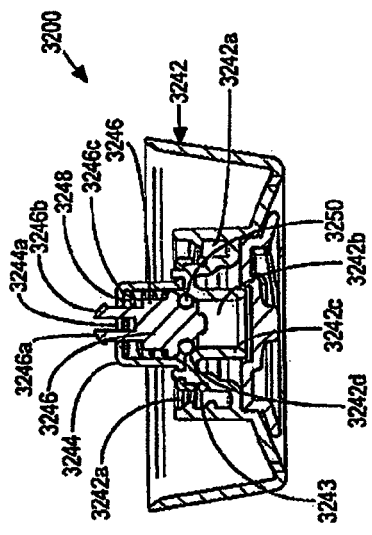
FIG. 82 is a longitudinal cross-sectional view of the bottom lid assembly of FIG. 81.

With particular reference to FIGS. 68-78, a detailed description of top lid assembly 3100 will now be provided. Top lid assembly 3100 includes a spout bottom lid 3112 configured and adapted to operatively engage upper rim 3014*a* of body portion 3010. As best seen in FIGS. 74 and 75, spout bottom lid 3112 defines an upper recess 3114 formed therein, in which a spout is retained and from which the spout is selectively deployable, as will be described in greater detail below.

Top lid assembly 3100 includes a spout lid 3116 operatively associated with spout bottom lid 3112 to selectively close and open recess 3114 formed therein and allow for the spout to extend or be deployed therefrom. Spout lid 3116 includes a pair of pivot bosses 3118 extending outwardly from a respective support arm 3120 which extend from a flap 3123. Spout lid 3116 is pivotable from a first condition, as seen in FIGS. 68-71, in which flap 3123 of spout lid 3116 closes recess 3114 of spout bottom lid 3112 to a second condition, as seen in FIGS. 72 and 73, in which flap 3123 of spout lid 3116 opens recess 3114 of spout bottom lid 3112 to enable a spout to extend therefrom.

It is envisioned that top lid assembly 3100 may include structure or the like for maintaining spout lid 3116 in the first or closed condition or for automatically returning spout lid 3116 to the closed condition following opening thereof. For example, top lid assembly 3100 may include a biasing member 3124 for accomplishing such an automatic closing function. In particular, as seen in FIG. 74, top lid assembly 3100 may include a torsion spring 3124 which is supported on spout bottom lid 3112 and which includes a first arm thereof for engaging a shoulder or a portion of spout bottom lid 3112 and a second arm thereof for engaging structure of trigger 3170. In this manner, in operation, torsion spring 3124 will tend to maintain spout lid 3116 in the closed condition as described above.

Figure 78:
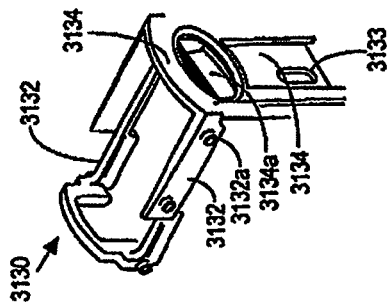
FIG. 78 is a perspective view of a snap guide of the top lid assembly of FIGS. 71-74.

With reference to FIGS. 71-74 and 78, top lid assembly 3100 includes a guide member 3130 operatively supported on trigger 3170. As seen in FIGS. 74 and 78, guide member 3130 includes a pair of spaced apart, elongate, linear rails 3132 including external mounting bosses 3132*a* extending therefrom for receipt into respective mounting holes 3170*a* formed in trigger 3170. Guide member 3130 further includes a distal wall 3134 extending between rails 3132 and defining an aperture 3134*a* therein. Aperture 3134*a* is configured and adapted to permit slidable passage of a spout 3140 therethrough.

Distal wall 3134 includes a channel segment 3134*b* extending beneath aperture 3134*a* having a slot 3133 and being configured and adapted for operative receipt of a lid lock 3135 (see FIG. 80) therein. Lid lock 3135 functions to lock spout lid 3116 in a first or closed condition or to lock spout lid 3116 in an open condition. As seen in FIGS. 74 and 80, lid lock 3135 includes a pair of arms 3139 extending therefrom and configured for sliding receipt in channel segment 3134*b* of guide member 3130. Lid lock 3135 includes tab 3137 extending therefrom configured for engagement by a finger for manipulating or moving lid lock 3135 to/from a locking position to permit spout lid 3116 to move between the closed or open condition.

Figure 71:
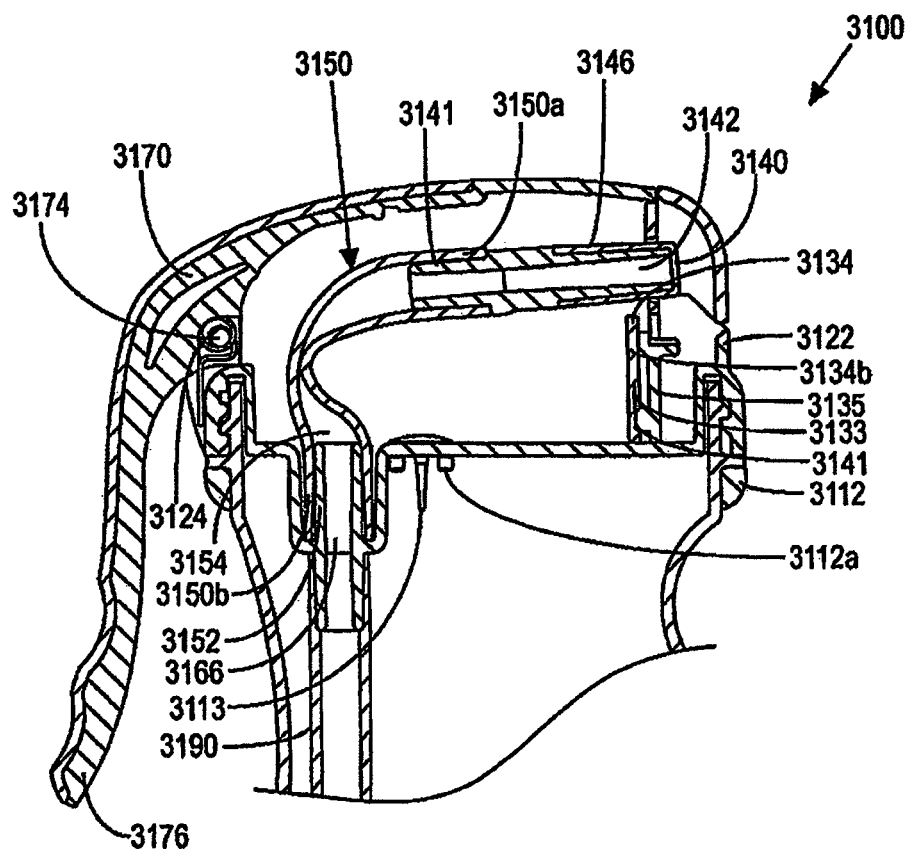
FIG. 71 is a longitudinal, cross-sectional view of the top lid assembly of FIG. 70 shown in a closed condition.

As illustrated in FIGS. 71 and 73, lid lock 3135 further includes a nub 3141 located on the lower back of lid lock 3135. Slot 3133 of channel segment 3134*b* is configured and dimensioned to receive nub 3141 permit lid lock 3135 to move freely. However, as will be discussed in greater detail below, nub 3141 of lid lock 3135 and slot 3133 of channel segment 3134*b* on dimensioned such that lid lock 3135 is maintained in a locked position when nub 3141 is slid out of slot 3133.

With reference to FIGS. 71-74 and 77, top lid assembly 3100 further includes a spout 3140 operatively supported on guide member 3130. Spout 3140 defines a lumen 3142 extending therethrough and a pair of guide bosses 3144 extending outwardly from opposed sides thereof. Guide bosses 3144 slidably engage an upper surface of rails 3132 of guide member 3130. A distal portion 3146 of spout 3140 is configured and dimensioned to slidably extend through aperture 3134*a* of guide member 3130. Spout 3140 further includes a pair of opposed pivot apertures 3148 formed therein for receiving pivot bosses 3122 extending inwardly from arms 3120 of spout lid 3116 (see FIG. 76).

In operation, as will be described in greater detail below, as trigger 3170 is actuated, spout 3140 is distally advanced along rails 3132 of guide member 3130 and distal portion 3146 of spout 3140 is deployed or extended out of aperture 3134 of guide member 3130. When trigger 3170 is actuated to distally advance spout 3140, advancement of spout 3140 results in spout lid 3116 pivoting about pivot bosses 3118 in order to open recess 3114 of spout bottom lid 3112. It follows that, when trigger 3170 is released, spout 3140 is withdrawn proximally along rails 3132 of guide member 3130 and distal portion 3146 of spout 3140 is withdrawn into aperture 3134 of guide member 3130. When trigger 3170 is released to withdraw spout 3140, withdrawal of spout 3140 results in spout lid 3116 pivoting about pivot bosses 3118 in order to close recess 3114 of spout bottom lid 3112.

With reference now to FIGS. 68-74 and 79, top lid assembly 3100 further includes a trigger 3170 for actuating or moving spout 3140 between an extended condition and a retracted condition. Trigger 3170 is pivotally supported in recess 3114 of spout bottom lid 3112, about pivot point 3174. Trigger 3170 includes a body portion 3172 including a pair of spaced apart side walls 3172*a*. Trigger 3170 includes an arm 3176 extending from body portion 3172.

Figures 69, 70:
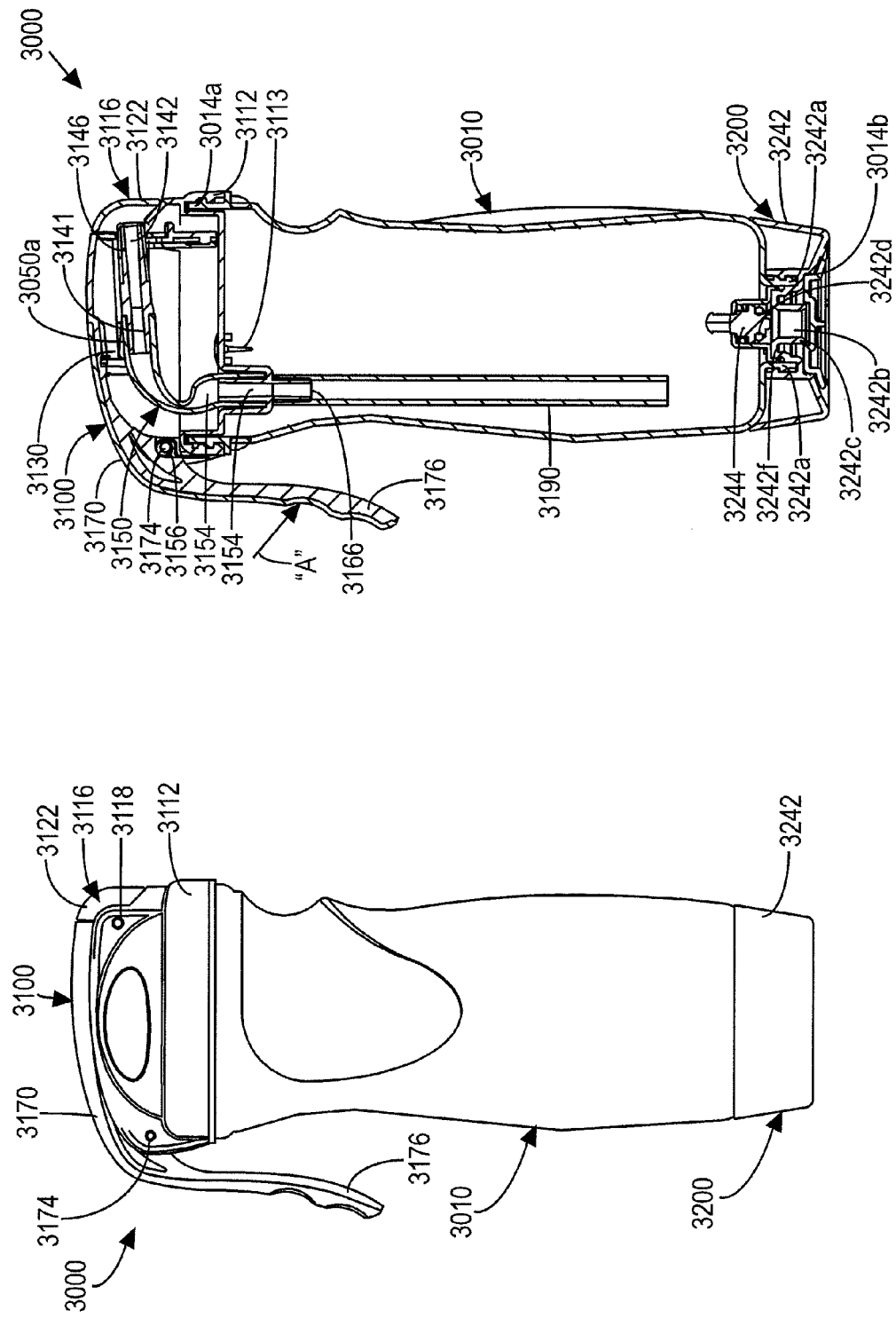
FIG. 69 is a side elevational view of the bottle assembly of FIG. 68.
FIG. 70 is a longitudinal, cross-sectional view of the bottle assembly of FIGS. 68 and 69, illustrating both the top lid assembly and the bottom lid assembly thereof in a closed condition.

In use or operation, with spout 3140 in the retracted condition and with spout cover 3110 in the closed condition, as arm 3176 of trigger 3170 is moved in the direction of arrow "A", as seen in FIG. 70 (i.e., toward body portion 3010 of bottle assembly 3000), body portion 3172 of trigger 3170 is pivoted about pivot point 3174 causing guide member 3130, supported on body portion 3172 of trigger 3170 to also be raised thus causing spout 3140 to be deployed, as described above. When arm 3176 of trigger 3170 is released, biasing member 3124 automatically returns body portion 3172 of trigger 3170 to an un-pivoted position (i.e., moves arm 3176 in a direction opposite to arrow "A") and causes spout 3140 to be withdrawn into top lid assembly 3100.

In use or operation, tab 3137 of lid lock 3135 is manipulated or moved with a finger to/from a locking position to permit spout lid 3116 to move between the closed or open condition. As illustrated in FIG. 71, lid lock 3135 is in a closed position with nub 3141 shown engaged in slot 3133 of channel segment 3134*b* of distal wall 3134 of guide member 3130. Spout 3140 is withdrawn into top lid assembly 3100. As illustrated in FIG. 72, top lid assembly 3100 is in an open position with spout 3140 fully deployed as described above in greater detail. Tab 3137 of lid lock 3135 is manipulated upwards with a finger to a locking position to lock spout 3140 into the fully deployed open position. As lid lock 3135 is manipulated upwards, nub 3141 is raised upwards in slot 3133 and is caused to move out of slot 3133 of channel segment 3134*b* and to frictionally engage with a surface of channel segment 3134*b* (see FIG. 73). To unlock spout 3140, a finger is used to manipulate tab 3137 of lid lock 3135 downwards causing nub 3141 to re-enter slot 3133 and thus allow the top lid assembly 3100 to return to a closed, retracted position.

As seen in FIGS. 70-71, and 73-74 top lid assembly 3100 further includes an upper resilient tube 3150 having a first end 3150*a* fluidly connected to a proximal portion 3141 of spout 3140 and a second end 3150*b* fluidly connected to an elbow 3152 which is fluidly connected to a port 3166 (see FIG. 71) formed in a bottom surface of spout bottom lid 3112. In operation, when spout 3140 is fully retracted, as seen in FIGS. 70-71, resilient tube 3150 is kinked or bent over, thereby occluding a lumen 3154 extending therethrough. With the lumen of resilient tube 3150 occluded, fluid is prevented from traveling therethrough. Then spout 3140 is deployed, as seen in FIG. 73, resilient tube 3150 is partially extended thereby opening the kink and opening the lumen extending through resilient tube 3150. With the lumen of resilient tube 3150 at least partially open, fluid is allowed to flow therethrough.

As seen in FIGS. 68, 70-71, and 74, top lid assembly 3100 further includes a straw 3190 extending from port 3166 into cavity 3012 of body portion 3010 of bottle assembly 3000. An end of straw 3190 extends into cavity 3012 of body portion 3010 and terminates near a bottom of body portion 3010.

As seen in FIG. 71, spout bottom lid 3112 includes a venting region 3112*a* formed therein. Venting region 3112*a* includes pores which extend through the surface of spout bottom lid 3112. Top lid assembly 3100 further includes an umbrella valve 3113 operatively associated with venting region 3112*a*. In particular, umbrella valve 3113 is positioned on an upper surface of venting region 3112*a* and provides venting into and/or out of cavity 3012 of body portion 3010 during charging, recharging, draining and/or emptying of bottle assembly 3000.

Turning now to FIGS. 68-70, 81, and 82, a detailed discussion of bottom lid assembly 3200 is provided. Bottom lid assembly 3200 is substantially similar to bottom lid assembly 2200 and thus will only be described herein in detail to the extent necessary to identify differences in construction and operation.

Bottom lid assembly 3200 includes a bottom cover 3242 defining an annular channel 3242*a* configured and adapted to threadingly engage bottom rim 3014*b* of body portion 3010 in a fluid tight manner. Bottom cover 3242 includes a central opening 3242*b* defined by an inner annular wall 3242*c* (see FIGS. 81 and 82).

Bottom lid assembly 3200 further includes a valve assembly 3244 (see FIGS. 81-83) operatively connected to bottom cover 3242 and disposed over central opening 3242*b*. Valve assembly 3244 enables passage of fluid into cavity 3012 of body portion 3010 and not out of cavity 3012 of body portion 3010. Valve assembly 3244 includes a central hub 3244*a* connected to an annular rim 3244*b* via webs 3244*c* thereby defining apertures or windows 3244*d*.

Figure 83:
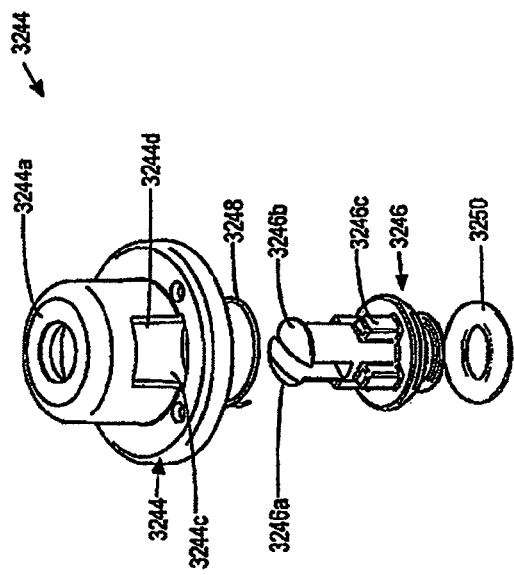
FIG. 83 is a perspective view, with parts separated, of a valve assembly, in accordance with another embodiment of the present disclosure of the bottom lid assembly of FIG. 80.

As further illustrated in FIG. 83, valve assembly 3244 further includes a spring 3248 disposed within central hub 3244*a* of valve 3244 and supported on a nipple 3246. Spring 3248 functions to maintain nipple 3246 in a lower position relative to central hub 3244a such that o-ring 3250 is seated against a ledge (e.g., an annular ledge) defined in inner annular wall 3242c of bottom cover 3242, thereby occluding or closing fluid passage. Nipple 3246 further includes arms 3246a and 3246b extending therefrom which are configured to extend through central hub 3244a of valve 3244 (see FIG. 82).

Figure 84:
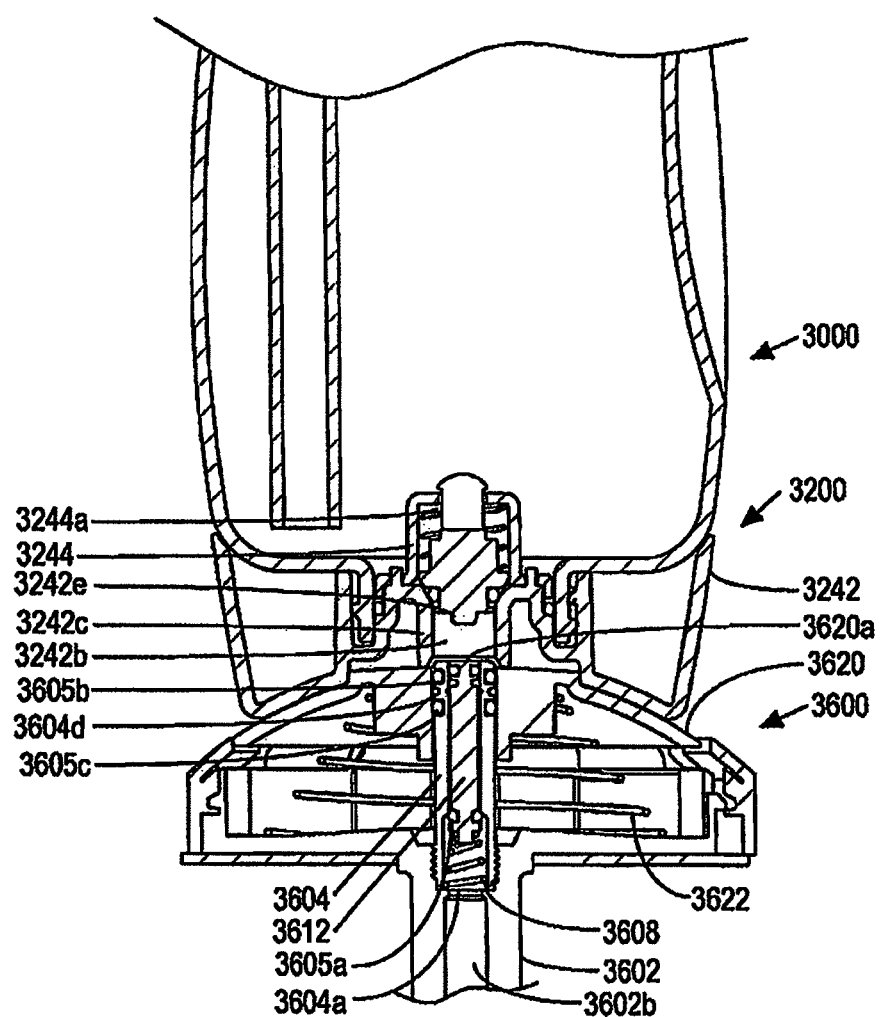
FIG. 84 is a longitudinal cross-sectional view illustrating the engagement of the bottle assembly of FIGS. 68-73 with a bottle assembly of the bottom lid assembly of FIG. 80.
Figure 85:
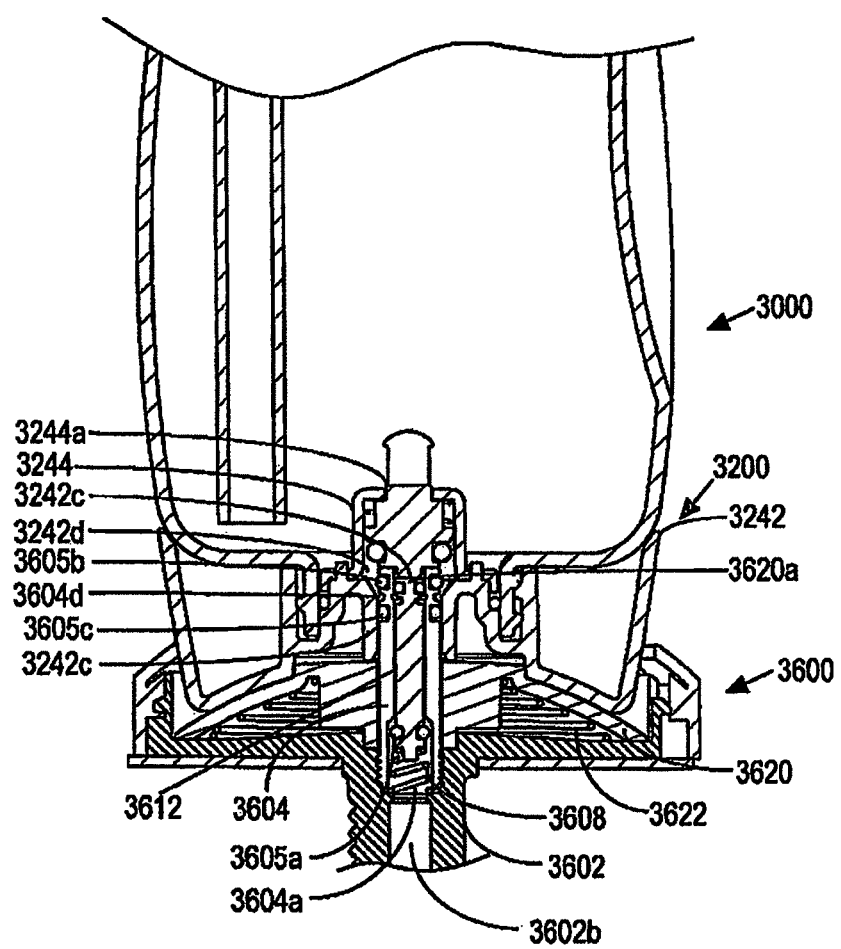
FIG. 85 is a further longitudinal cross-sectional view illustrating the fluid engagement of the bottle assembly of FIGS. 68-73 with the charging valve assembly.

Turning now to FIGS. 84 and 85, a charging valve assembly for use with and for filling or re-filling bottle assembly 3000, is generally shown as 3600 which is substantially similar to charging valve assembly 2600 of the present disclosure and thus will only be described herein in detail to the extent necessary to identify differences in construction and operation.

Use of charging valve assembly 3600 with bottle assembly 3000, entails placement of bottom lid assembly 3200 of bottle assembly 3000 onto charging valve assembly 3600 such that central opening 3242b of bottom lid assembly 3200 is aligned with central opening 3620a of plunger cap 3620. Bottle assembly 3000 is then pressed down onto charging valve assembly 3600 such that bottle assembly 3000 presses down on plunger cap 3620 (see FIG. 85), which in turn allows for an end of outlet stem 3604 to be exposed from plunger cap 3620 and to extend into central opening 3242b of bottom lid assembly 3200.

When bottle assembly 3000 is fully placed on charging valve assembly 3600, as seen in FIG. 85, plunger cap 3620 is fully depressed thereby compressing biasing member 3622. Additionally, annular channel 3604d of stem 3604 is aligned with the at least one aperture 3242d formed in a side wall of inner annular wall 3242c of bottom cover 3242.

As such, when bottle assembly 3000 is fully placed on charging valve assembly 3600, stem 3242e of valve assembly 3244 of bottom cover 3242 presses down on center plunger 3612 thus spacing or unseating gasket 3605a from the ledge defined in central opening 3604a of outlet stem 3604 and compressing biasing member 3608. With gasket 3605a unseated, a fluid channel or passage is opened through which fluid, is delivered to bottle assembly 3000. In operation, as mentioned above, the force of the fluid being delivered results in hub 3244a of valve 3244 separating from inner annular wall 3242c of bottom cover 3242. As so positioned, a fluid flow channel for fluid is created through lumen 3602b of fitting 3602, through central opening 3604a of outlet stem 3604 along ribs 3612c of center plunger 3612, through annular channel 3604d of stem 3604, through the at least one aperture 3242d formed in a side wall of inner annular wall 3242c of bottom cover 3242, through windows 3244d of valve assembly 3244 and into bottle assembly 3000.

When bottle assembly 3000 is fully positioned on charging valve assembly 3600 a fluid tight seal is created between gaskets 3605b and 3605c of stem 3604 and an inner surface of from inner annular wall 3244c of bottom cover 3242, wherein an upper gasket 3605b is disposed above the at least one aperture 3242d formed in a side wall of inner annular wall 3242c of bottom cover 3242 and a lower gasket 3605c is disposed below the at least one aperture 3242d formed in a side wall of inner annular wall 3242c of bottom cover 3242.

When bottle assembly 3000 is charged or recharged to a full or desired amount of fluid, bottle assembly 3000 is lifted-off, removed or disconnected from charging valve assembly 3600. In so doing, valve assembly 3244 is closed or reseated due to the resiliency thereof and charging valve assembly 3600 is closed due to biasing member 3608 moving center plunger 3612 in order to reseat gasket 3605a against the ledge defined in central opening 3604a of outlet stem 3604.

In order to fill other vessels other than bottle assemblies 3000, charging valve assembly 3600 may be configured for use with a faucet assembly such as the faucet assembly 2700 shown in FIGS. 65-67, which is configured and adapted for selective removable connection to charging valve assembly 3600.

It is envisioned and within the present disclosure that any vessel for containing fluid may be adapted for bottom filling (e.g., include a one-way valve assembly operatively provided in a bottom surface thereof). For example, it is envisioned that bottles, faucet taps, juggs, mugs, cups, thermoses, vases, tubs, bowls, pots, planters, and the like may be provided with a one-way valve assembly for filling from the bottoms thereof.

While several particular forms of the charging/recharging system have been illustrated and described, it will also be apparent that various modifications can be made without departing from the spirit and scope of the present disclosure.

Thus, it should be understood that various changes in form, detail and application of the charging/recharging system of the present disclosure may be made without departing from the spirit and scope of the present disclosure.

The invention claimed is:

1. A bottle assembly, comprising:
a body portion defining a cavity configured to retain fluid therein and an open end in communication with the cavity;
a lid assembly, the lid assembly including:
a base configured to releasably engage the open end of the body portion, the base defining a recess therein;
a top pivotably coupled to the base about a first pivot, the top configured to rotate about the first pivot and relative to the base between a closed condition, wherein the top is substantially disposed within the recess of the base, and an open condition, wherein the top extends at least partially from the base; and
a spout coupled to the top, the spout configured to translate relative to the top in a generally radial direction with respect to the first pivot, upon movement of the top between the closed condition and the open condition, between a retracted condition, wherein the spout is disposed within the top, and an extended position, wherein the spout extends at least partially from the top; and
a lock assembly movable between an unlocked condition, wherein the top is permitted to move between the closed condition and the open condition, and a locked condition, wherein the top is locked in the open condition, the lock assembly including a lock member that is manually movable to transition the lock assembly between the locked condition and the unlocked condition, the lock member positioned such that the lock member is only accessible for manual movement when the top is in the open condition.

2. The bottle assembly according to claim 1, further comprising a trigger arm that is selectively actuatable to move the top between the closed condition and the open condition.

3. The bottle assembly according to claim 2, wherein the trigger arm extends along at least a portion of a length of the body portion to facilitate simultaneous grasping of the body portion and manipulation of the trigger arm with one hand.

4. The bottle assembly according to claim 1, further comprising a spout cover pivotably coupled to the base about a second pivot, the spout cover rotatable about the second pivot relative to the base, upon movement of the top between the closed condition and the open condition, between a blocking condition, wherein the spout cover, the top, and the base cooperate to substantially enclose the spout within the recess of the base, and an unblocking condition, wherein the spout is accessible.

5. A lid assembly for a bottle, comprising:
- a base configured to releasably engage an open top end of a bottle, the base defining a recess therein;
- a spout;
- a top coupled to the base;
- a spout cover coupled to base and the top;
- a trigger arm coupled to the top, the trigger arm selectively actuatable to transition the lid assembly between a closed condition, wherein the base, the top, and the spout cover cooperate to substantially enclose the spout within the recess of the base, and an open condition, wherein the top and spout cover are moved relative to the base and to one another to provide access to the spout; and
- a lock assembly movable between an unlocked condition, wherein the lid assembly is permitted to transition between the closed condition and the open condition, and a locked condition, wherein the lid assembly is locked in the open condition, the lock assembly including a lock member that is manually movable to transition the lock assembly between the locked condition and the unlocked condition, the lock member positioned such that the lock member is only accessible for manual movement when the lid assembly is in the open condition.

6. The lid assembly according to claim 5, wherein the top is pivotably coupled to the base via a first pivot.

7. The lid assembly according to claim 6, wherein the spout cover is pivotably coupled to the base via a second pivot.

8. The lid assembly according to claim 7, wherein the spout cover is coupled to the top via a linkage such that rotation of the top about the first pivot in a first direction effects rotation of the spout cover about the second pivot in a second, opposite direction.

9. The lid assembly according to claim 5, wherein the spout is configured to translate relative to the top between a retracted position, wherein the spout is refracted within the top, and an extended position, wherein the spout extends at least partially from the top, upon transitioning of the lid assembly between the closed condition and the open condition.

10. A lid assembly for a bottle, comprising:
- a base configured to releasably engage an open top end of a bottle, the base defining a recess therein;
- a top coupled to the base and movable relative to the base between a closed condition, wherein the top is substantially disposed within the recess of the base, and an open condition, wherein the top extends at least partially from the recess of the base;
- a spout coupled to the top, the spout substantially disposed within the recess of the base when the top is in the closed condition, and extending at least partially from the recess of the base when the top is in the open condition; and
- a lock assembly including a lock member that is manually movable for moving the lock assembly between an unlocked condition, wherein the top is permitted to move between the closed condition and the open condition, and a locked condition, wherein the top is locked in the open condition, the lock member substantially enclosed within the recess of the base when the top is in the closed condition such that the lock member is accessible for moving the lock assembly between locked condition and the unlocked condition only when the top is in the open condition.

11. The lid assembly according to claim 10, wherein the spout is movable relative to the top, upon movement of the top between the closed condition and the open condition, between a retracted condition, wherein the spout is disposed within the top, and an extended position, wherein the spout extends at least partially from the top.

12. The lid assembly according to claim 11, wherein, the spout is retained in the extended position when the lock member is disposed in the locked condition.

13. The lid assembly according to claim 10, further comprising a spout cover coupled to the base, the spout cover movable between a blocking condition, wherein the spout cover, the top, and the base cooperate to substantially enclose the spout within the recess of the base, and an unblocking condition, wherein the spout is accessible.

14. The lid assembly according to claim 13, wherein the spout cover is coupled to the top via a linkage such that movement of the top between the closed condition and the open condition effects corresponding movement of the spout cover between the blocking condition and the unblocking condition.

15. The lid assembly according to claim 10, further comprising a trigger arm that is selectively actuatable to move the top between the closed condition and the open condition.

16. The lid assembly according to claim 15, wherein the trigger arm is inoperable when the lock assembly is disposed in the locked condition.

* * * * *